(12) United States Patent
Abe et al.

(10) Patent No.: US 7,417,610 B2
(45) Date of Patent: Aug. 26, 2008

(54) IMAGE DISPLAY APPARATUS AND IMAGE DISPLAY METHODS

(75) Inventors: Naoto Abe, Tokyo (JP); Kohei Inamura, Kanagawa (JP); Osamu Sagano, Tokyo (JP); Hiroshi Saito, Kanagawa (JP); Takeshi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 11/212,675

(22) Filed: Aug. 29, 2005

(65) Prior Publication Data

US 2005/0280611 A1  Dec. 22, 2005

Related U.S. Application Data

(62) Division of application No. 10/299,668, filed on Nov. 20, 2002, now Pat. No. 6,952,193.

(30) Foreign Application Priority Data

Dec. 12, 2001 (JP) .............................. 2001-379276

(51) Int. Cl.
G09G 3/34 (2006.01)
(52) U.S. Cl. .............................. 345/87; 345/48; 345/55; 345/63; 345/77; 345/84; 345/204; 345/690
(58) Field of Classification Search .................. 345/48, 345/51, 55, 63, 74.1, 77, 84, 88, 89, 90, 204, 345/690

See application file for complete search history.

(56) References Cited

U.S. PATENT DOCUMENTS

| | | | | |
|---|---|---|---|---|
| 5,734,361 A | * | 3/1998 | Suzuki et al. | 345/74.1 |
| 6,580,407 B1 | * | 6/2003 | Suzuki et al. | 345/74.1 |
| 6,690,344 B1 | * | 2/2004 | Takeuchi et al. | 345/85 |
| 2003/0117420 A1 | | 6/2003 | Muneki et al. | 345/690 |

FOREIGN PATENT DOCUMENTS

JP          8-248920 A          9/1996

\* cited by examiner

*Primary Examiner*—Bipin Shalwala
*Assistant Examiner*—Vince E Kovalick
(74) *Attorney, Agent, or Firm*—Fitzpatrick, Cella, Harper & Scinto

(57) ABSTRACT

Provided are image display apparatus and image display methods capable of suitably making correction for variation of driving conditions due to an electric resistance of matrix wiring of a display panel by downsized hardware. The apparatus and methods involve a device of calculating voltage drop amounts caused by the resistance of row wires, for input image data, and a device of calculating image data with correction for the voltage drop amounts (corrected image data). An overflow processing circuit is provided so as to prevent overflow of the image data after the correction from an input range of a modulator, and the overflow is prevented by a gain. Since a gradation converter for changing a gradation conversion characteristic by a gain is provided in the stage preceding to the configuration for making the correction for influence of the voltage drop, it becomes feasible to cancel saturation characteristics of phosphors and to display images with high quality thereby.

22 Claims, 37 Drawing Sheets

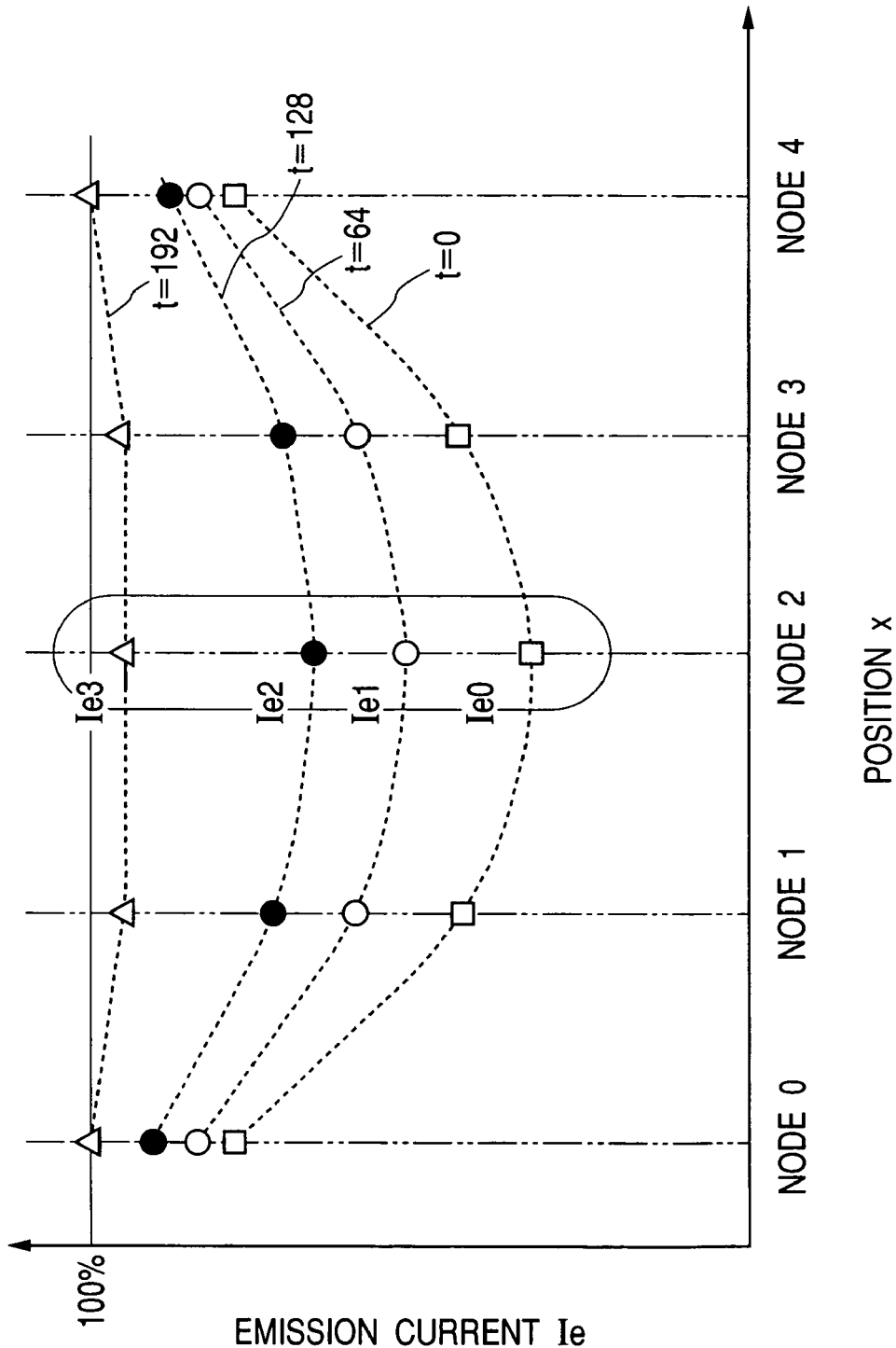

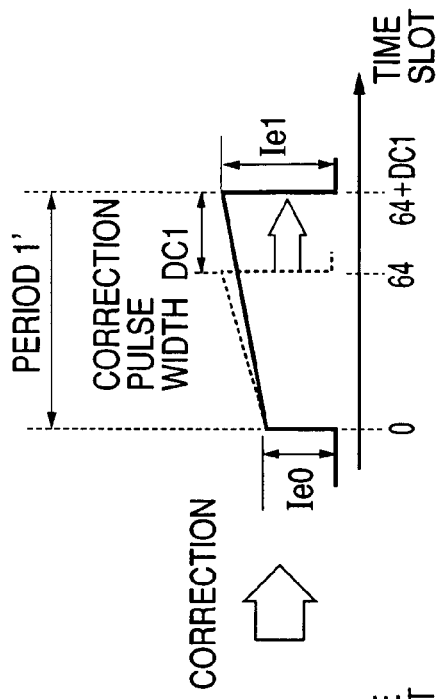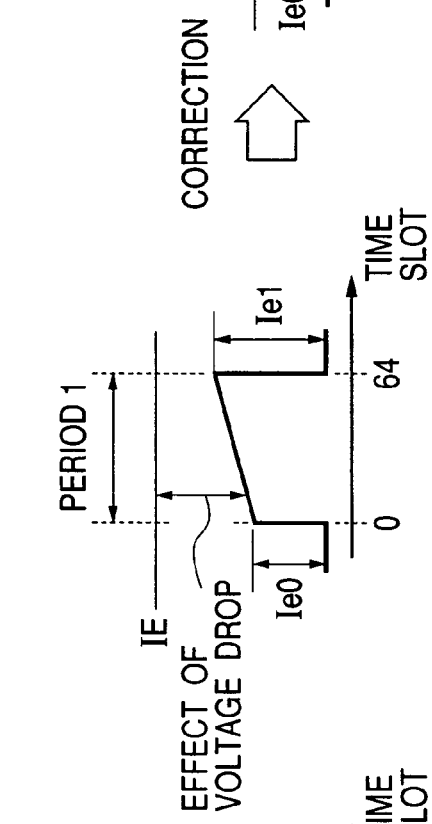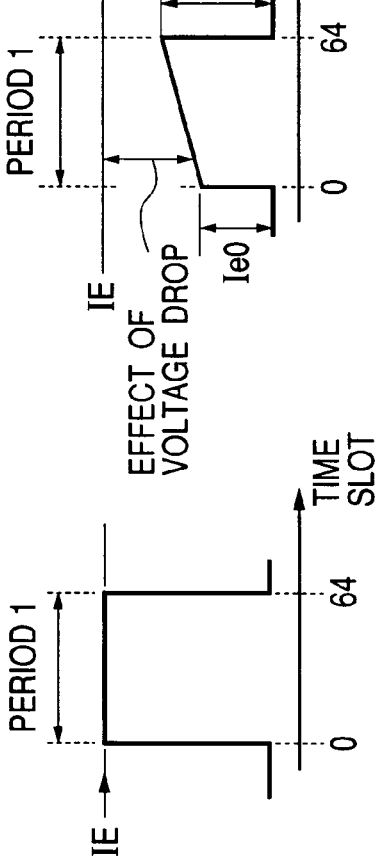

EMISSION CURRENT PULSE WITHOUT VOLTAGE DROP

PRACTICAL EMISSION CURRENT PULSE

EMISSION CURRENT PULSE AFTER CORRECTION

※ IE : EMISSION CURRENT BY EMISSION WITHOUT VOLTAGE DROP

EMISSION CURRENT PULSE WITHOUT VOLTAGE DROP

PRACTICAL EMISSION CURRENT PULSE

EMISSION CURRENT PULSE AFTER CORRECTION

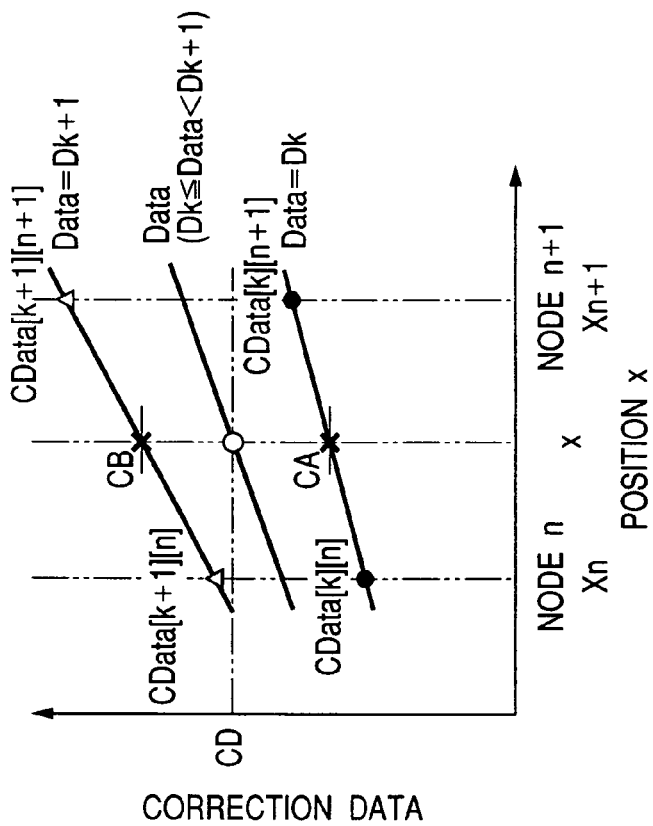
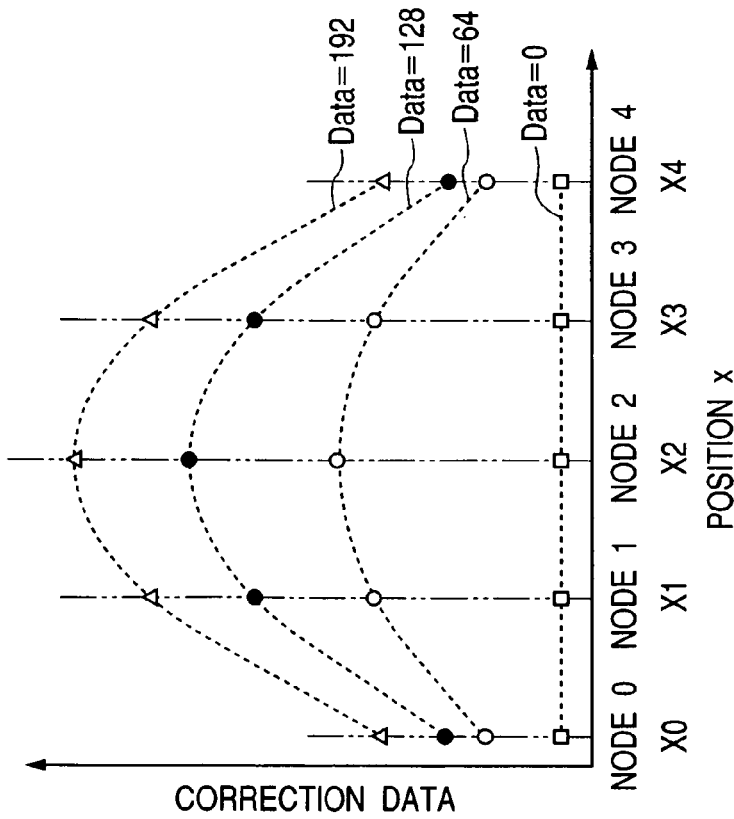

○ : GAIN WITHOUT AVERAGED (NUMBER 100)
● : GAIN AVERAGED (NUMBER 101)

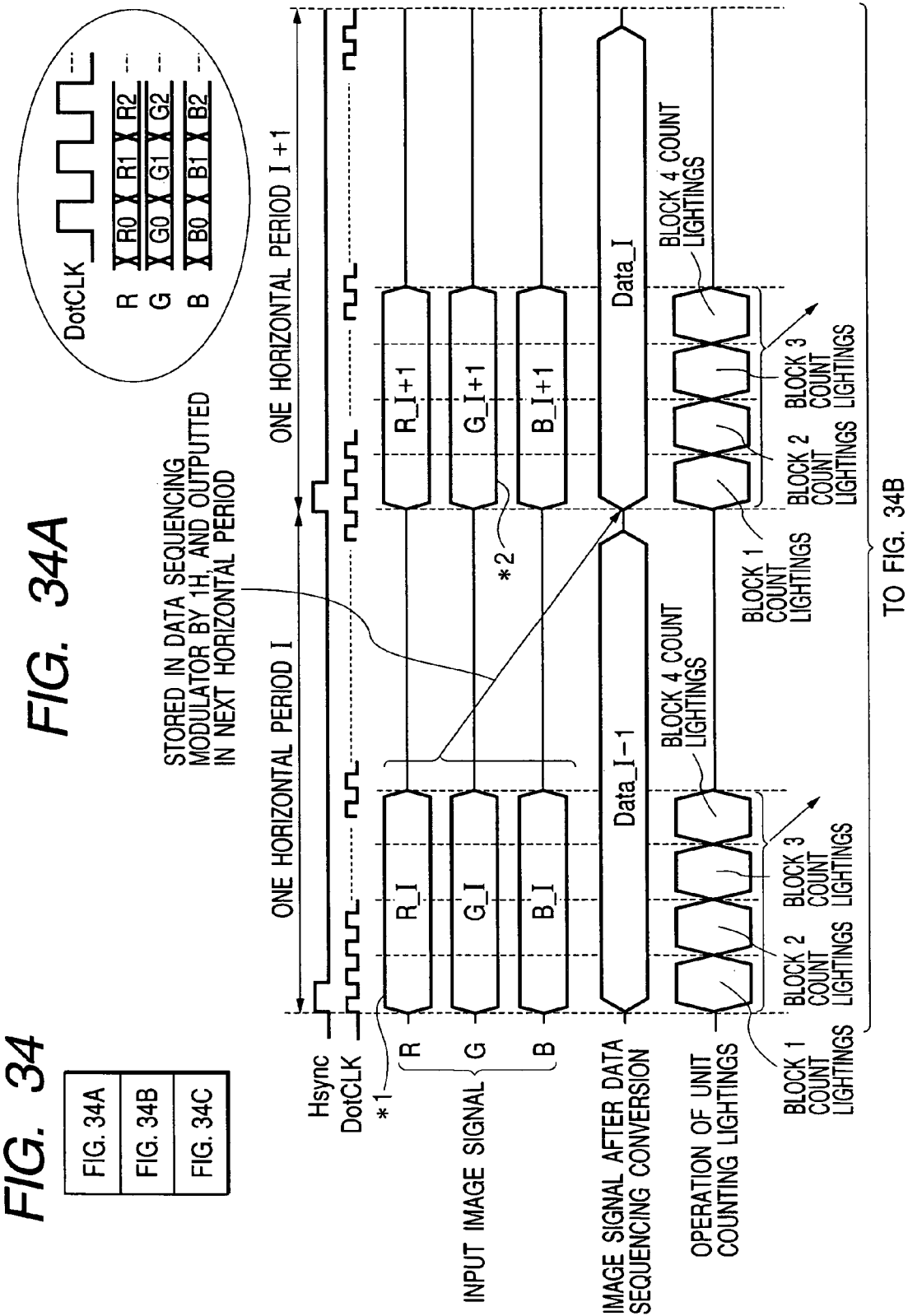

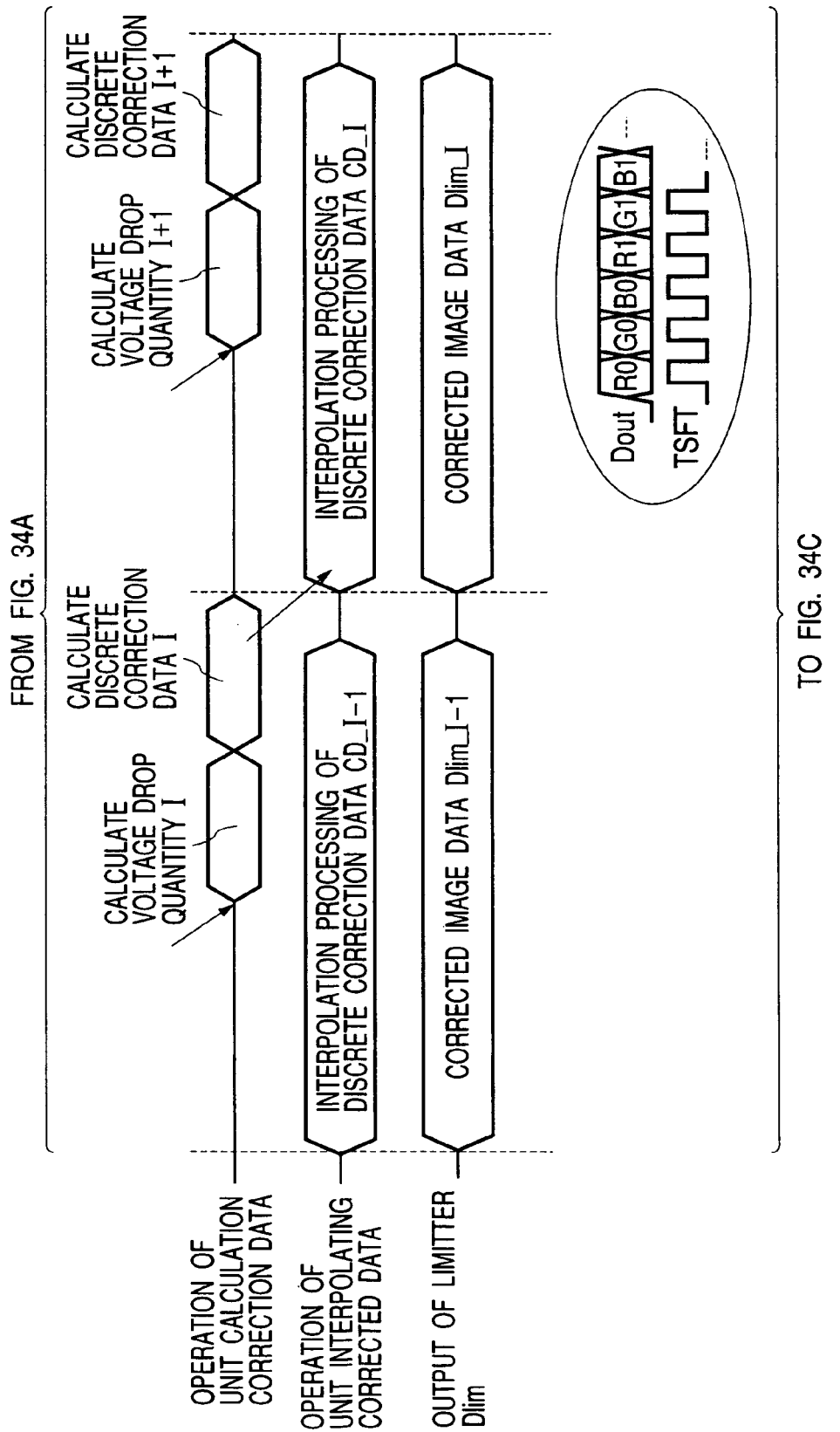

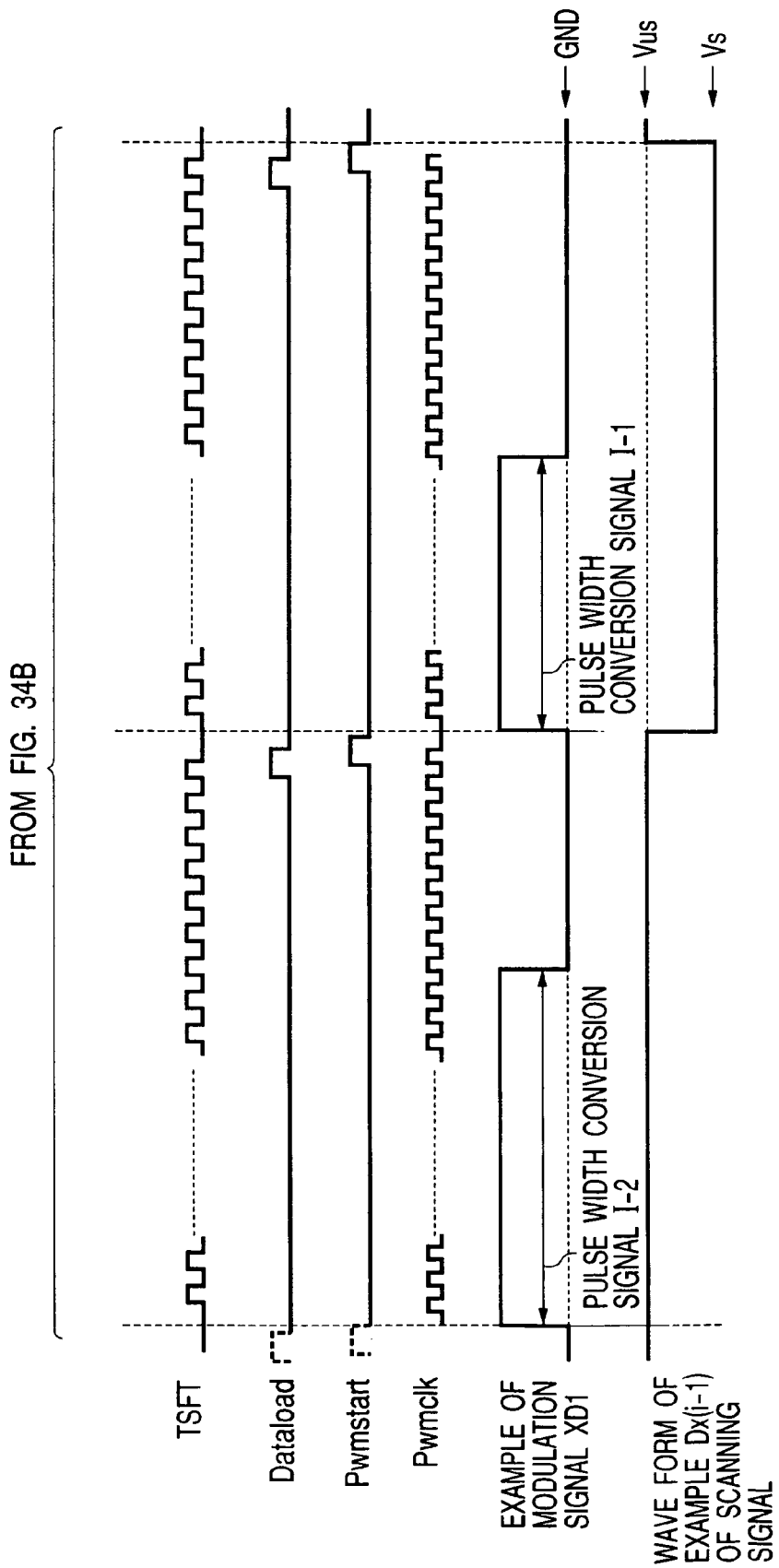

IMAGE DISPLAY APPARATUS AND IMAGE DISPLAY METHODS

This application is a division of U.S. application Ser. No. 10/299,668, filed Nov. 20, 2002, now U.S. Pat. No. 6,952,193.

BACKGROUND OF THE INVENTION

1. Field of the Invention

The present invention relates to image display apparatus such as television receivers, display devices, etc. for receiving a television signal or a display signal of a computer or the like to display an image, using a display panel equipped with a plurality of image forming devices matrix-wired, and to image display methods.

2. Related Background Art

The conventional apparatus was provided with (n×m) image forming devices arrayed in a matrix pattern as wired to m row wires and n column wires and was configured to implement sequential scanning of the row wires and modulation in the column direction, thereby driving a device group of each row simultaneously.

In the case of this driving, there occurred a voltage drop due to the electrical resistance of wiring, in the row wiring, so as to pose a problem of a defect due to decrease of the voltage placed between the two ends of the display devices.

In order to make correction for decrease of luminance due to the voltage drop caused by the wiring resistance of the electrical connection wires and others to the display devices as described above, Japanese Patent Application Laid-Open No. 08-248920 discloses the technology about the image display apparatus having a configuration of calculating correction data for the voltage drop by statistical operation and combining electron beam requirements with correction values.

The configuration of this image display apparatus described in the Japanese application is presented in FIG. 38. The configuration associated with the correction for data in this apparatus is roughly as described below. First, luminance data of one line in a digital image signal is added up at an adder 206 and a correction factor corresponding to the sum is read out of a memory 207. On the other hand, the digital image signal is subjected to serial-parallel conversion at a shift register 204, the resultant parallel signals are retained for a predetermined period of time at a latch 205, and then they are fed in predetermining timing into multipliers 208 provided for the respective column wires. At each multiplier 208 the luminance data for each column wire is multiplied by the correction data read out of the memory 207, the resultant corrected data is transferred to a modulation signal generator 209, modulation signals corresponding to the corrected data are generated at the modulation signal generator 209, and an image is displayed on a display panel on the basis of the modulation signals. This apparatus is configured to perform statistical operation processing like calculations of the sum and average for the digital image signal, e.g., the adding operation of luminance data of one line in the digital image signal at the adder 206, and make the correction based on this value.

The conventional configuration as described above, however, required the large-scale hardware including the multipliers for the respective column wires, the memory for providing the output of the correction data, the adder for supplying an address signal to the memory, and so on.

An object of the present invention is to provide image display apparatus and image display methods capable of making appropriate correction for a luminance variation and a chromaticity variation caused by a variation in driving conditions due to the electrical resistance of matrix wiring of the display panel by smaller-scale hardware.

SUMMARY OF THE INVENTION

In order to achieve the above object, an image display apparatus according to the present invention is an image display apparatus comprising:

a plurality of image forming devices connected to a plurality of row wires and column wires respectively and arranged in a matrix pattern;

scanning means connected to the row wires;

modulating means connected to the column wires;

gradation converting means for converting a gradation characteristic of input image data;

corrected image data calculating means for calculating corrected image data, which is image data after correction for influence of a voltage drop caused by a resistance of the row wires and scanning means, for an output of the gradation converting means;

the modulating means outputting modulation signals to the column wires, with entry of the corrected image data, wherein the gradation conversion characteristic is a characteristic of making correction for a light emission characteristic of the image forming devices in an absent state of the voltage drop.

Another image display apparatus of the present invention is an image display apparatus comprising:

a plurality of image forming devices connected to a plurality of row wires and column wires respectively and arranged in a matrix pattern;

scanning means connected to the row wires;

modulating means connected to the column wires;

gradation converting means for converting a gradation characteristic of input image data;

corrected image data calculating means for calculating corrected image data, which is image data after correction for influence of a voltage drop caused by a resistance of the row wires and scanning means, for an output of the gradation converting means; and amplitude adjusting means having a function of multiplying data by a factor for adjustment of the amplitude of the corrected image data so that the amplitude of the corrected image data matches an input range of the modulating means, wherein the gradation converting means has a gradation conversion characteristic corresponding to the factor, and wherein the modulating means outputs modulation signals to the column wires, with entry of the corrected image data amplitude-adjusted by the amplitude adjusting means.

Still another image display apparatus of the present invention is an image display apparatus comprising:

a plurality of electron-emitting devices connected to a plurality of row wires and column wires respectively and arranged in a matrix pattern;

scanning means connected to the row wires;

modulating means connected to the column wires;

gradation converting means for performing gradation conversion of input image data;

corrected image data calculating means for calculating corrected image data, which is image data after correction for influence of a voltage drop caused by a resistance of the row wires and scanning means, for an output of the gradation converting means; and amplitude adjusting means having a function of multiplying data by a factor for adjustment of the amplitude of the corrected image data so that the amplitude of the corrected image data matches an input range of the modulating means, in which the gradation converting means has a gradation conversion characteristic corresponding to the factor, and in which the modulating means outputs modulation signals to the column wires, with entry of the corrected image data amplitude-adjusted;

wherein with entry of nonzero, uniform image data common to all colors, a pulse width of an output pulse from the modulating means close to an output terminal of the scanning means becomes shorter than a pulse width of an output pulse from the modulating means far from the output terminal of the scanning means, and saturation characteristics of phosphors dependent upon emitted charge amounts of the electron-emitting devices are further canceled, so as to implement such driving that any image data uniform and common to all the colors is displayed at almost equal color temperature of white color, independent of emission luminance.

An image display method according to the present invention is an image display method by an image display apparatus comprising a plurality of electron-emitting devices connected to a plurality of row wires and column wires one each respectively and arranged in a matrix pattern, scanning means connected to the row wires, modulating means connected to the column wires, and phosphors opposed to the electron-emitting devices, the image display method comprising:

a step of calculating emitted charge amount requirements with correction for light emission characteristics of the phosphors against emitted charge amounts, according to image data as luminance requirements; and a step of calculating corrected image data with correction for variation of the emitted charge amounts due to influence of a voltage drop caused by a resistance of the row wires and scanning means, according to the emitted charge amount requirements calculated, wherein the modulating means applies pulse waveforms according to the corrected image data thus calculated, to the column wires.

Another image display method of the present invention is an image display method by an image display apparatus comprising a plurality of electron-emitting devices connected to a plurality of row wires and column wires one each respectively and arranged in a matrix pattern, scanning means connected to the row wires, and modulating means connected to the column wires, the image display method comprising:

a step of performing gradation conversion of canceling a light emission characteristic of the electron-emitting devices in an absent state of a voltage drop caused by a resistance of the row wires and scanning means, for input image data; and a step of making correction for influence of the voltage drop caused by the resistance of the row wires and scanning means, for an output in the step of performing the gradation conversion of canceling the light emission characteristic, wherein the modulating means applies pulse waveforms to the column wires according to an output in the step of making the correction for the influence of the voltage drop.

Still another image display method of the present invention is an image display method by an image display apparatus comprising a plurality of electron-emitting devices connected to a plurality of row wires and column wires one each respectively and arranged in a matrix pattern, scanning means connected to the row wires, and modulating means connected to the column wires, the image display method comprising:

a step of converting a gradation characteristic of input image data;

a step of making correction for influence of a voltage drop caused by a resistance of the row wires and scanning means, for an output in the step of converting the gradation characteristic, in which the modulating means applies pulse waveforms to the column wires according to an output in the step of making the correction for the influence of the voltage drop, wherein the step of making the correction for the influence of the voltage drop further comprises a step of adjusting the amplitude so that the output in the step of making the correction for the influence of the voltage drop falls within an input range of the modulating means, and wherein the step of converting the gradation characteristic is to select a portion of a characteristic of canceling a light emission characteristic of the electron-emitting devices in an absent state of the voltage drop caused by the resistance of the row wires and scanning means, according to an output in the step of adjusting the amplitude so that the output falls in the input range of the modulating means.

BRIEF DESCRIPTION OF THE DRAWINGS

FIG. 7 is a graph showing change amounts of emission currents calculated discretely;

FIGS. 8A, 8B, and 8C are diagrams for explaining another calculation method of correction data;

FIGS. 11A and 11B are diagrams for explaining an interpolation method of correction data;

FIG. 34 is comprised of FIGS. 34A, 34B and 34C showing a timing chart of the image display apparatus;

DETAILED DESCRIPTION OF THE PREFERRED EMBODIMENTS

The preferred embodiments of the present invention will be illustratively described below in detail with reference to the drawings. It is, however, noted that the scope of the invention is by no means intended to be limited to the dimensions, materials, shapes, relative locations, etc. of the components described in the embodiments unless otherwise stated in particular by specific description.

First Embodiment (General Outline)

The display apparatus in which cold-cathode devices are arranged in a passive matrix, experiences the phenomenon in which the voltage drop occurs because of currents flowing into the scanning wiring and the wiring resistance of the scanning wiring, so as to degrade the display image. Therefore, the image display apparatus according to the embodiment of the present invention is provided with a processing circuit configured to make appropriate correction for the influence of the voltage drop in the scanning wiring on the display image and substantiate it in a relatively small circuit scale.

The correction circuit is a circuit that estimates the degradation of the display image caused by the voltage drop according to the input image data, determines the correction data to correct it, and makes correction for the input image data.

Inventors conducted elaborate research on the image display apparatus of the type as described below, as the image display apparatus incorporating such a correction circuit.

The following will first describe the schematic of the display panel of the image display apparatus according to the embodiment of the present invention, the electrical connection of the display panel, the characteristics of surface conduction electron-emitting devices, a driving method of the display panel, the mechanism of the voltage drop due to the electrical resistance of the scanning wiring, and a correction method and apparatus for the influence of the voltage drop.

(Schematic of Image Display Apparatus)

Figure 1:
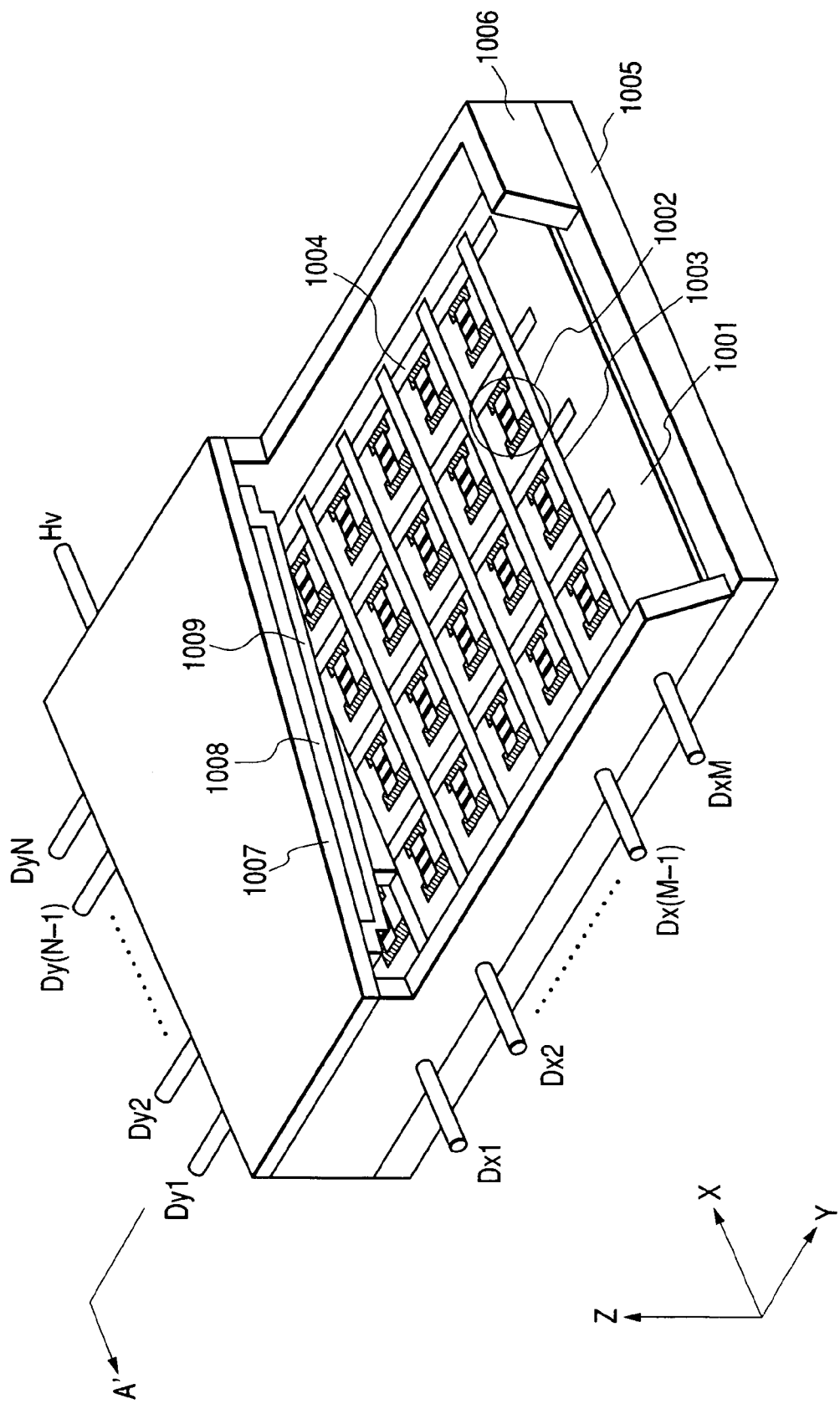
FIG. 1 is a diagram showing a schematic view of an image display apparatus according to an embodiment of the present invention.

FIG. 1 is a perspective view of the display panel used in the image display apparatus according to the present embodiment, in which part of the panel is cut away in order to show the interior structure. In the drawing, numeral 1005 designates a rear plate, 1006 a side wall, and 1007 a face plate; these members 1005 to 1007 form an airtight container for maintaining the interior of the display panel in vacuum.

Figure 2:
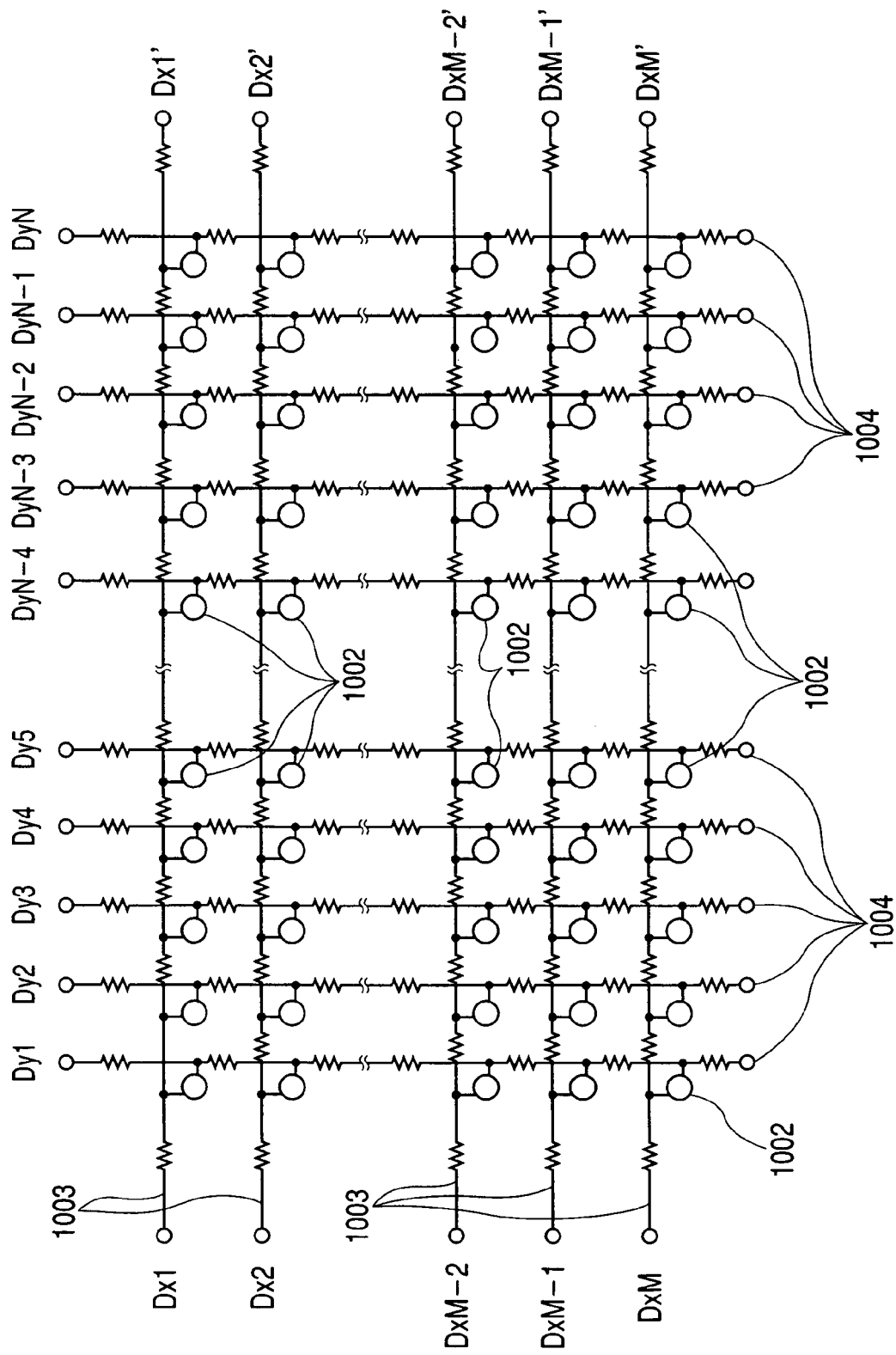
FIG. 2 is a diagram showing electrical connections of a display panel.

A substrate 1001 is fixed to the rear plate 1005, and N×M cold-cathode devices 1002 are formed on the substrate. The row wires (scanning wires) 1003, column wires (modulation wires) 1004, and cold-cathode devices are connected as shown in FIG. 2.

This wire connection structure is called a passive matrix.

A fluorescent film 1008 is formed on the bottom surface of the face plate 1007. Since the image display apparatus of the present embodiment is a color display apparatus, phosphors of the three primary colors, red, green, and blue, which are used in the field of CRT, are separately deposited in the section of the fluorescent film 1008. The phosphors are arranged to form pixels located at positions irradiated with electrons (emission currents) emitted from the cold-cathode devices and formed in a matrix pattern corresponding to the respective pixels (sub-pixels) of the rear plate 1005.

A metal back 1009 is formed on the bottom surface of the fluorescent film 1008.

Hv represents a high-voltage terminal which is electrically connected to the metal back 1009. When a high voltage is applied to the Hv terminal, a high voltage is placed between the rear plate 1005 and the face plate 1007.

The present embodiment employs surface conduction electron-emitting devices as the cold-cathode devices in the display panel as described above. It is also possible to use field emission type devices as the cold-cathode devices. The present invention can also be applied to the image display apparatus in which self-emitting devices like EL devices except for the cold-cathode devices are connected in matrix wiring and driven.

(Characteristics of Surface Conduction Electron-Emitting Devices)

Figure 3:
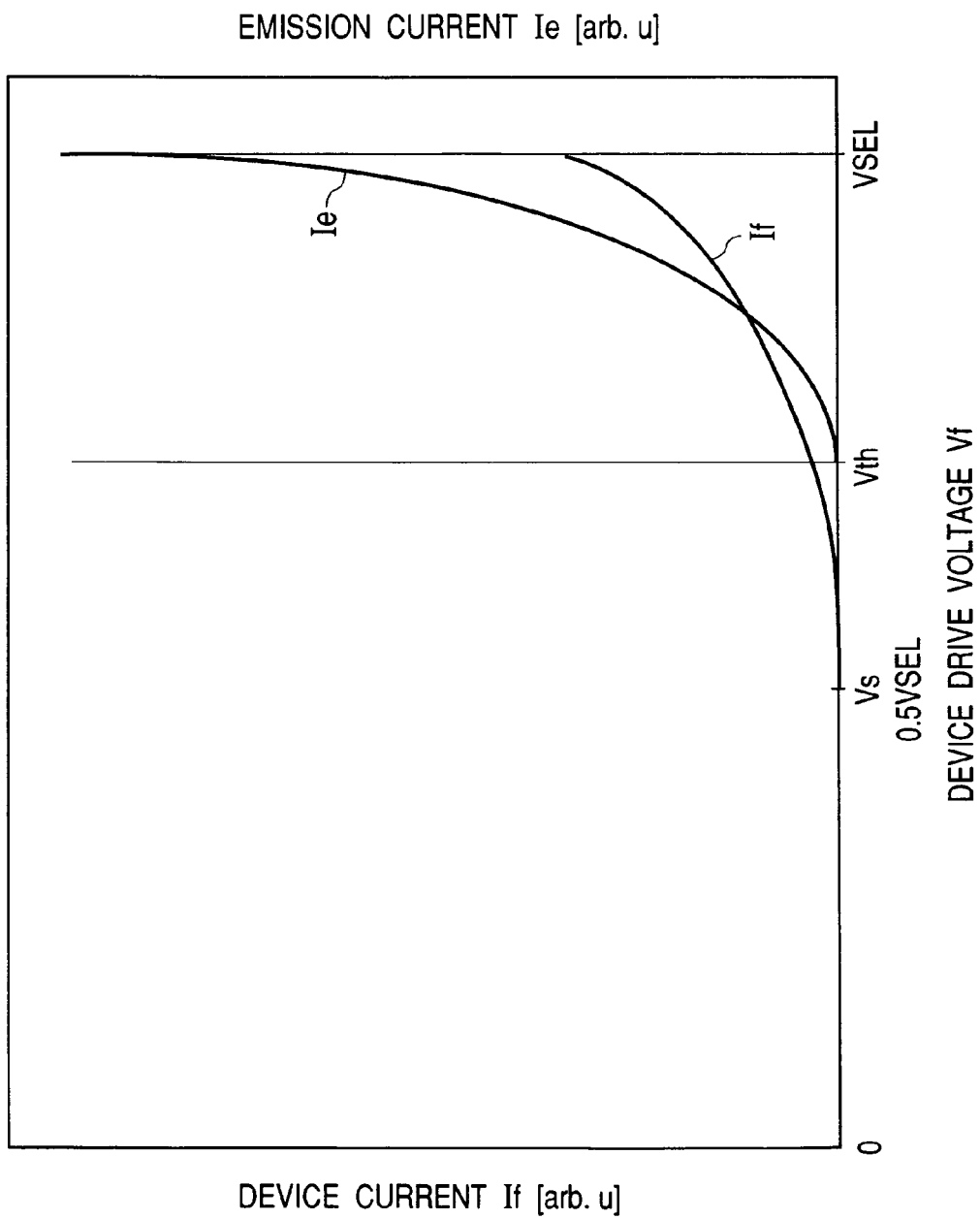
FIG. 3 is a graph showing the characteristics of surface conduction electron-emitting devices.

The surface conduction electron-emitting devices have the (emission current Ie) versus (device voltage Vf) characteristics and the (device current If) versus (device voltage Vf) characteristics as shown in FIG. 3. Since the emission current Ie is extremely smaller than the device current If and it is difficult to illustrate them in an identical scale, the two graphs are illustrated in their respective scales different from each other.

The surface conduction electron-emitting devices have the three properties, described below, as to the emission current Ie.

First, the emission current Ie quickly increases as the voltage applied to the device increases over a certain voltage (which will be called a threshold voltage Vth). On the other hand, the emission current Ie is almost zero at voltages below the threshold voltage Vth.

Namely, the devices are nonlinear devices having the distinct threshold voltage Vth against the emission current Ie.

Second, the emission current Ie varies depending upon the voltage Vf applied to the devices, and it is thus feasible to control the magnitude of the emission current Ie, by varying the voltage Vf.

Third, the cold-cathode devices have the quick response property, and it is thus feasible to control the emission time of the emission current Ie by the duration of application of the voltage Vf.

By making use of the properties as described above, it becomes feasible to suitably apply the surface conduction electron-emitting devices to the display apparatus. For example, in the image display apparatus using the display panel shown in FIG. 1, display can be implemented on the basis of sequential scanning of the display screen by making use of the first property. Namely, voltages above the threshold voltage Vth according to desired emission luminances are properly applied to devices in driving, while a voltage below the threshold voltage Vth is applied to devices in a non-selected state. By sequentially switching the driven devices, display can be implemented on the basis of sequential scanning of the display screen.

By making use of the second property, emission luminances of the phosphors can be controlled by the voltages Vf applied to the devices, thereby enabling the image display.

By making use of the third property, light emission durations of the phosphors can be controlled by durations of application of the voltages Vf to the devices, thereby enabling the display of image.

In the image display apparatus according to the embodiment of the present invention, modulation was implemented using the above third property.

(Driving Method of Display Panel)

Figure 4:
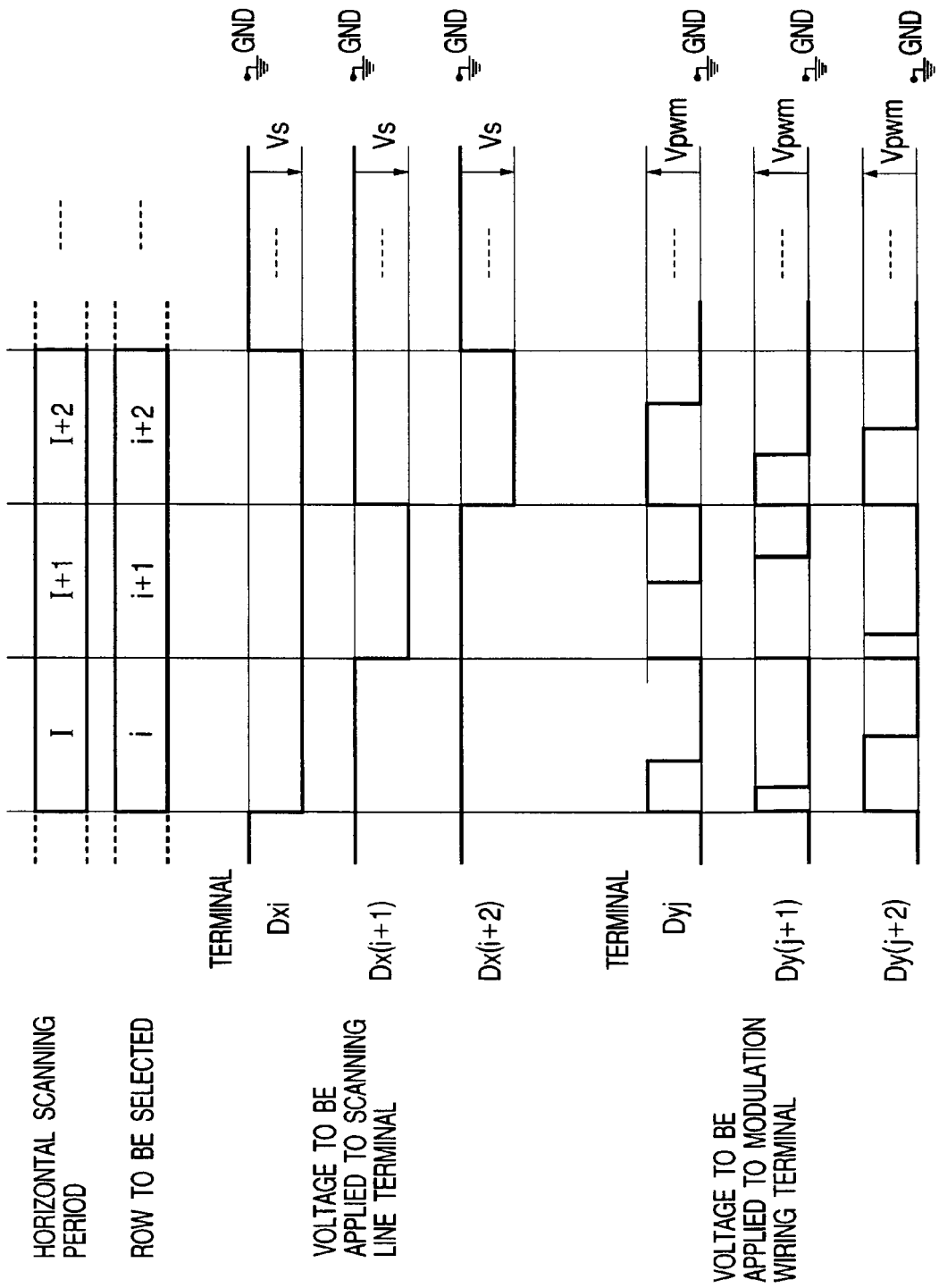
FIG. 4 is a diagram showing a driving method of the display panel.

FIG. 4 is an example of voltages applied to voltage supply terminals of scanning wires and modulation wires on the occasion of driving the display panel of the image display apparatus according to the embodiment of the present invention.

Now let us suppose that a horizontal scanning period I stands for a duration of light emission from pixels in the ith row.

For light emission from the pixels in the ith row, the scanning wire of the ith row is brought into a selected state and a selection potential Vs is impressed to its voltage supply terminal D×i. The voltage supply terminals D×k (k=1, 2, ... N, provided that k ≠i) of the other scanning wires are in a non-selected state and a non-selection potential Vns is impressed thereto.

In the present example, the selection potential Vs is set at $-0.5 V_{SEL}$, which is half of the voltage $V_{SEL}$ illustrated in FIG. 3, and the non-selection potential Vns is the GND potential.

Pulse width modulation signals with the voltage amplitude Vpwm are supplied to the voltage supply terminals of the modulation wires. Conventionally, in the case of no correction being made, a pulse width of a pulse width modulation signal supplied to the jth modulation wire was determined according to the size of image data for the pixel of the ith row and the jth column in the display image, and pulse width modulation signals according to sizes of image data of the respective pixels were supplied to all the modulation wires.

In the embodiment of the present invention, as described later, in order to make correction for the lowering of luminance due to the influence of the voltage drop, a pulse width of a pulse width modulation signal supplied to the jth modulation wire is determined according to the size of image data for the pixel of the ith row and the jth column in the display image and a correction amount therefor, and pulse width modulation signals thus determined are supplied to all the modulation wires.

In the present embodiment, the voltage Vpwm is set at +0.5 $V_{SEL}$.

The surface conduction electron-emitting devices emit electrons during application of the voltage $V_{SEL}$ at the both ends of the devices, but emit no electron during application of any voltage smaller than Vth, as shown in FIG. 3.

There is also such a feature that the voltage Vth is larger than 0.5 $V_{SEL}$, as shown in FIG. 3.

For this reason, the surface conduction electron-emitting devices connected to the scanning wires under application of the non-selection potential Vns emit no electron.

Similarly, during a period in which the output of the pulse width modulator is the ground potential (which will be hereinafter referred to as a period of output "L"), the voltage applied to the two ends of each surface conduction electron-emitting device on the selected scanning wire is Vs, so that no electron is emitted therefrom.

Each surface conduction electron-emitting device on a scanning wire to which the selection potential Vs is applied, emits electrons according to a period in which the output of the pulse width modulator is Vpwm (which will be hereinafter referred to as a period of output "H"). When electrons are emitted, the corresponding phosphor described previously emits light according to the amount of the beam of emitted electrons, so that light emission can be implemented at a luminance according to the duration of electron emission.

The image display apparatus according to the embodiment of the present invention displays an image by the line sequential scanning and pulse width modulation as described above.

(Voltage Drop in Scanning Wiring)

As described above, the essential problem of the image display apparatus is that the voltage drop in the scanning wiring of the display panel increases the potential on the scanning wiring, so as to decrease the voltage applied to each surface conduction electron-emitting device and thus lower the emission current from the surface conduction electron-emitting device. The mechanism of this voltage drop will be described below.

Although it may differ depending upon design specifications and production processes of the surface conduction electron-emitting devices, the device current from one of the surface conduction electron-emitting devices is approximately several hundred μA during application of the voltage $V_{SEL}$.

For this reason, in the case where only one pixel on a scanning line selected in a certain horizontal scanning period is made to emit light while the other pixels are kept off, the device current flowing from the modulation wire into the scanning wire of the selection row is just the current of one pixel (i.e., aforementioned several hundred µA), and the voltage drop is almost zero, so as to cause no decrease of emission luminance.

However, in the case where all the pixels in a selected row are made to emit light in a certain horizontal scanning period, currents of all the pixels flow from all the modulation wires into the scanning wire in the selected state, so that the total current becomes several hundred mA to several A, which used to cause the voltage drop on the scanning wire because of the wiring resistance of the scanning wire.

When the voltage drop occurs on the scanning wire, voltages applied to the two ends of the surface conduction electron-emitting devices are lowered. This resulted in decreasing the emission currents from the surface conduction electron-emitting devices, so as to decrease the emission luminances.

To make matters more complex, the voltage drop has the nature that the magnitude thereof also varies even during one horizontal scanning period because of the modulation based on the pulse width modulation.

Let us consider a case where the pulse width modulation signals supplied to the respective columns are those with pulse widths depending upon sizes of data and with a synchronized rise, for the input data as shown in FIG. 4. In this case, it is general, though it depends upon the input image data, that within one horizontal scanning period, the number of lighted pixels increases toward immediately after the rise of pulses and the number of lighted pixels decreases with time within one horizontal scanning period, because the pixels become unlighted in order from the lowest luminance part after the rise.

Accordingly, the magnitude of the voltage drop on the scanning wire is the greatest in the initial part of one horizontal scanning period and tends to decrease gradually thereafter.

Since outputs of pulse width modulation signals vary at time intervals corresponding to respective gradation levels of modulation, the voltage drop also changes with time at time intervals equivalent to the respective gradation levels of the pulse width modulation signals.

The above described the voltage drop on the scanning wiring.

(Calculation Method of Voltage Drop)

The following will detail a method of making correction for the influence of the voltage drop.

The first step necessary for determining correction amounts for reducing the influence of the voltage drop is to develop hardware capable of estimating the magnitude of the voltage drop and the temporal change thereof in real time.

However, the display panel of the image display apparatus as in the present invention generally has several thousand modulation wires and it is very difficult to calculate voltage drops at intersections between all the modulation wires and a scanning wire. Therefore, it is not so practical to fabricate hardware for calculating them in real time.

Thus the voltage drop amounts are determined by grouping the devices into blocks as to positions on the same row and also grouping image data into blocks as to amplitudes thereof.

This grouping into blocks is based on the following features of the voltage drops.

i) At a certain point of time in one horizontal scanning period, the voltage drops appearing on the scanning wire are spatially continuous amounts on the scanning wire and are represented by a very smooth curve.

ii) The magnitudes of voltage drops, which differ depending upon the display image, vary at time intervals equivalent to the respective gradation levels of the pulse width modulation; schematically, they are large at the rise of pulses, and they gradually decrease with time or are maintained.

Namely, in the driving method as shown in FIG. 4, the magnitudes of voltage drops never increase within one horizontal scanning period.

Specifically, the time change of voltage drops was schematically estimated by calculating the voltage drops at a plurality of times on the basis of a degenerate model described below.

(Calculation of Voltage Drops by Degenerate Model)

Figure 5A:
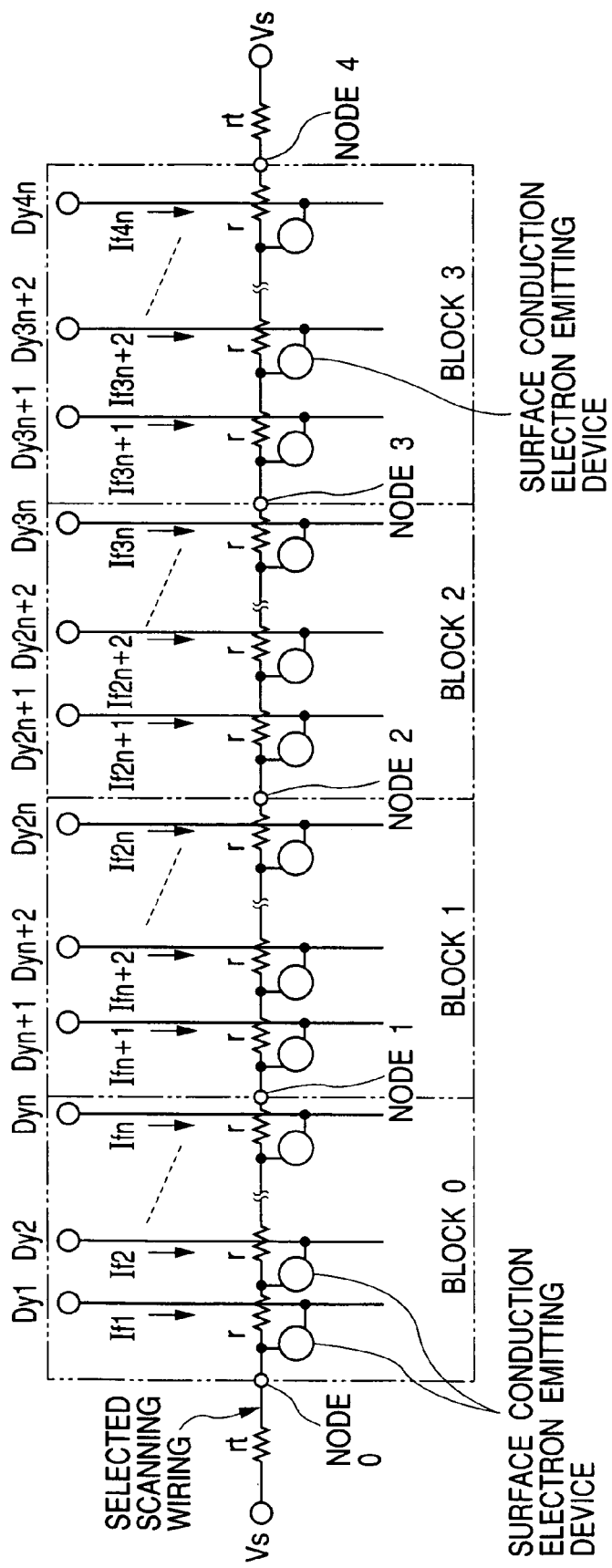
FIGS. 5A, 5B, and 5C are diagrams for explaining a degenerate model.

FIG. 5A is a diagram for explaining blocks and nodes employed in degeneration.

For simplicity of illustration, FIG. 5A shows only a selected scanning wire, modulation wires, and surface conduction electron-emitting devices coupled at intersections between the wires.

It is assumed herein that the present time is a certain time in one horizontal scanning period and lighting conditions of the respective pixels on the selected scanning wire (i.e., whether the output of the modulator is "H" or "L" for each device) are known.

In this lighting state, device currents flowing from the respective modulation wires into the selected scanning wire are defined as Ifi (i=1, 2, . . . . N, where i represents a column number).

As shown in the same figure, a block is defined as one group including n modulation wires, a portion of the selected scanning wire intersecting therewith, and surface conduction electron-emitting devices placed at intersections between them. In the present example, the part of interest was divided into four blocks by grouping into blocks.

Positions denoted by nodes are defined at the boundary positions of the respective blocks. The nodes are horizontal positions (reference points) for discretely calculating the voltage drop amounts appearing on the scanning wire in the degenerate model.

In the present example five nodes, node 0 to node 4, are set at the boundary positions of the blocks.

Figure 5B:
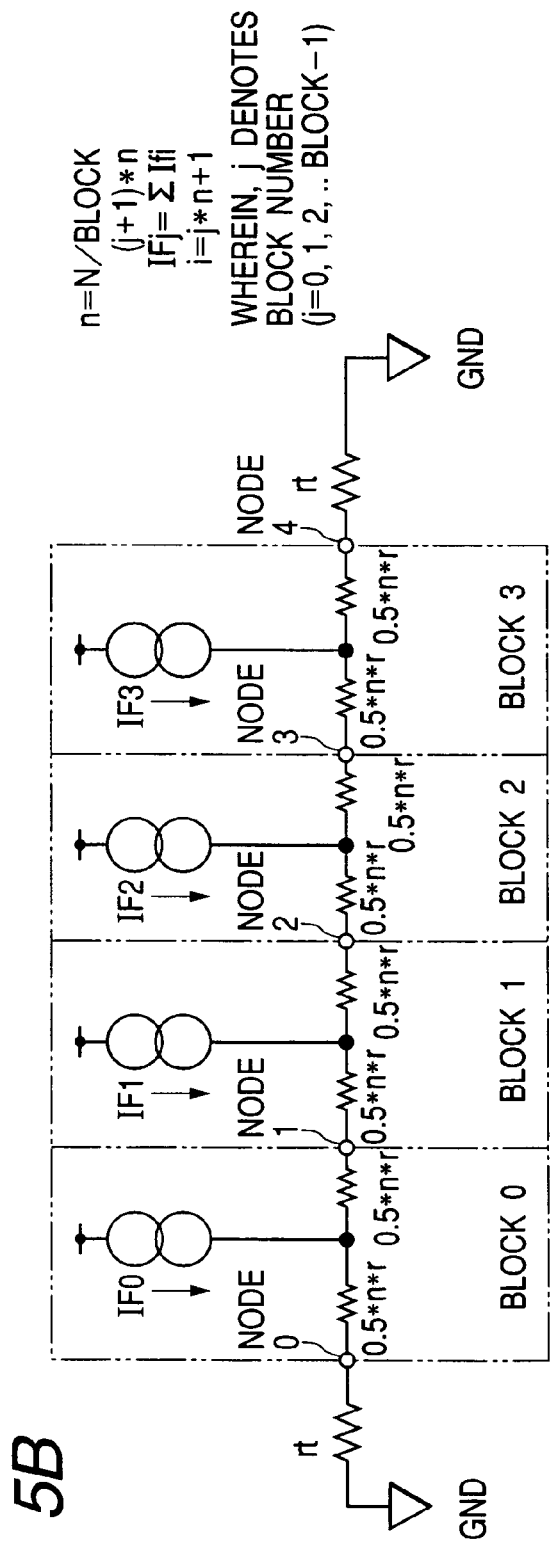

FIG. 5B is a diagram for explaining the degenerate model.

In the degenerate model n modulation wires included in one block in FIG. 5A are degenerated into one, and one degenerate modulation wire is connected so as to be located in the center of each block of the scanning wire.

It is assumed that a current source is connected to a modulation wire of each degenerate block and summations IF0-IF3 of currents in the respective blocks flow from the respective current sources into the modulation wires.

Namely, IFj (j=0, 1, . . . 3) represents the electric current expressed by the equation below.

$$IFj = \sum_{i=j \times n+1}^{(j+1) \times n} Ifi \quad \text{(Eq 1)}$$

The potential at the both ends of the scanning wire is Vs in the example of FIG. 5A, whereas it is the GND potential in FIG. 5B. The reason for it is that in the degenerate model the electric currents flowing from the modulation wires into the selected scanning wire are modeled by the above current sources and thus the voltage drop amounts of the respective portions on the scanning wire can be calculated by determining voltages (potential differences) of the respective portions with respect to the power supply part at the reference (GND) potential.

Namely, the ground potential is defined as a reference potential in calculation of voltage drops.

The reason why the surface conduction electron-emitting devices are omitted is that, as far as the selected scanning wire is concerned, the presence or absence of the surface conduction electron-emitting devices makes no change in the appearing voltage drops themselves if equivalent electric currents flow from the column wires. Therefore, the surface conduction electron-emitting devices are omitted herein while the values of currents flowing from the current sources of the respective blocks are set at the current values (Eq 1) equal to the summations of the device currents in the respective blocks.

A wiring resistance of the scanning wire of each block is defined as n times a wiring resistance r of the scanning wire in one interval (one interval herein refers to a zone between an intersection of the scanning wire with a certain column wire and an intersection of the scanning wire with a column wire adjacent thereto and it is also assumed in the present example that the wiring resistance of the scanning wire is uniform throughout each interval).

In the degenerate model described above, the voltage drop amounts DV0 to DV4 appearing at the respective nodes on the scanning wire can be readily calculated by equations below in the form of sum of products.

$$DV0 = a00 \times IF0 + a01 \times IF1 + a02 \times IF2 + a03 \times IF3$$

$$DV1 = a10 \times IF0 + a11 \times IF1 + a12 \times IF2 + a13 \times IF3$$

$$DV2 = a20 \times IF0 + a21 \times IF1 + a22 \times IF2 + a23 \times IF3$$

$$DV3 = a30 \times IF0 + a31 \times IF1 + a32 \times IF2 + a33 \times IF3$$

$$DV4 = a40 \times IF0 + a41 \times IF1 + a42 \times IF2 + a43 \times IF3$$

Namely, the following equation holds $$DVi = \sum_{j=0}^{3} aij \times IFj \quad \text{(Eq 2)}$$

(i=0, 1, 2, 3, or 4)

In the above equation, aij represents a voltage appearing at the ith node when a unit current is injected into only the jth block in the degenerate model (which will be defined hereinafter as aij).

The above aij is derived by the Kirchhoff's law and the result of the calculation thereof once performed can be stored in the form of a table.

Furthermore, the approximation as expressed by Eq 4 below is effected for the summation currents IF0-IF3 of the respective blocks defined in Eq 1.

$$IFj = \sum_{i=j \times n+1}^{(j+1) \times n} Ifi = IFS \times \sum_{i=j \times n+1}^{(j+1) \times n} Count\ i \quad \text{(Eq 4)}$$

In the above equation, Count i represents a variable that takes 1 when the ith pixel on the selected scanning line is in a lighted state and that takes zero when the ith pixel is in an unlighted state.

IFS indicates a quantity obtained by multiplying a device current IF flowing during application of the voltage $V_{SEL}$ at the two ends of one of the surface conduction electron-emitting devices, by a factor α taking a value between 0 and 1.

Namely, it is defined as follows.

$$IFS = \alpha \times IF \quad \text{(Eq 5)}$$

Eq 4 is based on the assumption that a device current proportional to the number of lighting devices in each block flows from a column wire of the block into the selected scanning wire. The following is the reason why the product of the device current IF of one device and the coefficient α is defined as the device current IFS of one device. In order to calculate a voltage drop amount, it is originally necessary to repeatedly calculate a voltage increase of the scanning wire due to a voltage drop and a decrease amount of the device current caused thereby, but it is not practical to perform this convergence calculation by hardware. Therefore, the present invention employs approximate αIF as a convergence value of IF. Specifically, the factor is determined as follows: preliminarily estimated are a decrease rate of IF at the maximum voltage drop amount (with all devices turn-on) (=α1) and a decrease rate of IF at the minimum voltage drop amount (minimum=0) (=α2); and it is then determined as an average of α1 and α2 or as 0.8×α1.

Figure 5C:
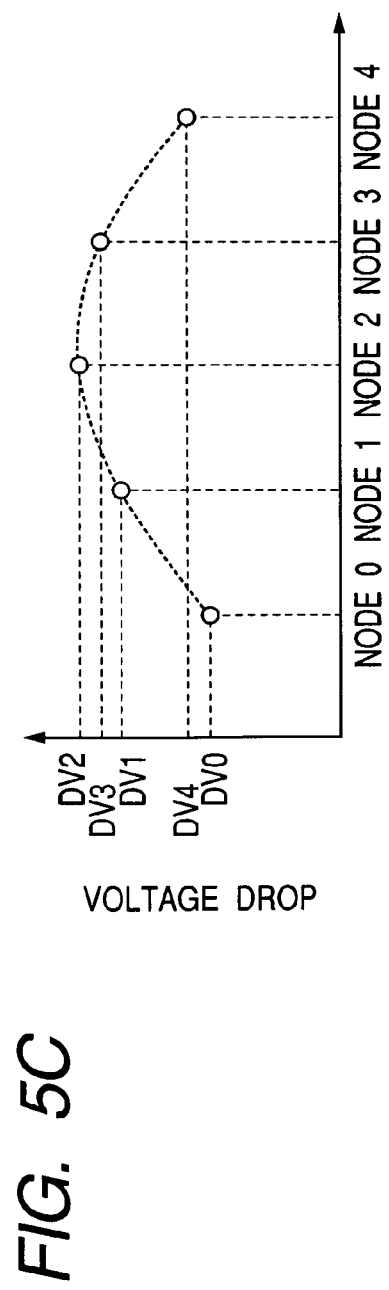

FIG. 5C is an example of the result of calculation of voltage drop amounts DV0-DV4 at the respective nodes by the degenerate model, in a certain lighting state.

Since the voltage drop is given by a very smooth curve, the voltage drop between nodes is assumed to take approximate values as indicated by a dotted line in the drawing.

As described above, the use of the present degenerate model permits the voltage drop to be calculated at the positions of the nodes and at any desired point of time for the input image data.

As described above, the voltage drop amounts in a certain lighting state are simply calculated using the degenerate model.

The voltage drop appearing on the selected scanning wire varies with time in one horizontal scanning period, and this temporal change was estimated in such a manner that lighting states were determined at several points of time in one horizontal scanning period, as described previously, and voltage drops in the respective lighting states were determined using the degenerate model.

The number of lighting devices in each block at a certain point of time in one horizontal scanning period can be readily determined by making reference to the image data of each block.

Let us suppose here that the bit count of input data into the pulse width modulator is 8 bits as an example and the pulse width modulator provides outputs of pulse widths according to sizes of the input data.

Namely, it is assumed that with the input data of 0, the output is "L"; with the input data of 255, the output is "H" throughout one horizontal scanning period; with the input data of 128, the output is "H" during the first half of one horizontal scanning period and "L" during the second half.

In this case, the number of lighting devices at the time of the start of pulse width modulation signals (at the time of the rise in the example of the modulation signals in the present example) can be readily detected by counting the input data into the pulse width modulator greater than 0.

Likewise, the number of lighting devices at the time of the middle of one horizontal scanning period can be readily detected by counting the input data into the pulse width modulator greater than 128.

In this way the number of lighting devices at an arbitrary time can be readily calculated by comparing the image data with a certain threshold in a comparator and counting true outputs of the comparator.

For simplification of the description hereinafter, let us define a time slot as a time quantity.

Namely, the time slot indicates a time from the rise of the pulse width modulation signals in one horizontal scanning period, and the time slot=0 is defined as one indicating a time immediately after the time of the start of a pulse width modulation signal.

The time slot=64 is defined as a time elapsed for a duration of sixty four gradation levels from the time of the start of a pulse width modulation signal.

The present example provided the example in which the pulse widths were modulated with respect to the reference at the time of the rise. It is needless to mention that the present invention can also be similarly applied to the case where the pulse widths are modulated with respect to the reference at a time of a fall of pulses, though the advancing direction of the time axis becomes reverse to the advancing direction of the time slot.

(Calculation of Correction Data from Voltage Drop Amounts)

As described above, we succeeded in approximately and discretely calculating the temporal change of the voltage drop during one horizontal scanning period by the iterative calculation using the degenerate model.

Figure 6:
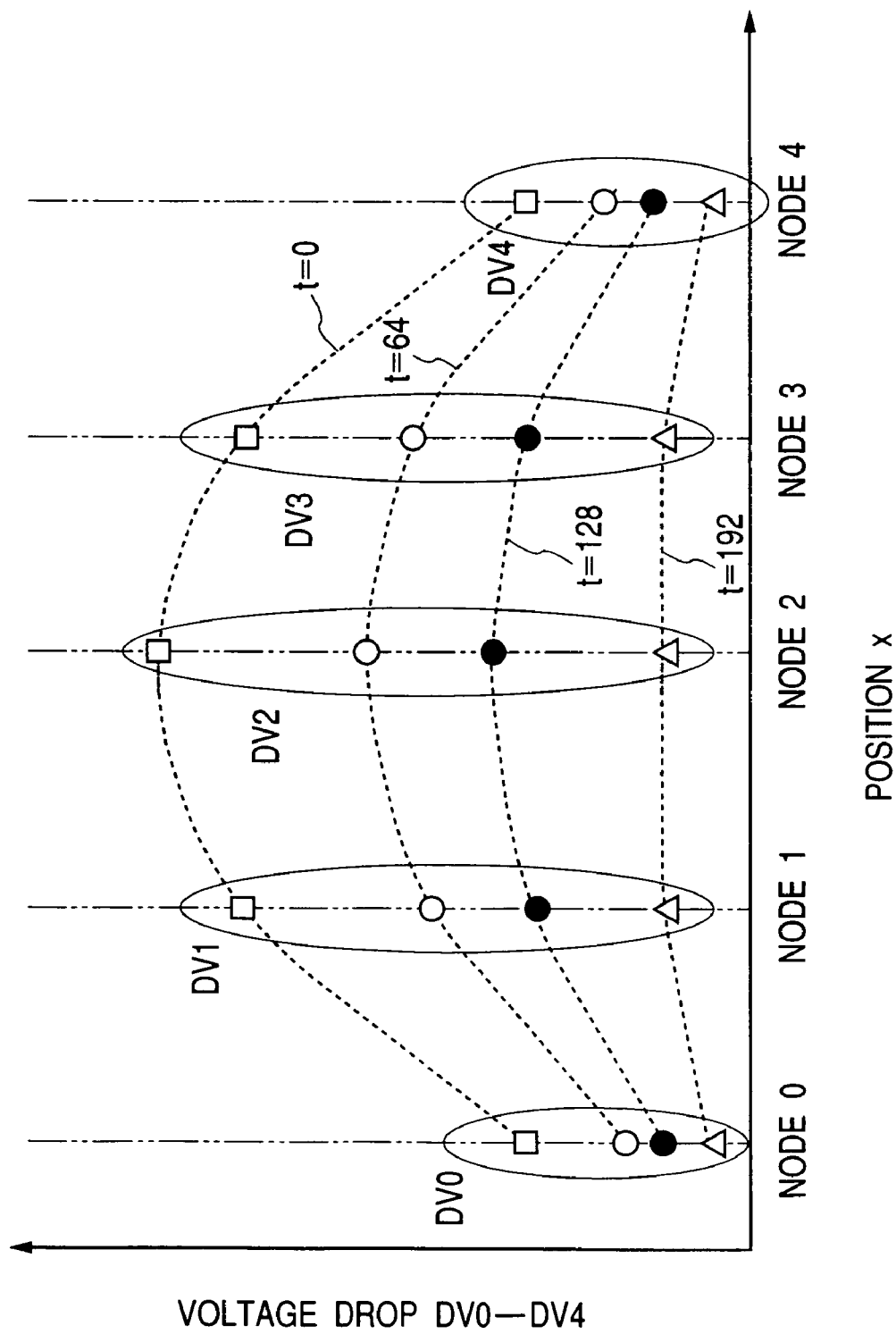
FIG. 6 is a graph showing voltage drop amounts calculated discretely.

FIG. 6 is an example in which the temporal change of the voltage drop on the scanning wire was calculated on the basis of the iterative calculation of voltage drop for certain image data. (It is noted that the voltage drop and the temporal change thereof presented herein are just an example for certain image data and it is a matter of course that the voltage drop for another image data demonstrates another change.)

FIG. 6 shows the result of calculation in which the voltage drop amounts at the respective times were discretely calculated by applying the degenerate model to each of four time points of time slots=0, 64, 128, and 192.

In FIG. 6 the voltage drop amounts at the respective nodes are connected by dotted lines, and it is noted that the dotted lines are presented for a better look of illustration. In fact, the voltage drop amounts calculated by the degenerate model were discretely calculated at the positions of each node as indicated by □, ○, ●, and Δ.

Inventors conducted research on a method of calculating the correction data for correction for image data from the voltage drop amounts, as the next stage after the implementation of calculation of the magnitude and temporal change of voltage drop.

FIG. 7 is a graph of estimated amounts of emission current emitted from the surface conduction electron-emitting devices in the lighted state under the condition that the voltage drop shown in FIG. 6 occurred on the selected scanning wire.

The vertical axis indicates an amount of emission current at each time and at each position in percentage with respect to 100% as an amount of emission current emitted in the case of no voltage drop, and the horizontal axis the horizontal position.

As shown in FIG. 7, let us define emission currents at the horizontal position of node 2 (reference point) as follows:

Ie0: emission current at the time slot=0;
Ie1: emission current at the time slot=64;
Ie2: emission current at the time slot=128;
Ie3: emission current at the time slot=192.

FIG. 7 shows the result of calculation from the graphs of the voltage drop amounts of FIG. 6 and the "drive voltage-emission current" of FIG. 3. Specifically, it is a mechanical plot of values of emission current during application of voltages obtained by subtracting the voltage drop amounts from the voltage $V_{SEL}$.

Accordingly, FIG. 7 consistently shows the currents emitted from the surface conduction electron-emitting devices in the lighted state, and the surface conduction electron-emitting devices in the unlighted state emit no current.

The following will describe a method of calculating the correction data for correction for image data from the voltage-drop amounts.

(Correction Data Calculating Method)

FIGS. 8A, 8B, and 8C are diagrams for explaining a method of calculating correction data of a voltage drop amount from the temporal change of emission current shown in FIG. 7. These figures show an example of the calculation of the correction data for the image data in the size of 64.

The quantity of emitted light with a luminance is nothing but the amount of emitted charge which is obtained by integrating the emission current during an emission current pulse over time. For considering variation of luminance due to the voltage drop, therefore, the description hereinafter will be given on the basis of the amount of emitted charge.

Let IE be an emission current in the case of no influence of the voltage drop, and Δt be a time equivalent to one gradation level of the pulse width modulation. Then an emitted charge amount Q0 of charge to be emitted by an emission current pulse for the image data of 64 can be expressed as follows by multiplying the amplitude IE of the emission current pulse by the pulse width (64×Δt).

$$Q0 = IE \times 64 \times \Delta t \quad \text{(Eq 6)}$$

In practice, however, there occurs the phenomenon of decrease of emission current due to the voltage drop on the scanning wire.

The emitted charge amount with the emission current pulse taking account of the influence of the voltage drop can be calculated approximately as follows. Namely, let Ie0 and Ie1 be emission currents in the respective time slots=0 and 64 at the node 2, and let us assume that the emission current between 0 and 64 is approximated so as to linearly change between Ie0 and Ie1. Then the emitted charge amount Q1 during this period is given by the area of the trapezoid shown in FIG. 8B.

Namely, it can be calculated as follows.

$$Q1 = (Ie0 + Ie1) \times 64 \times \Delta t \times 0.5 \quad \text{(Eq 7)}$$

Let us then suppose that, as shown in FIG. 8C, the influence of the voltage drop was successfully eliminated when the pulse width was extended by DC1 in order to make correction for the decrease of the emission current due to the voltage drop.

It is considered that the emission current amount in each time slot varies when the pulse width is extended for the correction for the voltage drop. For simplification, however, it is assumed herein that the emission current is Ie0 in the time slot=0 and the emission current Ie1 in the time slot=(64+DC1), as shown in FIG. 8C.

An approximation is also made so that the emission current between the time slot 0 and the time slot (64+DC1) takes values on a straight line connecting the emission currents at the two points.

Then, an emitted charge amount Q2 with an emission current pulse after the correction can be calculated as follows.

$$Q2 = (Ie0 + Ie1) \times (64 + DC1) \times \Delta t \times 0.5 \quad \text{(Eq 8)}$$

By equating this to aforementioned Q0, we obtain the following.

$$IE \times 64 \times \Delta t = (Ie0 + Ie1) \times (64 + DC1) \times \Delta t \times 0.5$$

By solving this with respect to DC1, we obtain the following.

$$DC1 = ((2 \times IE - Ie0 - Ie1)/(Ie0 + Ie1)) \times 64 \quad \text{(Eq 9)}$$

In this way, the correction data was calculated for the case of the image data being 64.

Namely, for the image data in the size of 64 at the position of the node 2, the correction amount CData to be added can be given by CData=DC1, as represented by Eq 9.

Figure 9A:
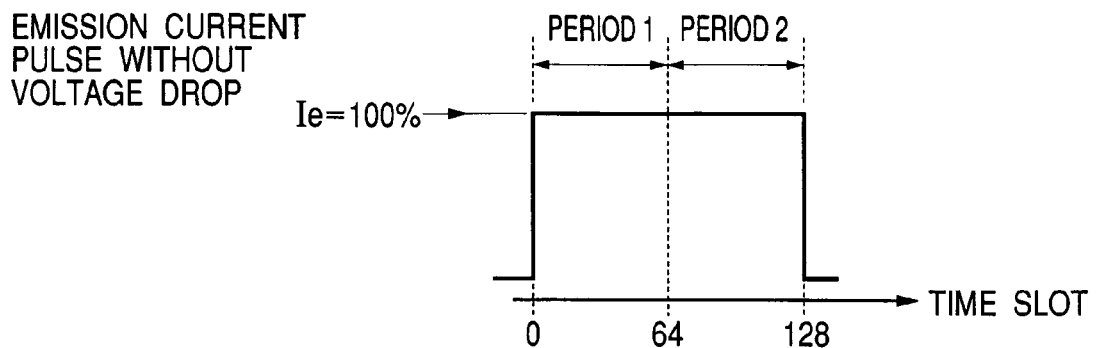
FIGS. 9A, 9B, and 9C are diagrams showing a calculation example of correction data in the case where the size of image data is 128.
Figure 9B:
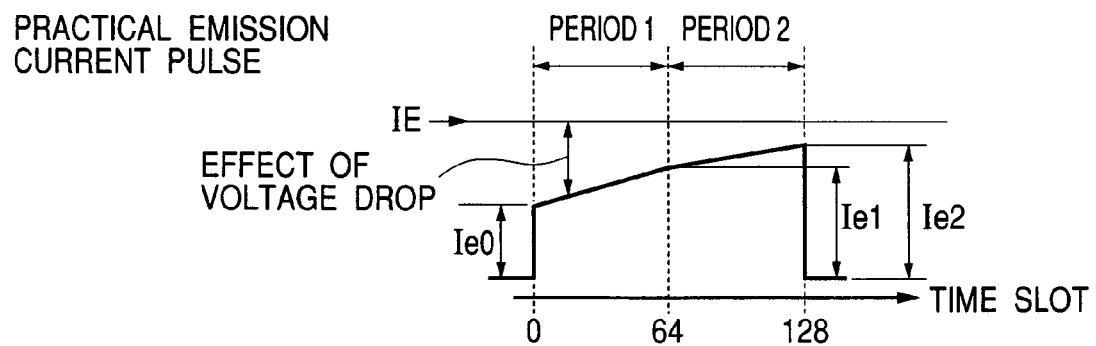
Figure 9C:
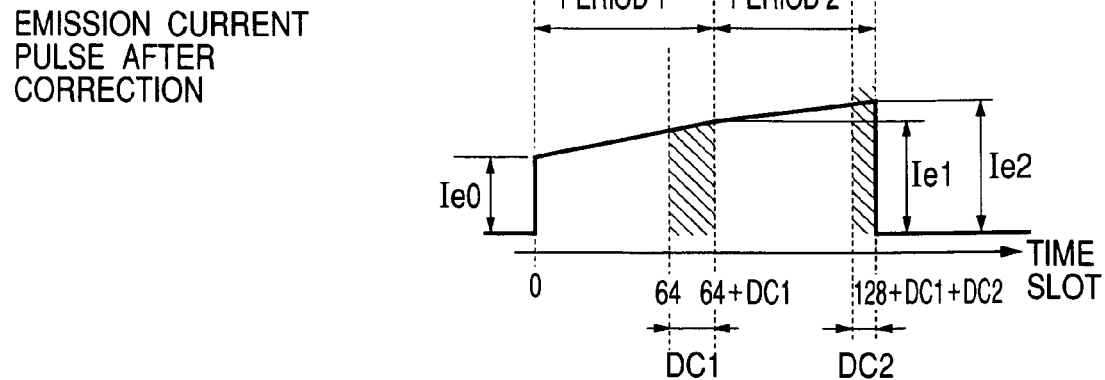
Figure 10A:
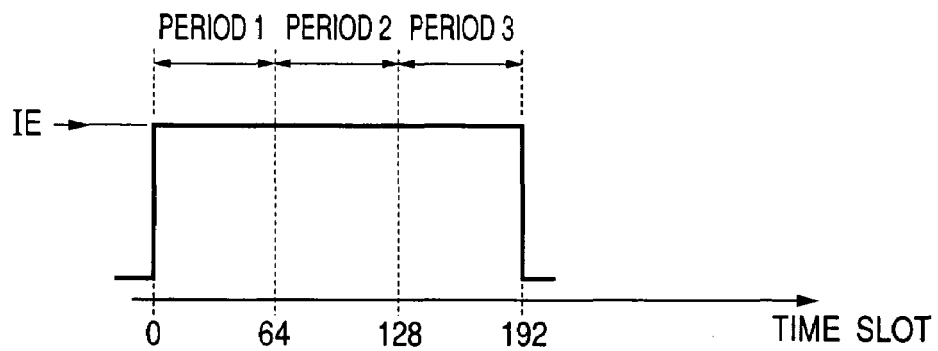
FIGS. 10A, 10B, and 10C are diagrams showing a calculation example of correction data in the case where the size of image data is 192.
Figure 10B:
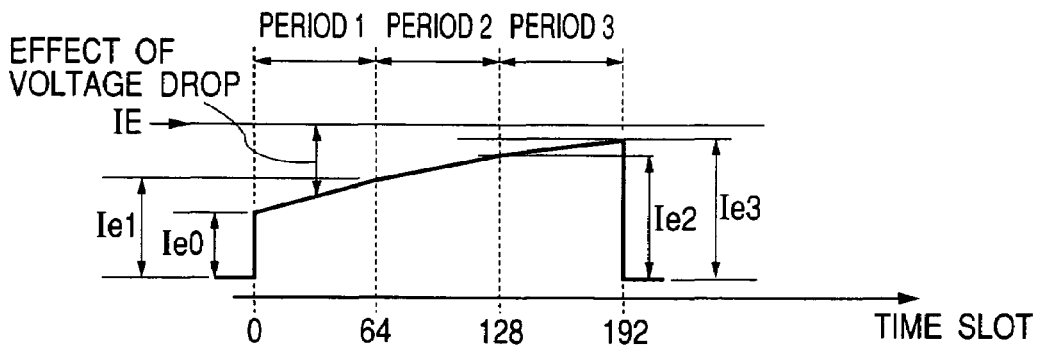
Figure 10C:
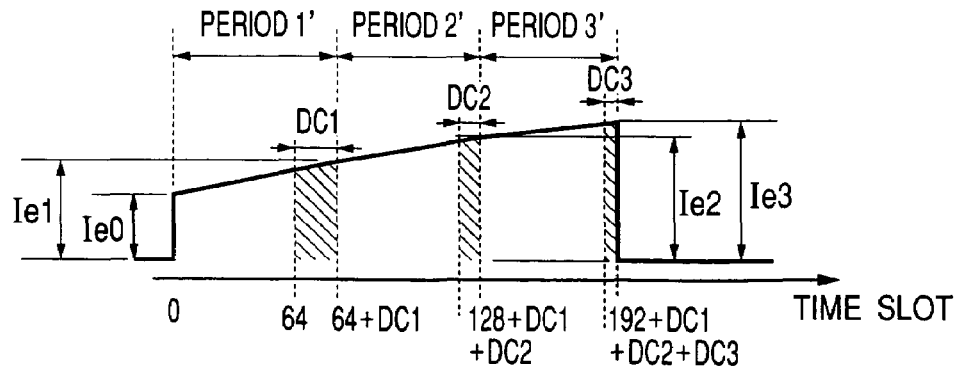

Likewise, a correction amount can be determined for each of two periods, as shown in FIGS. 9A to 9C, for the image data in the size of 128, and a correction amount can be determined for each of three periods, as shown in FIGS. 10A to 10C, for the image data in the size of 192.

Since the influence of the voltage drop on the emission current is, of course, null with the pulse width of 0, the correction data was set as 0 and the correction data CData to be added to the image data was also set as 0.

The reason why the correction data was calculated for discrete image data like 0, 64, 128, and 192 as described above, is that it can reduce the calculation amount.

FIG. 11A shows an example of discrete correction data for certain input image data, which was obtained by the present method. In the same figure the horizontal axis represents the horizontal display position and the positions of the respective nodes are illustrated. The vertical axis represents the size of correction data.

The discrete correction data was calculated at the positions of the nodes and for the sizes of the image data Data (image data reference values=0, 64, 128, and 192) as indicated by □, ○, ●, and Δ in the drawing.

(Interpolation Method of Discrete Correction Data)

The correction data discretely calculated is discrete data at the positions of the respective nodes, and does not give correction data at an arbitrary horizontal position (column wiring number). At the same time as it, the correction data is data for image data in several predetermined sizes of reference values of image data at each node position, but does not give correction data according to the actual sizes of image data.

Then Inventors calculated the correction data fitting sizes of input image data in the respective column wires by interpolation of the discretely calculated correction data.

FIG. 11B is a diagram showing a method of calculating the correction data for the image data Data at x located between the node n and the node (n+1).

As a premise, the correction data has already discretely been calculated at the positions Xn and Xn+1 of the node n and the node n+1.

It is also assumed that the input image data Data takes values between the image data reference values Dk and Dk+1.

Letting CData [k][n] be the discrete correction data for the reference value of the kth image data at the node n, the correction data CA for the pulse width Dk at the position x can be calculated as follows by linear approximation, using the values of CData [k] [n] and CData [k] [n+1].

Namely, the correction data CA is given as follows.

$$CA = \frac{(Xn+1-x) \times CData[k][n] + (x-Xn) \times CData[k][n+1]}{Xn+1-Xn} \quad \text{(Eq 17)}$$

In this equation, Xn and Xn+1 indicate the horizontal display positions of the respective nodes n and (n+1), which are constants settled in the determination of the aforementioned blocks.

The correction data CB for the image data Dk+1 at the position x can be calculated as follows.

Namely, the correction data CB is given by the following equation.

$$CB = \frac{(Xn+1-x) \times CData[k+1][n] + (x-Xn) \times CData[k+1][n+1]}{Xn+1-Xn} \quad \text{(Eq 18)}$$

By linear approximation with the correction data CA and CB, the correction data CD for the image data Data at the position x can be calculated as follows.

Namely, the correction data CD is given by the following equation.

$$CD = \frac{CA \times (Dk+1-\text{Data}) + CB \times (\text{Data}-Dk)}{Dk+1-Dk} \quad \text{(Eq 19)}$$

As described above, the correction data matching the actual positions and sizes of image data can be readily calculated from the discrete correction data by the method as described by Eq 17 to Eq 19.

The dashed lines connecting the nodes in FIG. 11A are the results of interpolation from the discrete correction data by the above calculation. As seen from the figure, the voltage drop correction method of the present invention results in yielding the same correction data for all the positions x (also including the correction data of 0, of course), because there occurs no-voltage drop in the case of the image data of 0; and it results in obtaining the correction data in a gently-curved distribution for the positions x, i.e., the horizontal direction of the screen in the case of the same image data being not equal to 0. It is, however, noted that, in the case of the scanning lines being directed in the perpendicular direction in the screen, the correction data is one in a gently curved distribution in the perpendicular direction in the screen.

By correcting the image data by adding the correction data thus calculated, to the image data and effecting the pulse width modulation according to the image data after the correction (referred to as corrected image data), it becomes feasible to reduce the influence of the voltage drop on the display image, which was the problem heretofore, and thereby improve the quality of image.

There is also the excellent advantage that the hardware for the correction, which was the problem heretofore, can be constructed in very small scale, because the calculation amount can be decreased by introduction of the approximations including the degeneracy as described above.

(Description of Entire System and Functions of Respective Portions)

The following will describe the hardware of the image display apparatus incorporating the correction data calculator.

Figure 12:
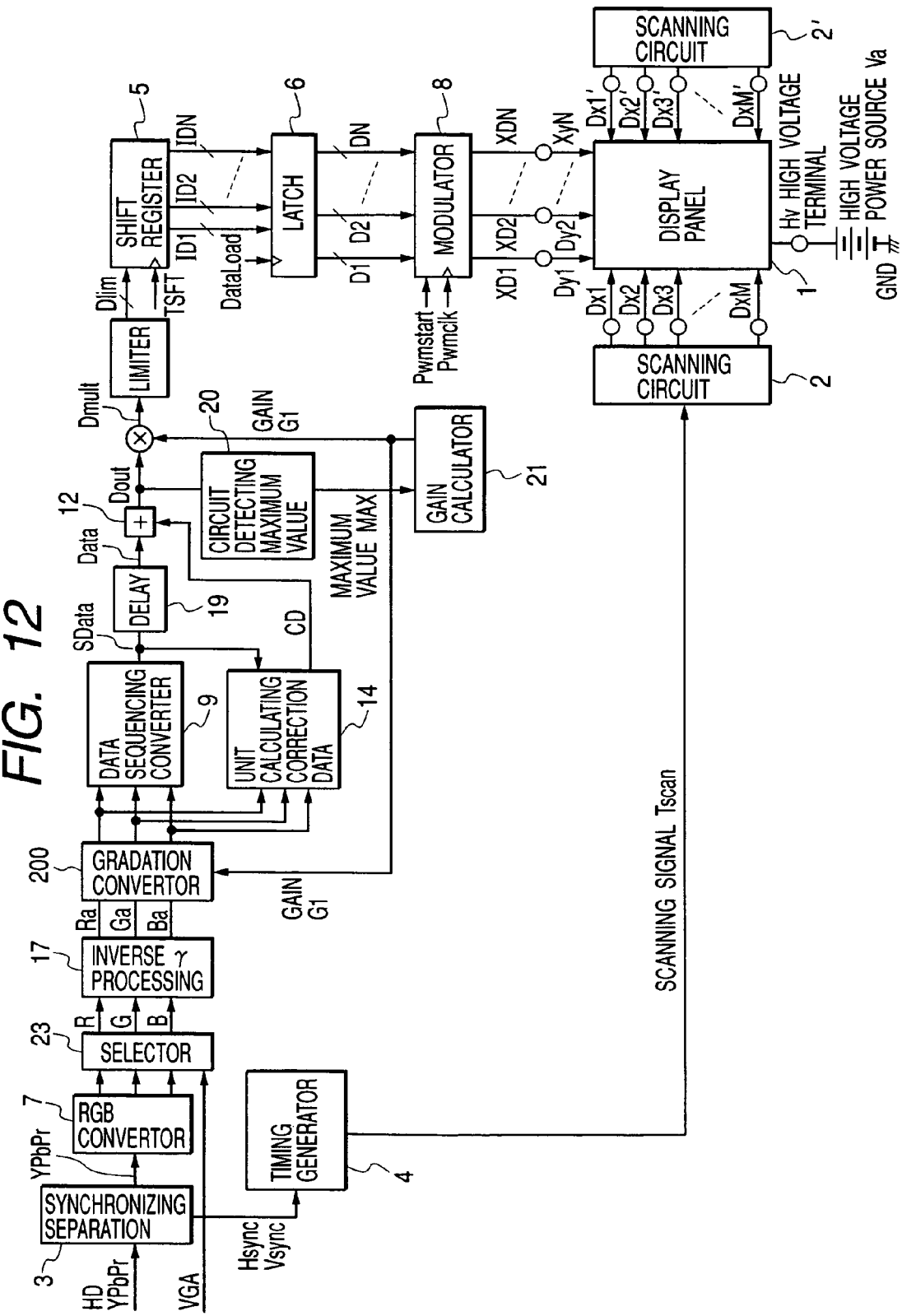
FIG. 12 is a block diagram showing a schematic configuration of an image display apparatus incorporating a gradation converter in a first embodiment.

FIG. 12 is a block diagram schematically showing a circuit configuration of the apparatus. In the drawing, numeral 1 designates the display panel of FIG. 1; Dx1-DxM and Dx1'-DxM' voltage supply terminals of the scanning wires of the display panel; Dy1-DyN voltage supply terminals of the modulation wires of the display panel; Hv a high-voltage supply terminal for placing an acceleration voltage between the face plate and the rear plate; Va a high voltage power source; 2 and 2' scanning circuits; 3 a synchronizing signal separator; 4 a timing generator; 7 a converter for converting a YPbPr signal separated by the synchronizing signal separator 3, into RGB signals; 23 a selector for implementing changeover between a television video signal and a computer video signal; 17 an inverse γ processing unit; 5 a shift register for one line of image data; 6 a latch for one line of image data; 8 a pulse width modulator for outputting modulation signals into the modulation wires of the display panel; 12 an adder; 14 a correction data calculator; 20 a maximum value detector; 21 a gain calculator; 200 a gradation converter.

Since the gradation converter 200 will be described later, the description below will be given excluding the gradation converter 200.

In the same drawing, R, G, and B represent parallel RGB input video data; Ra, Ga, and Ba parallel RGB video data subjected to inverse γ conversion processing described hereinafter; Data image data obtained by parallel-serial conversion at the data sequence converter; CD the correction data calculated by the correction data calculator; Dout the corrected image data (adjusted image data) obtained by adding the correction data to the image data at the adder.

(Synchronizing Separator and Selector)

The image display apparatus of the present embodiment can display television signals of NTSC, PAL, SECAM, HDTV, etc., and VGA and the like as computer output.

A video signal of the HDTV system is first fed into the synchronizing separator 3, in which synchronizing signals Vsync, Hsync are separated therefrom and are supplied into the timing generator. The video signal synchronously separated is supplied into the RGB converter. Inside the RGB converter there are provided a low-pass filter, an A/D converter, etc., not shown, in addition to the converter from YPbPr into RGB. The RGB converter converts the YPbPr signal into digital RGB signals and supplies the RGB signals into the selector 23.

A video signal of VGA or the like outputted from a computer is subjected to A/D conversion at an unrepresented A/D converter and the resultant digital signal is supplied into the selector 23.

The selector 23 properly selects either of the television signal and the computer signal and outputs the signal selected based on which video signal the user desires to display.

(Timing Generator)

The timing generator incorporates a PLL circuit and is a circuit for generating timing signals compatible with various video formats and thus generating operation timing signals of the respective units.

The timing signals generated by the timing generator 4 include Tsft for control over the operation timing of the shift register 5, a control signal Dataload for latching of data from the shift register into the latch 6, a pulse width modulation start signal Pwmstart of the modulator 8, a clock Pwmclk for the pulse width modulation, Tscan for control over the operation of the scanning circuits 2 and 2', and so on.

(Scanning Circuits)

Figure 13:
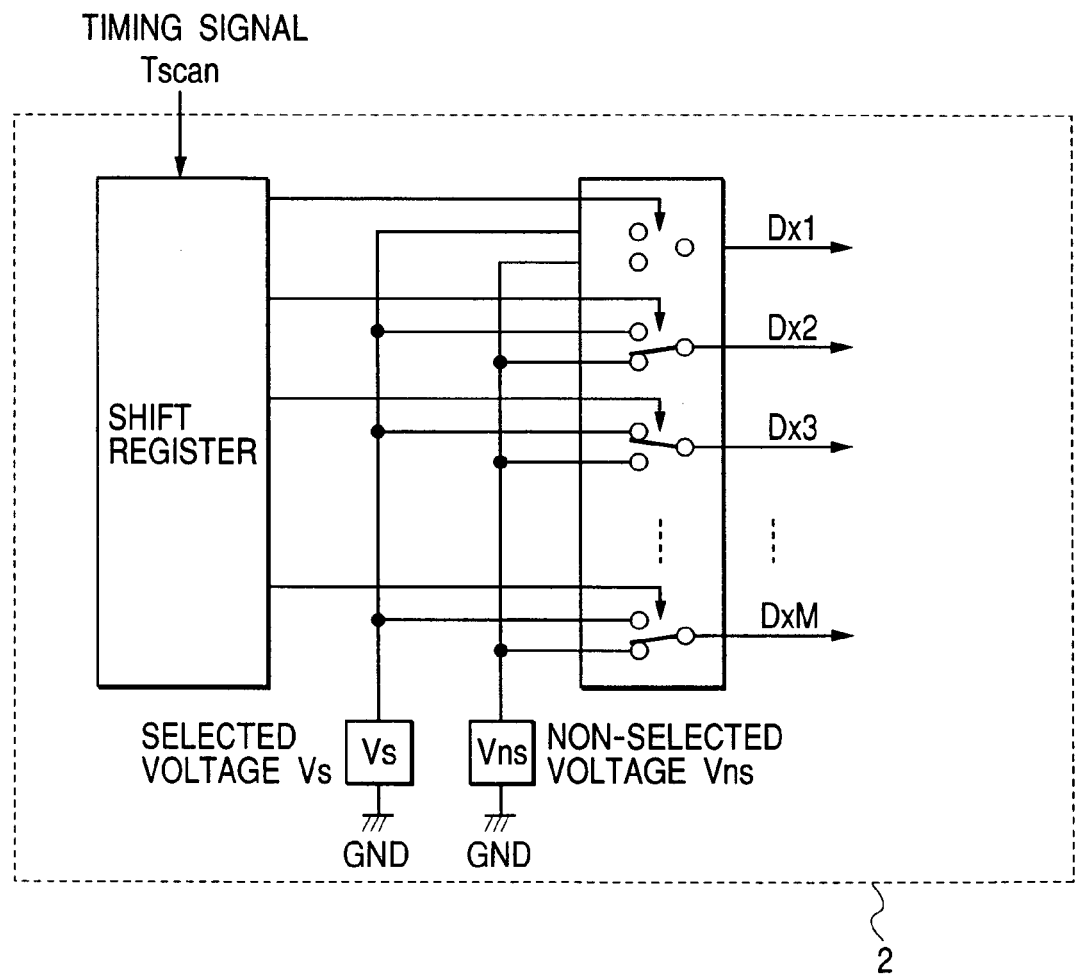
FIG. 13 is a block diagram showing a configuration of a scanning circuit in the image display apparatus.

As shown in FIG. 13, the scanning circuits 2 and 2' are circuits for supplying a selected voltage Vs or a non-selected voltage Vns into the connection terminals Dx1-DxM in order to implement sequential scanning of the display panel by one row per horizontal scanning period.

The scanning circuits 2 and 2' are circuits for implementing scanning while sequentially switching the scanning wire selected in each horizontal period one from another in synchronism with the timing signal Tscan from the timing generator 4.

Tscan is a timing signal group made from the vertical synchronizing signal and horizontal synchronizing signal, for example.

Each of the scanning circuits 2 and 2' is comprised of M switches, a shift register, and others as shown in FIG. 13. These switches are preferably constructed of transistors or FETs.

In order to decrease the voltage drop on the scanning wires, the scanning circuits are preferably coupled to the two ends of the scanning wires of the display panel, as shown in FIG. 12, and are configured to drive the panel from the two ends.

On the other hand, the embodiment of the present invention is also effective in the case where the scanning circuits are not coupled to the both ends of the scanning wires, and can be applied thereto by only modifying the parameters in Eq 2.

(Inverse γ Processor)

CRT has the approximately 2.2th power emission characteristic (hereinafter referred to as an inverse γ characteristic) against input.

The input video signal takes account of this characteristic of CRT, and is generally converted according to the 0.45th power γ characteristic so as to achieve a linear emission characteristic in display on the CRT.

On the other hand, the display panel of the image display apparatus according to the embodiment of the present invention has an approximately linear emission characteristic against applied time in the case of the modulation being made by applied durations of the driving voltage, and it is thus necessary to convert the input video signal on the basis of the inverse γ characteristic (hereinafter referred to as inverse γ conversion).

The inverse γ processor shown in FIG. 12 is a block for implementing the inverse γ conversion of the input video signal.

The inverse γ processor of the present embodiment is comprised of memories for implementing the above inverse γ conversion process.

Figure 14:
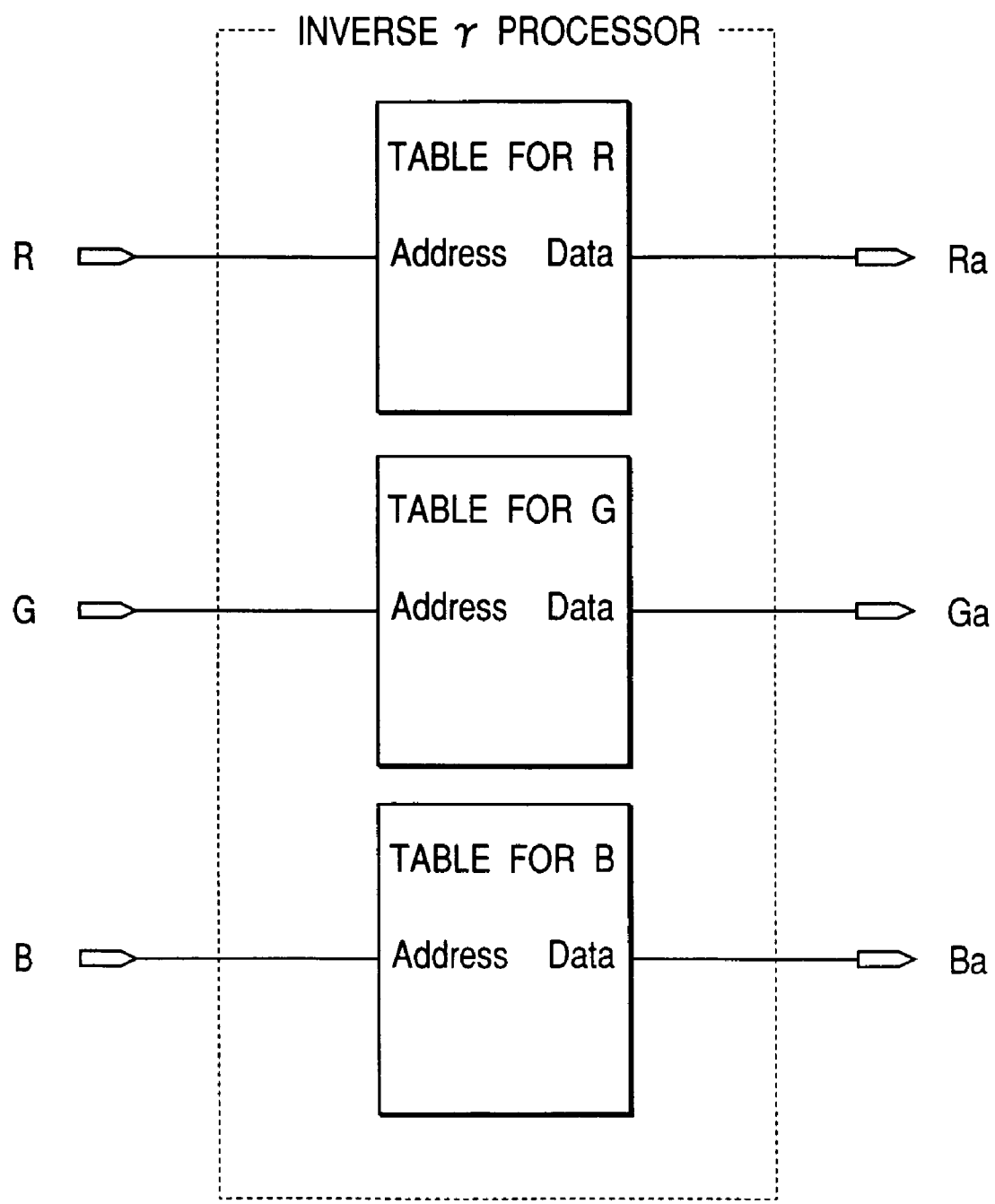
FIG. 14 is a block diagram showing a configuration of an inverse γ processor in the image display apparatus.

On the assumption the bit count of the video signals R, G, and B is 8 bits and that the bit count of the video signals Ra; Ga, and Ba as outputs of the inverse γ processor is also 8 bits, the inverse γ processor is comprised of memories of 8-bit address and 8-bit data for the respective colors (FIG. 14).

(Data Sequence Converter)

Figure 15:
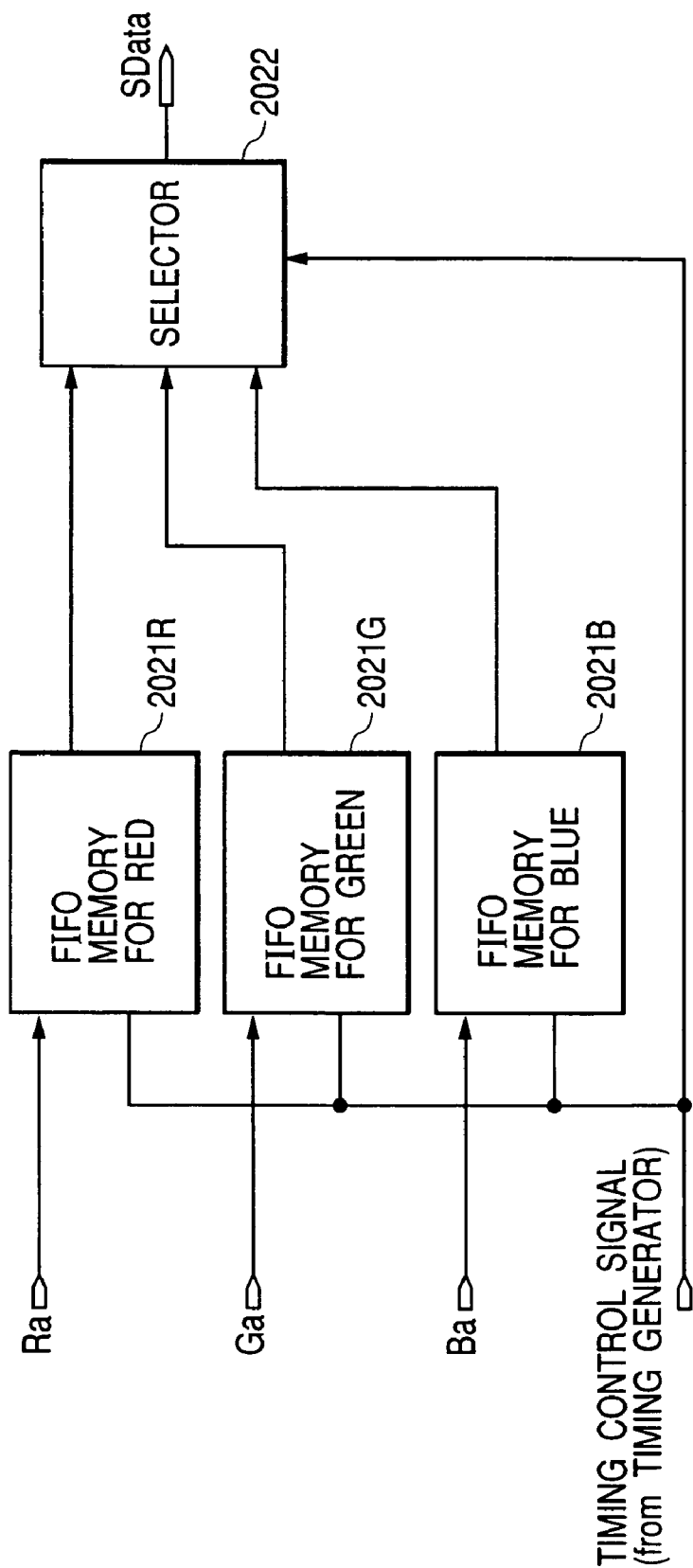
FIG. 15 is a block diagram showing a configuration of a data sequence converter in the image display apparatus.

The data-sequence converter 9 is a circuit of performing parallel-serial conversion of the parallel RGB video signals Ra, Ga, and Ba so as to fit the pixel array of the display panel. The data sequence converter 9 is comprised of FIFO (First In First Out) memories 2021R, 2021G, and 2021B for the respective colors R, G, and B and a selector 2022, as shown in FIG. 15.

Although not shown in the same figure, each FIFO memory is provided with two memories of the word equal to the number of horizontal pixels, one for odd lines and one for even lines. With entry of video data of an odd row, the data is written into the FIFO memories for odd lines, while the image data stored during one preceding horizontal scanning period is read out of the FIFO memories for even lines. With entry of video data of an even row, the data is written into the FIFO memories for even lines, while the image data stored during one preceding horizontal period is read out of the FIFO memories for odd lines.

Data read out of the FIFO memory is subjected to parallel-serial conversion according to the pixel array of the display panel at the selector, and serial GB image data SData is outputted therefrom. The further details will not be given herein, but the operation is performed based on the timing control signal from the timing generator 4.

(Delay circuit 19)

The image data SData after the rearrangement at the data sequence converter is fed into the correction data calculator and into the delay circuit 19. A correction data interpolation unit of the correction data calculator, described later, makes reference to values of the horizontal position information x from the timing control circuit and the image data SData to calculate correction data CD matching them.

The delay circuit 19 is a means provided for absorbing the time necessary for the calculation of the correction data (the aforementioned interpolation process of correction data) and configured to give such a delay as to correctly add corresponding correction data to image data on the occasion of adding the correction data to the image data at the adder. This means can be constructed of a flip-flop circuit.

(Adder 12)

The adder 12 is a unit of adding the correction data CD from the correction data calculator to the image data Data. The addition makes the correction for the image data Data and the corrected image data Dout is transferred to the maximum value detector and to the multiplier.

The bit count of the corrected image data being the output of the adder is preferably settled so as to cause no overflow in the addition of the correction data to the image data.

More specifically, let us suppose that the image data Data has the data width of 8 bits and the maximum thereof is 255 and that the correction data CD has the data width of 7 bits and the maximum thereof is 120.

In this case, the maximum of the addition result becomes 255+120=375.

Under the above condition, the corrected image data Dout being the output of the adder is preferably output with the output bit width of 9 bits in order to prevent the overflow.

(Overflow Process)

In the embodiment of the present invention, the correction is implemented by the corrected image data resulting from the addition of the calculated correction data to the image data, as described previously.

Now suppose that the bit count of the modulator is 8 bits and the bit count of the corrected image data Dout being the output of the adder is 10 bits.

Then overflow will occur if the corrected image data is supplied to the input of the modulator as it is.

It is thus necessary to adjust the amplitude of the corrected image data, prior to the supply into the modulator.

A potential configuration for preventing the overflow is to preliminarily estimate a maximum of the corrected image data upon entry of maximum input image data in an all-devices-turn-on pattern ((R, G, B)=(FFh, FFh, FFh) in the case of the bit count of the image data being 8 bits) and multiply the corrected image data by a gain so as to keep it within the input range of the modulator.

This method will be referred to hereinafter as a fixed gain method.

The fixed gain method does not cause the overflow, but is configured to multiply the corrected image data for an image with a low average luminance by the small gain, though it can be displayed with a greater gain. Therefore, the display image can be dark in luminance.

In contrast to it, another potential method for preventing the overflow is a method of detecting a maximum of the corrected image data in every frame, calculating a gain so as to keep the maximum within the input range of the modulator, and multiply the corrected image data by the gain.

This method will be referred to hereinafter as an adaptive gain method.

The adaptive gain method necessitates the maximum value detector 20 for detecting the maximum MAX of the corrected image data Dout in every frame, the gain calculator 21 for calculating the gain G1 for multiplication with the corrected image data from the maximum, and a multiplier for multiplying the corrected image data Dout by the gain G1.

In the adaptive gain method, the gain for preventing the overflow is preferably calculated in frame units.

It is also possible to calculate the gain for every horizontal line and prevent the overflow, for example. This configuration is, however, not preferable, because the display image looks strange because of the difference among the gains of the respective horizontal lines.

The above schematically described the fixed gain method and the adaptive gain method.

Inventors confirmed that the amplitude of the corrected image data could be suitably adjusted when the gain was calculated by either of the methods.

The present embodiment is thus configured to implement the adjustment of amplitude by the adaptive gain method.

The following will detail a circuit configuration for implementing the adjustment of amplitude of the corrected image data by the adaptive gain method in the present embodiment.

(Maximum Detector 20)

The maximum detector 20 of the present invention is connected to each of the units, as shown in FIG. 12.

The maximum detector 20 is a unit of detecting a maximum value out of the corrected image data Dout of one frame.

This unit is a circuit that can be readily constructed of a comparator and a register, for example. This unit is a circuit of comparing the size of the corrected image data sequentially transferred, with a value stored in the register, and updating the value of the register with the data value if the corrected image data is greater than the value of the register.

The value of the register is cleared to 0 at the head of each frame, and then a maximum value of the corrected image data in a frame is stored in the register at the time of the end of that frame.

The maximum value of the corrected image data detected in this way is transferred to the gain calculator 21.

(Gain Calculator)

The gain calculator 21 is a unit of calculating the gain for the adjustment of amplitude so as to keep the corrected image data Dout within the input range of the modulator on the basis of the adaptive gain method.

The gain can be successfully determined if it satisfies the following condition:

$$\text{gain } G \leq INMAX/MAX \quad \text{(Eq 20)},$$

where MAX is the maximum value detected by the maximum value detector 20 and INMAX the maximum value of the input range of the modulator (first method).

The gain calculator 21 updates the gain in a vertical retrace period to change the value of the gain every frame.

In the configuration of the image display apparatus according to the embodiment of the present invention, the gain by which the corrected image data of the current frame is multiplied, is calculated using the maximum value of the corrected image data of one preceding frame.

Strictly speaking, overflow may occur because of the difference of corrected image data between frames accordingly.

To solve this problem, a circuit was designed with a limiter, described later, for the output of the multiplier for multiplying the corrected image data by the gain, so as to keep the output of the multiplier within the input range of the modulator, and provided good result.

The above overflow process can be deemed as an overflow process making use of the correlation of corrected image data (image data) between adjacent frames.

It becomes feasible to prevent the overflow in a configuration without a time delay if a frame memory is provided between the maximum value detector and the multiplier.

Inventors confirmed that the gain determining method based on the adaptive gain method could be arranged to calculate the gain by the method as described below.

Namely, the gain for the corrected image data of the current frame can be suitably determined so as to satisfy the condition below:

$$\text{gain} G1 \leq INMAX/AMAX \quad (Eq\ 21),$$

where AMAX is an average obtained by framewise smoothing (or averaging) of maximums of corrected image data detected in frames preceding to the current frame (second method).

A third method is a method of calculating the gains G1 of the respective frames according to Eq 20 and averaging them to obtain the current gain.

Inventors confirmed that all these three methods were suitably applicable and that the second and third-methods were exceedingly suitable, rather than the first method, because they had another effect of largely reducing flicker in the display image (which will be described later with reference to FIG. 16).

Inventors conducted research on the number of frames to be used for the averaging in the second method and the third method, and confirmed that acceptable images were obtained with little flicker, for example, by averaging of 16 to 64 frames.

Just as in the case of the first method, the second and third methods can decrease the probability of occurrence of overflow because of the correlation of (corrected) image data between frames, but also fail to prevent the overflow perfectly.

As countermeasures to it, we employed a method of preventing the overflow roughly by the above method and preventing the overflow perfectly by provision of the limiter at the output of the multiplier, and obtained better result.

Figure 16:
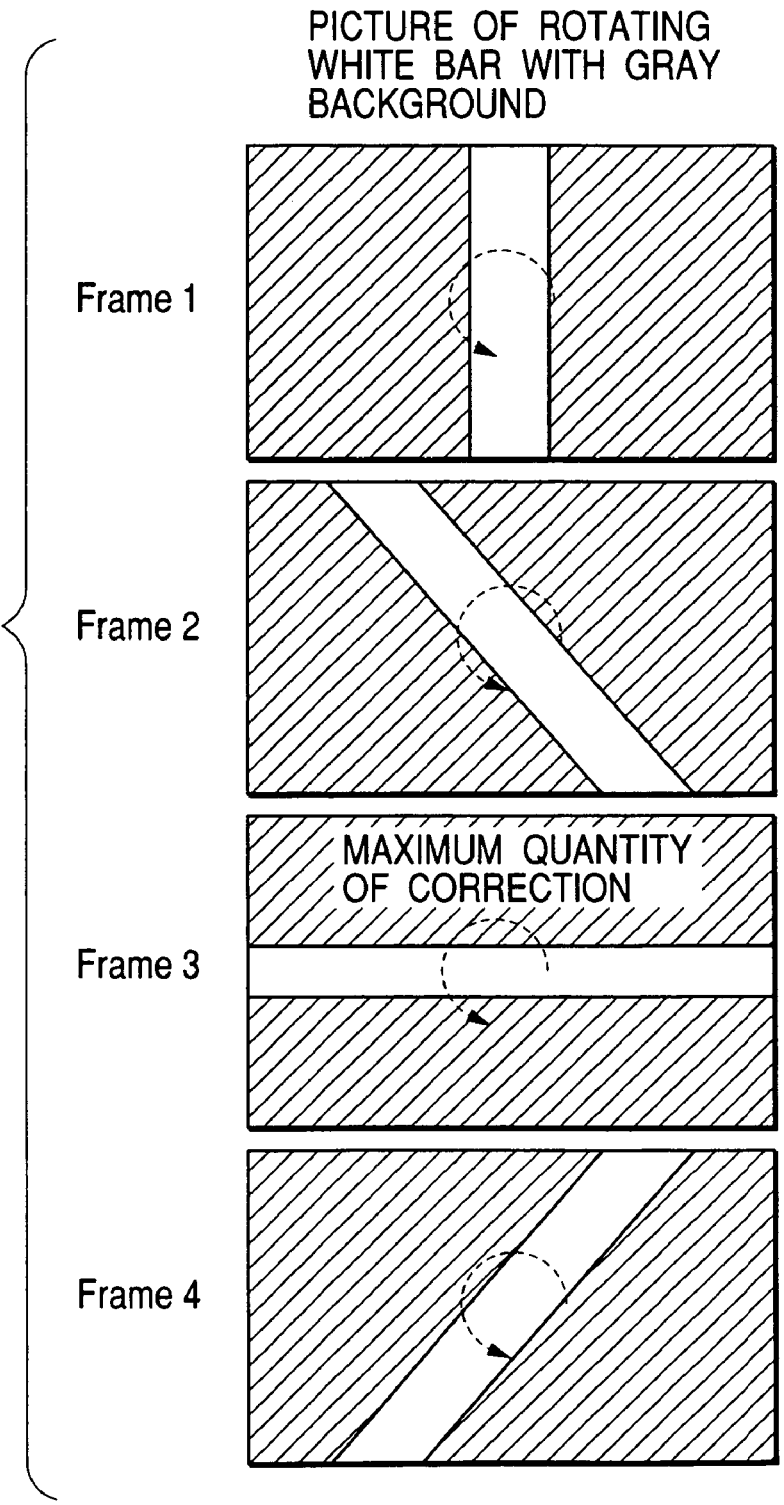
FIG. 16 is a diagram showing an example of continuous frames.

FIG. 16 is a diagram for explaining the flicker, using the first method and the second method as an example.

FIG. 16 shows an example of a moving picture in which a white bar is rotating counterclockwise over the gray background. In the case of such an image being displayed, the size of the correction data CD largely varies frame by frame with rotation of the bar.

Figure 17:
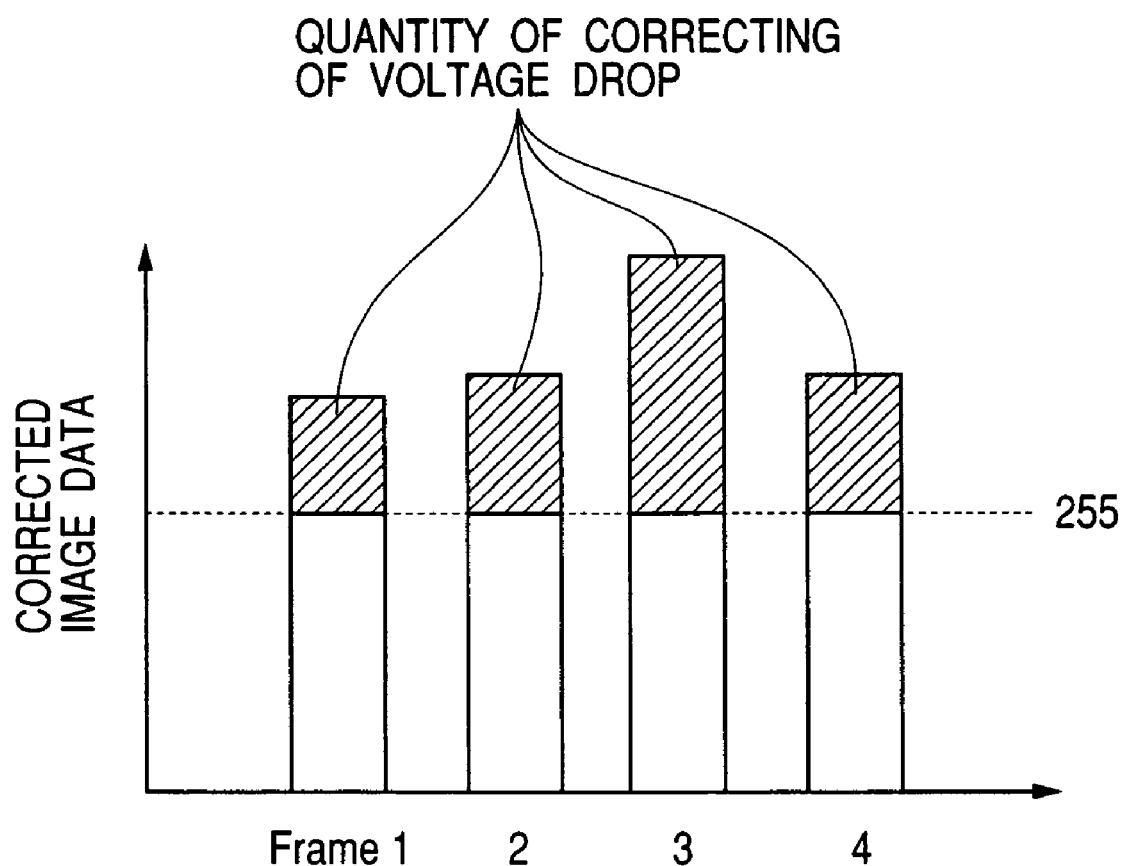
FIG. 17 is a graph showing sizes of image data in continuous frames.

FIG. 17 is a diagram for explaining the corrected image data in the correction for such a moving picture. FIG. 17 is a graph of maximums in the respective frames out of the corrected image data of the respective frames.

In FIG. 17 white portions correspond to the original image data, and gray portions to portions extended by the correction.

In the case of the display of the image as shown in FIG. 16, the maximums of the corrected image data in the continuous frames-vary as shown in FIG. 17.

Figure 18A:
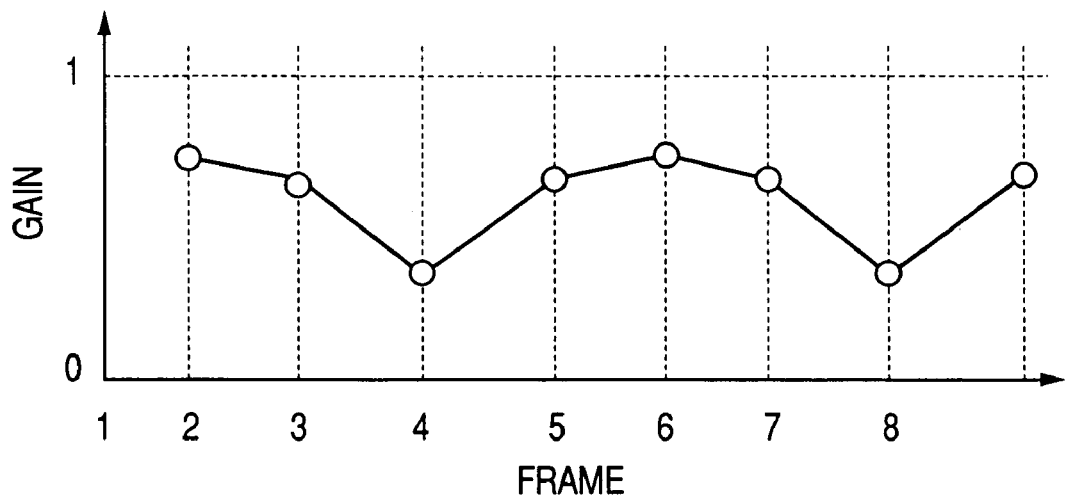
FIGS. 18A and 18B are graphs showing gains in continuous frames.

Therefore, if gains are set for the respective frames as indicated by Eq 20, the gains of the respective frames will vary heavily as shown in FIG. 18A, so as to intensify the variation of luminance in the display image, thereby raising a sense of flicker.

Figure 18B:
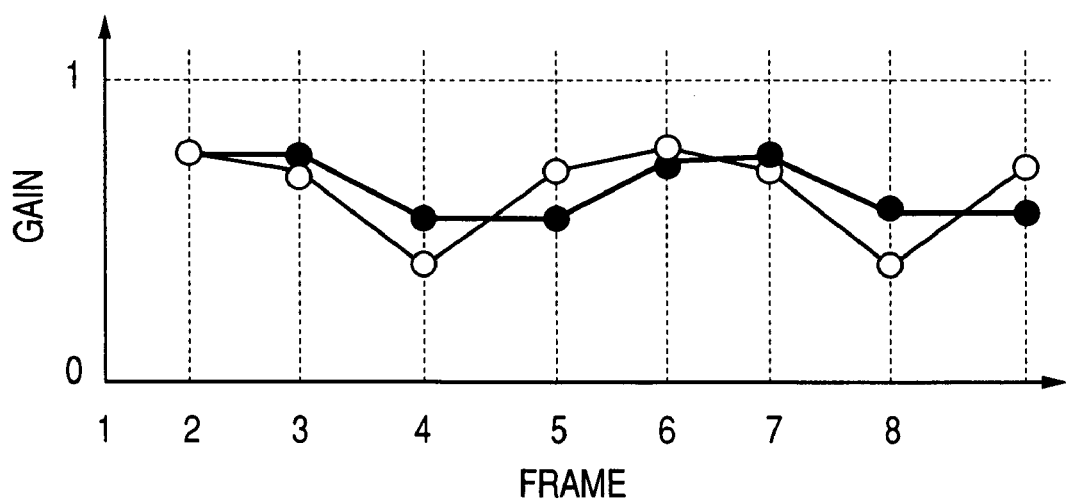

In contrast to it, when the gains are determined by Eq 21, the gains are averaged and thus the variation of gains becomes smaller, as shown in FIG. 18B, so as to reduce the variation of luminance, thereby achieving the excellent effect of-reducing a sense of flicker.

In FIG. 18B the plot of white circles represents the gains according to Eq 20, while the plot of black circles the gains averaged by Eq 21.

Although the third method was not discussed in detail herein, Inventors also confirmed that the variation of gains became smaller, so as to reduce flicker, as in the case of the second method.

It was preferable that the gain calculator 21 should be configured to average the gains for the screen of continuous scenes as described above but quickly change the gains for the screen of different scenes on the occasion of switching between scenes of images.

For implementing it, a preferred configuration was such that the gain calculator 21 was configured to have a preset threshold value as a scene switching threshold Gth and calculate the gain of the next frame by smoothing in such a way that:

if $\Delta G = |GN-GB| > Gth$, gain $G1 = (GN-GB) \times A + GB$; or if $\Delta G = |GN-GB| \leq Gth$, gain $G1 = (GN-GB) \times B + GB$ (where A and B are real numbers satisfying the relation of $1 \geq A \geq B \geq 0$), where GB is a gain of one preceding frame calculated by Eq 20, GN a gain calculated by Eq 20 from the maximum of the corrected image data of the preceding frame, detected by the maximum detector 20, and AG an absolute value of the difference GN−GB.

Particularly preferable results were obtained when the values of A and B were set as A=1 and B=1/16 to 1/64 approximately.

(Multiplier)

The multiplier in FIG. 12 multiplies the corrected image data Dout being the output of the adder, by the gain G1 calculated by the gain calculator, and transfers the result as the corrected image data with the adjusted amplitude, Dmult, to the limiter.

(Limiter)

If the gain can be determined as described above so as to cause no overflow, there will arise no problem. It is, however, difficult to determine the gain with no overflow at all by the several gain determining methods described above. Therefore, the apparatus may also be provided with a limiter.

The limiter has a preset limit value, compares the output data Dmult fed thereinto, with the limit value, outputs the limit value if the limit value is smaller than the output data, and outputs the output data if the limit value is greater than the output data (the output is named as corrected image data Dlim in FIG. 12).

The limiter supplies the corrected image data Dlim, which is completely confined in the input range of the modulator, through the shift register and latch into the modulator.

(Gradation Converter)

Before the detailed description of the operation of the gradation converter 200 in FIG. 12, a description will be given about a case wherein the image display apparatus is substantiated without correction for the influence of the voltage drop and without use of the gradation converter 200.

Inventors confirmed the following phenomena in the image display apparatus in the configuration without correction for the influence of the voltage drop and without the gradation converter 200.

Namely, the phenomena are as follows:

A. image data with the number of gradation levels being small (dark picture) provides more reddish display than in the case where a small region is displayed in the number of gradation levels (pulse width for driving) of image data being 255 (in the 8-bit data width);

B. display becomes more reddish in the case of the display of the entire screen in the number of gradation levels of image data being 255 than in the case where a small region is displayed in the number of gradation levels (pulse width for driving) of image data being 255 (in the 8-bit data width).

Inventors analyzed these phenomena and found the following reason.

Namely, the red phosphor tended to make its emission efficiency saturated at the high quantity of injected charge. For this reason, saturation became greater in the case where a small region was displayed in the number of gradation levels of image data being 255. Namely, the emission current is large because of the small voltage drop on the scanning wiring, and thus electrons impinge upon the phosphor over a relatively long period of time, so as to increase the quantity of injected charge and thus make the red phosphor saturated. For this reason, when comparison is made on the basis of the reference in the case where the small region is displayed in the number of gradation levels of image data being 255, the quantity of charge injected into the red phosphor is smaller in the above A. and B. cases, so that saturation is less in the red phosphor. This resulted in relatively increasing the intensity of emission of red light, so that the display image became reddish.

Figure 19:
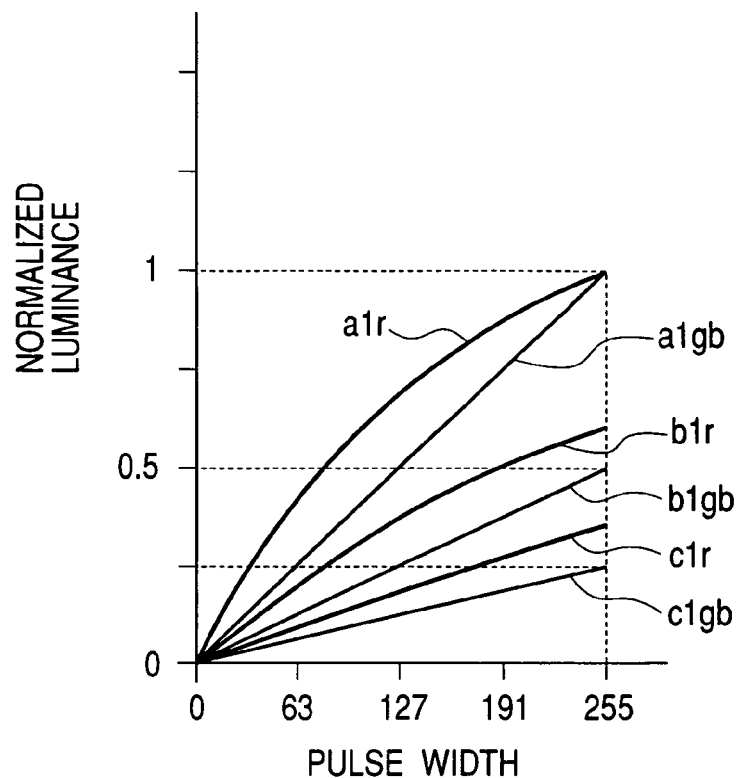
FIG. 19 is a diagram showing gradation characteristics in the case where no correction is made for the voltage drop and there is no gradation converter provided.

FIG. 19 is a diagram schematically showing the gradation characteristics without correction for the voltage drop and without the gradation converter.

In FIG. 19, the horizontal axis represents the pulse width for driving of the modulation wiring, and the vertical axis normalized luminance obtained by normalization with respect to luminances of the respective colors in the case where the small region is displayed in the number of gradation levels of the image data being 255 (in the case of the voltage drop on the scanning wiring being almost zero). In FIG. 19, a1$gb$ indicates the gradation characteristic of green and blue in the case where the voltage drop in the scanning wiring is almost zero, and a1$r$ the gradation characteristic of red in the case where the voltage drop in the scanning wiring is almost zero.

In FIG. 19, c1$gb$ represents the gradation characteristic of green and blue in the case where the maximum voltage drop occurs with all the display devices on the scanning wiring being turned on, and c1$r$ the gradation characteristic of red in the case where the maximum voltage drop occurs with all the display elements on the scanning wiring being turned on.

The gradation characteristics c1$gb$, c1$r$ were normalized with respect to the luminances in the case where the small region was displayed in the number of gradation levels of image data being 255. FIG. 19 is illustrated on the assumption that the normalized luminance of green and blue becomes ¼ when the driving pulse width is 255.

In FIG. 19, b1$gb$ indicates the gradation characteristic of green and blue in the case where the voltage drop occurs so as to present the intermediate luminance between the luminance of a1$gb$ and the luminance of c1$gb$, and b1$r$ the gradation characteristic of red at the same voltage. Similarly, they were normalized with respect to the luminances in the case where the small region was displayed in the number of gradation levels of image data being 255.

The characteristics of luminance and driving pulse width (values of corrected image data) shown in FIG. 19 vary depending upon voltage drop amounts, and driving voltages of the electron-emitting devices during display of actual images vary depending upon images and positions of devices. It was, therefore, difficult to realize a conversion capable of completely canceling the above characteristics.

Inventors conducted elaborate research and found the following features in driving with correction for the influence of the voltage drop of the display panel using the surface conduction electron-emitting devices.

(1) In the method according to the embodiment of the present invention with correction for the influence of the voltage drop, data with adjusted pulse widths (corrected image data) is calculated for input image data so as to be emitted charge amounts of products of the emission current amounts IE without any voltage drop and the pulse widths determined by the image data, and the modulator drives the display panel by the pulse widths.

(2) When the maximum of the corrected image data falls outside the input range of the modulator, the overflow process is carried out so as to multiply the corrected image data by the gain. The corrected image data is thus set in the input range of the modulator.

(3) The saturation characteristics of phosphors (in particular, a red phosphor) are characteristics almost determined by emitted charge amounts in the range of pulse widths and emission current values of the electron-emitting devices under the actual driving conditions of the display panel.

Namely, the feature (1) indicates that "with correction for the influence of the voltage drop, charges enter the phosphors in the emitted charge amounts of the products of the emission currents IE without any voltage drop and the pulse widths determined by image data, independent of the voltage drops actually occurring in the display panel and the pulse widths for actual driving" (which means that emitted charge amount correction in implemented to make correction for variation of emitted charge amounts so as to achieve the charge amounts corresponding to the image data).

The feature (2) indicates that "with execution of the overflow process, charges enter the phosphors in the emitted charge amounts of the products of the emission currents IE without any voltage drop and the pulse widths determined by the values of the image data times the gain."

Furthermore, the feature (3) indicates that "the saturation characteristics of phosphors (in particular, red phosphor) can be determined by only the emitted charge amounts."

Inventors invented the image display apparatus in the configuration with the gradation converter 200 as a result of deliberation on the above features (1), (2), and (3).

The gradation conversion characteristics of the gradation converter 200 will be briefly described, prior to the description of the actual configuration of the gradation converter 200.

Figure 20:
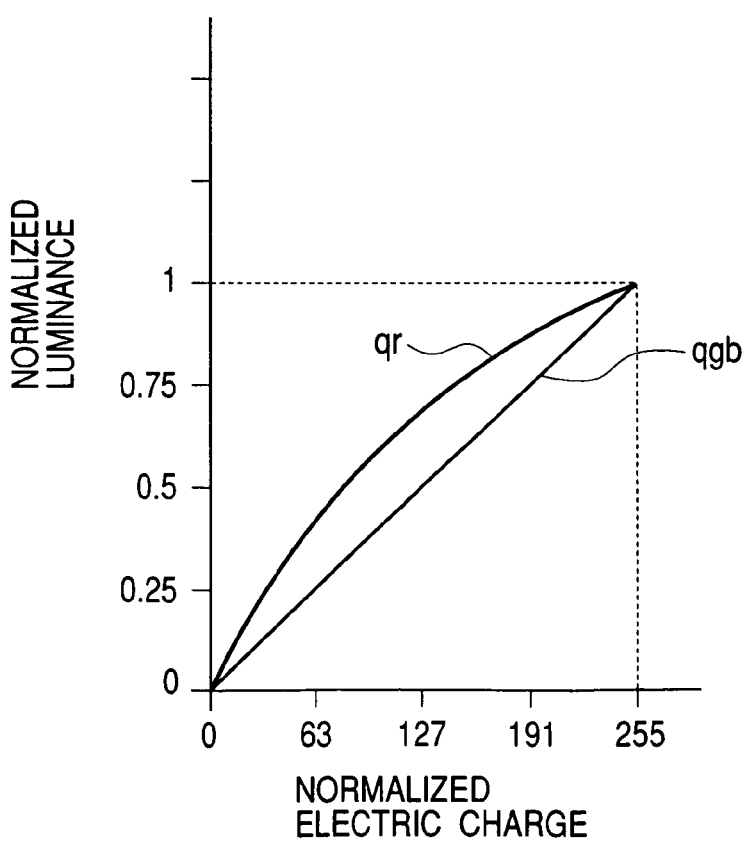
FIG. 20 is a diagram showing charge-luminance characteristics.

In FIG. 20, the horizontal axis represents the emitted charge amounts from the surface conduction electron-emitting devices, and the vertical axis the luminances of the respective colors. For simplifying the description in FIG. 20, the emitted charge amounts on the horizontal axis are presented as normalized quantities with respect to 1 set as a charge amount in the case where an emission current amount IE without any voltage drop is injected for only a time Δt equivalent to one gradation level of pulse width modulation. As a result of the normalization, the maximum of emitted charge amount becomes 255. Namely, when a small area is displayed by the driving pulse width of the modulator of 255 (maximum) (i.e., when the voltage drop on the scanning wiring is almost zero), the emitted charge amount (maximum emitted charge amount) is 255.

The vertical axis shows the luminances normalized with respect to 1 as a luminance of each color where the emission current amount IE without any voltage drop is injected in the case of the pulse width of the 255 gradation level (255×Δt).

When the correction is made for the influence of the voltage drop in the embodiment of the present invention, the pulse width is adjusted so that a charge is injected into each phosphor in the emitted charge amount of the product of the emission current amount IE without any voltage drop and the pulse width determined by the image data (the feature (1)).

For this reason, in the case of the correction for the influence of the voltage drop, the horizontal axis corresponds to 0 to 255 of image data.

In FIG. 20 qgb represents the gradation characteristic of green and blue, and qr the gradation characteristic of red. FIG. 20 can be obtained by actual measurement with varying pulse widths or emission currents (driving voltages), for example.

Since the emitted charge amounts are equivalent to the image data in the case without execution of the overflow process, it is understood that correction should be made so as to effect gradation conversion to cancel the characteristics of FIG. 20, on the image data. When the gradation converter 200 is provided with such conversion characteristics as to cancel the gradation characteristics of FIG. 20, it becomes feasible to overcome the aforementioned problem of reddish display.

Figure 21:
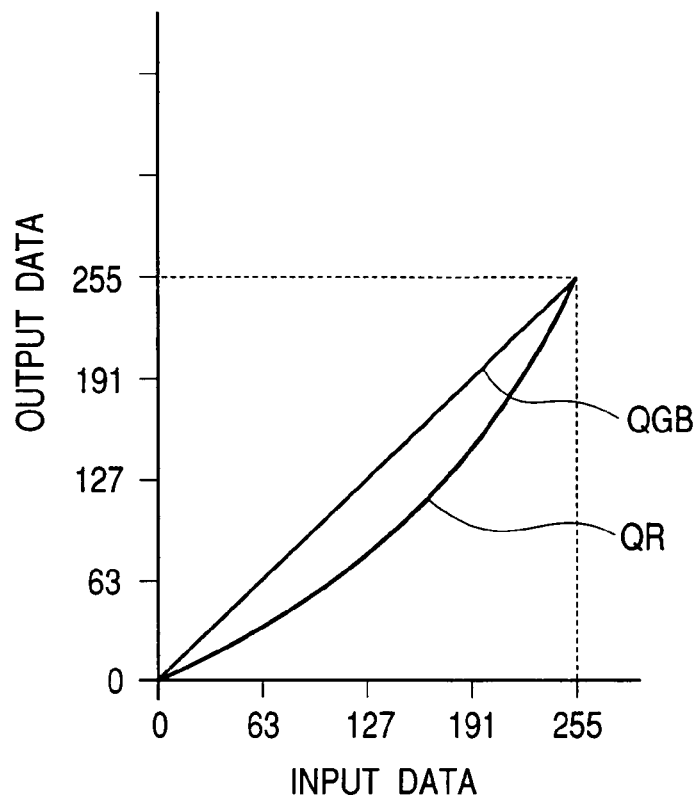
FIG. 21 is a diagram showing the property of canceling saturation of phosphors in the case where no overflow process is carried out.

FIG. 21 shows the actual gradation conversion characteristics for canceling the characteristics of FIG. 20. FIG. 21 shows a case where input and output are 8-bit data. In FIG. 21, QGB represents a characteristic curve to cancel the saturation characteristic of the green and blue phosphors (which is illustrated as a straight line on the assumption that they are not saturated in the present example), and QR a characteristic curve to cancel the saturation characteristic of the red phosphor indicated by qr in FIG. 20.

Since the image data corresponds to the emitted charge amounts (the feature (1)), as described previously, the gradation conversion of image data made it feasible to cancel the characteristic of the red phosphor having the saturation characteristic depending upon emitted charge amounts Namely, the gradation conversion of image data means to convert the image data as luminance requirements to emitted charge amount requirements taking account of the emission characteristic of the phosphor.

It thus indicates correction for emitted charge amounts to make correction for variation of emitted charge amounts toward the emitted charge amount requirements.

Next described is the case including the overflow process. According to the aforementioned feature (2), the charge enters each phosphor in the emitted charge amount of the product of the emission current amount IE without any voltage drop and the pulse width determined by the value of the image data times the gain (factor).

Namely, even if the input image data is the same, the emitted charge amount with the overflow process is the gain times that without the overflow process.

Figure 22:
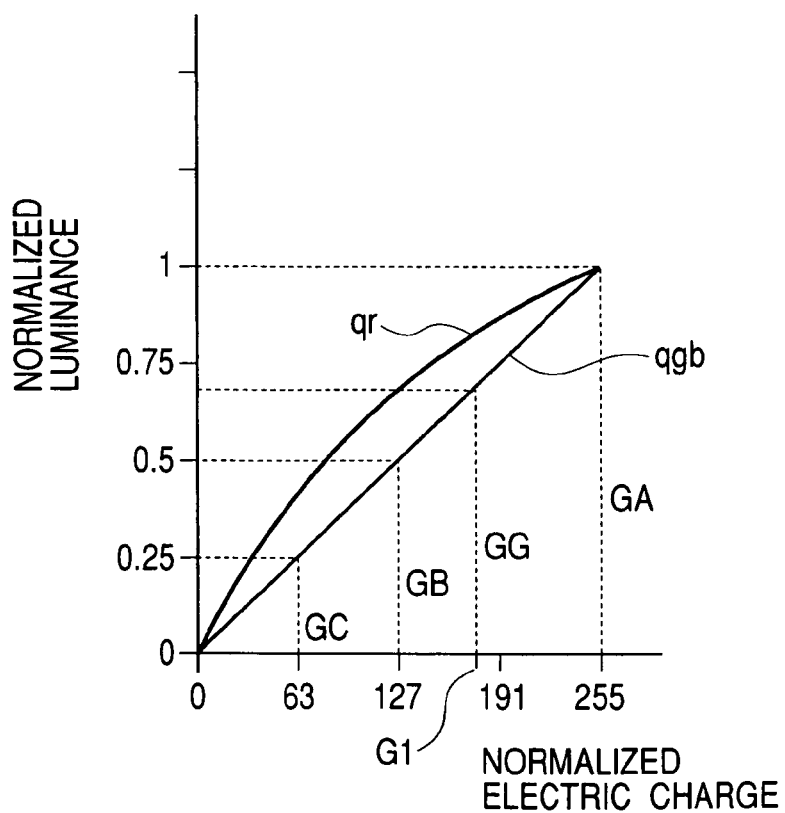
FIG. 22 is a diagram showing the relation between charge-luminance characteristics and gains.

For detailed description, FIG. 22 shows the characteristics of normalized charge amount versus luminance. In FIG. 22, similar to FIG. 20, emitted charge amounts on the horizontal axis indicate normalized values with respect to 1 as a charge amount in the case where the emission current amount IE without any voltage drop is injected for a time Δt equivalent to one gradation level of pulse width modulation. The vertical axis indicates normalized luminances with respect to 1 as a luminance of each color in the case where the emission current amount IE without any voltage drop is injected in the pulse width of the 255 gradation level (255×Δt).

The characteristics qgb, qr in FIG. 22 are the same as the aforementioned characteristics in FIG. 20; qgb the gradation characteristic of green and blue and qr the gradation characteristic of red. A square region indicated by GA in FIG. 22 is a region indicating the emitted charge amount-luminance with the gain of 1, and the normalized charge amounts 0 to 255 on the horizontal axis correspond to the image data 0 to 255 (equivalent to those in the aforementioned case without the overflow process).

When the gain is ½, the amount of charge injected into each phosphor is equal to the charge amount of the image data times the gain (½), and thus the image data 0 to 255 corresponds to the normalized charge amounts 0 to 127. In FIG. 22 a square region indicated by GB is a region indicating the emitted charge amount-luminance actually obtained when the gain is ½.

Similarly, when the gain is ¼, the amount of charge injected into each phosphor is equal to the charge amount of the image data times the gain (¼), and thus the image data 0 to 255 corresponds to the normalized charge amounts 0 to 63. In FIG. 22 a square region indicated by GC is a region indicating the emitted charge amount-luminance actually obtained when the gain is ¼.

When the gain is G1, the amount of charge injected into each phosphor is equal to the charge amount of the image data times the gain (G1), and thus the image data 0 to 255 corresponds to the normalized charge amounts 0 to (255×G1). In FIG. 22 a square region indicated by GG is a region indicating the emitted charge amount-luminance actually obtained when the gain is G1.

As described above, the emitted charge amounts actually achieved correspond to values of the product of the image data and the gain (an operating point determined by the gain).

For this reason, the gradation conversion of image data as described below makes it feasible to cancel the saturation characteristics of phosphors.

Figure 23:
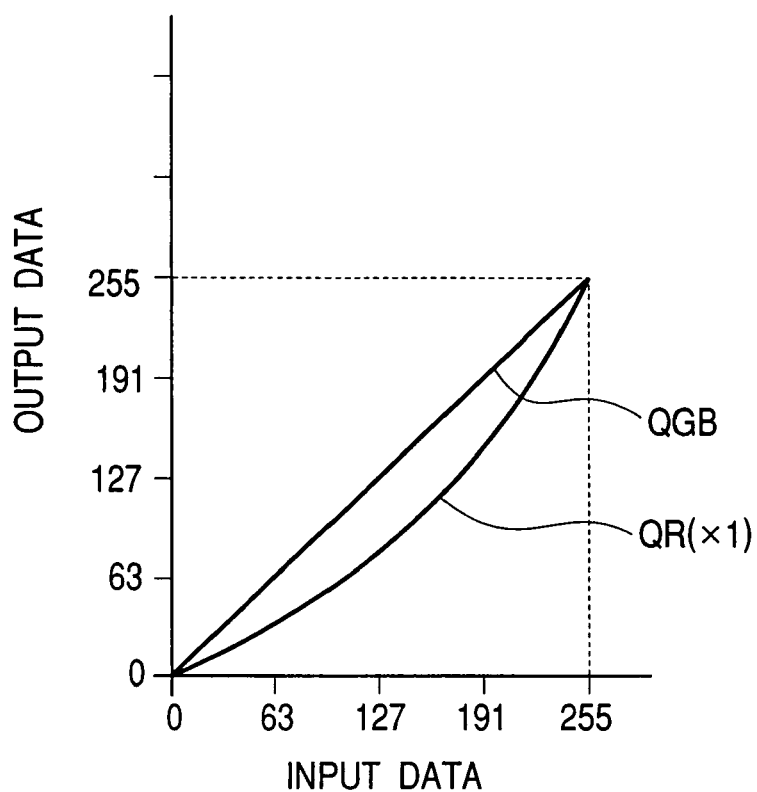
FIG. 23 is a diagram showing the property of canceling saturation of phosphors in the case where the gain is 1.

With the gain of 1, the normalized charge amounts 0 to 255 correspond to the image data 0 to 255, and thus the saturation characteristic of the red phosphor can be canceled out by a γ correction table having the conversion characteristics shown in FIG. 23.

In FIG. 23, QGB indicates a characteristic curve to cancel the saturation characteristic of the green and blue phosphors (which is a straight line on the assumption that no saturation occurs in the present example), and QR (×1) a characteristic curve to cancel the saturation characteristic of the red phosphor indicated by qr in FIG. 22.

Figure 24:
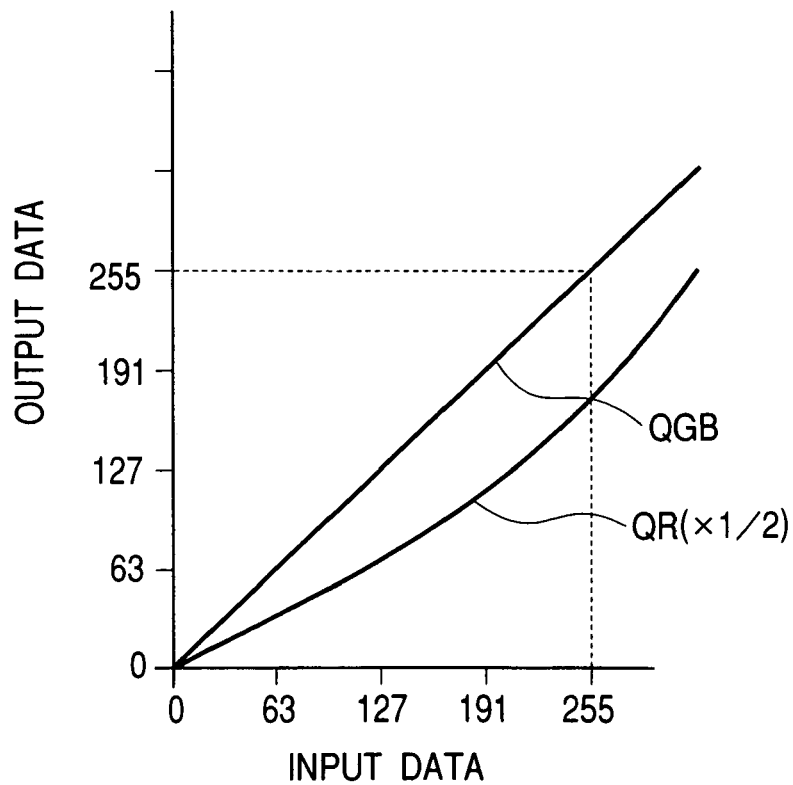
FIG. 24 is a diagram showing the property of canceling saturation of phosphors in the case where the gain is ½.

Likewise, with the gain of ½, the normalized charge amounts 0 to 127 correspond to the image data 0 to 255, and thus the saturation characteristic of the red phosphor can be canceled by a γ correction table having the conversion characteristics shown in FIG. 24.

In FIG. 24, QGB indicates a characteristic curve to cancel the saturation characteristic of the green and blue phosphors (which is a straight line on the assumption that no saturation-occurs in the present example), and QR (×½) a characteristic curve to cancel the saturation characteristic of the red phosphor indicated by the GB region of qr in FIG. 22.

When the reference is set in the non-saturated case like QGB, the gradation conversion of image data is to convert the image data (input data) 0 to 255 in the range of output data of 0 to 255 (the range hereinafter will be described on the basis of the reference in the non-saturated case like QGB).

The output data in the range of 0 to 255 is multiplied by the gain through the correction for the influence of the voltage drop, and the normalized charge amounts of charges injected into the phosphors thereafter fall in the range of 0 to 127.

The conversion to cancel the saturation characteristics of the phosphors at the operating point corresponding to the gain is carried out as described above.

In other words, the conversion characteristics to cancel the saturation characteristics of the phosphors can be obtained by converting the image data (input data) 0 to 255 in the range of output data of 0 to 255, independent of the gain.

Figure 25:
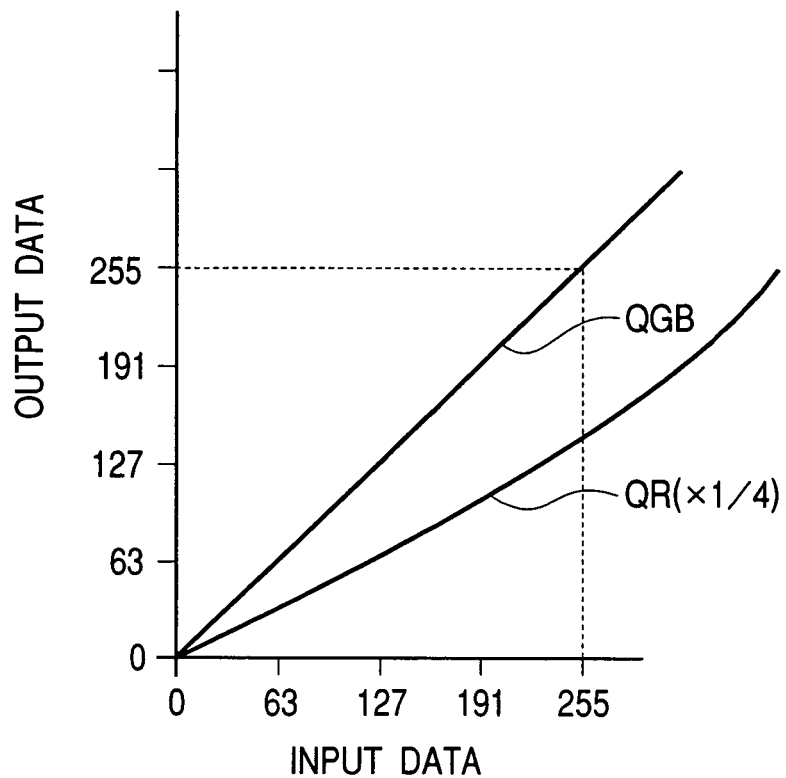
FIG. 25 is a diagram showing the property of canceling saturation of phosphors in the case where the gain is ¼.

Similarly, with the gain of ¼, the normalized charge amounts 0 to 63 correspond to the image data 0 to 255, and thus the saturation characteristic of the red phosphor can be canceled by a γ correction table having the conversion characteristics shown in FIG. 25.

In FIG. 25, QGB indicates a characteristic curve to cancel the saturation characteristic of the green and blue phosphors (which is a straight line on the assumption that no saturation occurs in the present example), and QR (×¼) a characteristic curve to cancel the saturation characteristic of the red phosphor indicated by the GC region of qr in FIG. 22.

Similarly, with the gain of G1, the normalized charge amounts 0 to (255×G1) correspond to the image data 0 to 255, and thus the image data is multiplied by the gain (G1) and is converted by the γ correction table having the characteristics indicated by QGR and QR (×1) in FIG. 23, thereby making correction for the influence of saturation of the phosphors. Furthermore, the output converted by the γ correction table is multiplied by 1/gain (1/G1) to obtain the output data in the range of 0 to-255 for the correction for the voltage drop.

In other words, the above-stated characteristics are equivalent to selection of the gradation conversion characteristics at the operating point determined by the gain.

By the characteristics of the gradation converter 200 as described above, it becomes feasible to cancel the aforementioned problem of reddish display even in the case where the overflow process is carried out.

A practical configuration of the gradation converter 200 will be described below.

Figure 26:
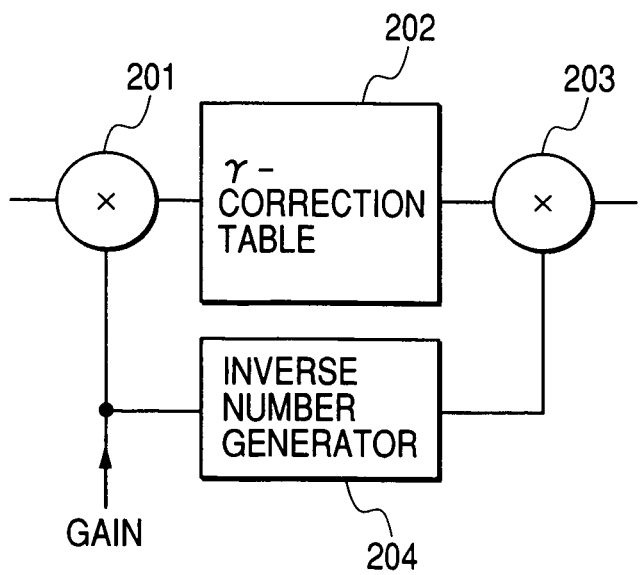
FIG. 26 is a block diagram showing a configuration example 1 of the gradation converter.

FIG. 26 shows the configuration of the gradation converter 200. In FIG. 26 numerals 201 and 203 designate multipliers, 202 a γ correction table substantiated by a memory or the like, and 204 an inverse number generator. This configuration realizes the aforementioned function. FIG. 26 shows only the configuration-corresponding to one color, for simplification. It is a matter of course that the gradation converter 200 is comprised of three sets of the same structure for red, green, and blue. In this case, the contents of the γ correction tables are prepared according to the saturation characteristics of the phosphors of the respective colors.

The input image data is multiplied by the gain (G1) at the multiplier 201. As described previously, the input image data is multiplied by the gain to be converted into the emitted charge amount, and the γ correction table 202 effects the gradation conversion to cancel the saturation characteristic of the phosphor as normalized by the maximum emitted charge amount (in the range of 1 to 255).

The γ correction table 202 implements the gradation conversion to cancel the-saturation characteristic of the phosphor at the emitted charge amount of charge actually emitted.

Since in this state the output of the γ correction table is gain-multiplied data, the multiplier 203 multiplies the output by 1/gain (1/G1) in order to recover data to be actually subjected to the correction for the voltage drop. The inverse number generator 204 outputs an inverse number of the gain.

Since the gain is generally smaller than 1, it is necessary to set the bit count of the γ correction table 202 greater than the bit count of the image data in order to maintain significant digits, because the image data times the gain is fed into the γ correction table 202.

The above configuration realized the aforementioned function whereby the aforementioned problem of reddish display was successfully overcome by hardware.

Further, when there is a relation:

$$G=Kg \times INMAX/MAX,$$

wherein Kg is a constant and meets:

$$Kg \leq 1.$$

Then, $$1/G=MAX/(Kg \times INMAX).$$

Kg×INMAX is a constant,
Kg' is defined as a new constant:

$$Kg'=1/(Kg \times INMAX).$$

Then, $$1/G=Kg' \times MAX.$$

That is, an inverter 204 can calculate an inverse of a gain by multiplying a maximum value MAX of the correction image data by the constant Kg'. In view of the above, the inventor constituted by ROM or the like can be replaced by a multiplier, thereby reducing hardware scale and parts.

Further, in case of calculating the second gain (Eq 21), also, similarly, there is a relation:

$$G1=Kg1 \times INMAX/AMAX,$$

wherein Kg1 is a constant and meets:

$$Kg1 \leq 1.$$

Then, $$1/G=AMAX/(Kg1 \times INMAX).$$

Kg1×INMAX is a constant.
Kg1' is defined as a new constant:

$$Kg1'=1/(Kg \times INMAX).$$

Then, $$1/G=Kg1' \times AMAX.$$

That is, the inverter 204 can calculate an inverse of a gain by multiplying AMAX derived by smoothing (averaging) in a frame direction a maximum value of the correction image data detected at a frame prior to a present frame by the constant Kg1'. In view of the above, the inverter constituted by ROM or the like can be replaced by a multiplier, thereby reducing a hardware scale and parts.

Next, third gain calculating method is performed by calculating the gain according to the Eq 20 and averaging. In this case, by means of the calculation similar to the above second method, the inverter can be replaced by the multiplier. While, it is necessary to perform the averaging in both of the gain and the maximum value of the correction image data, separately. Thus, the hardware for performing the processing increases. However, total hardware would be still smaller than the structure using the inverter.

γ correction table 202 for eliminating the saturation of the phosphor may have following structure.

When the characteristics of γ correction table 202 is such that a required luminance is Lr and a change quantity to be applied to the phosphor is qr, and the required luminance Lr and the charge quantity qr are both normalized as:

$$qr=fr(Lr),$$

wherein fr (Lr) is a characteristics stored in the γ correction table 202 for correcting-the saturation of the phosphor.

And gr (Lr) is defined as a function:

$$gr(Lr)=Lr-fr(Lr).$$

That is, gr (Lr) is a function of a difference of the characteristics correlative to the luminance and the charge quantity.

In order to eliminate the saturation of the phosphor, it is necessary to meet a relation:

$$qr=Lr-gr(Lr).$$

In the above described embodiments, the γ correction table 202 may comprise a table of a characteristics gr (Lr) and a subtracter for subtraction between outputs of tables of characteristics Lr to gr (Lr). In such case, the subtracter should be necessary to constitute hardware structure. However, there would be provided an advantage that, in case that the table of the characteristics gr (Lr) is used for the memories of the same capacity, the gradation member can increase, and processing accuracy would be improved.

Figure 27:
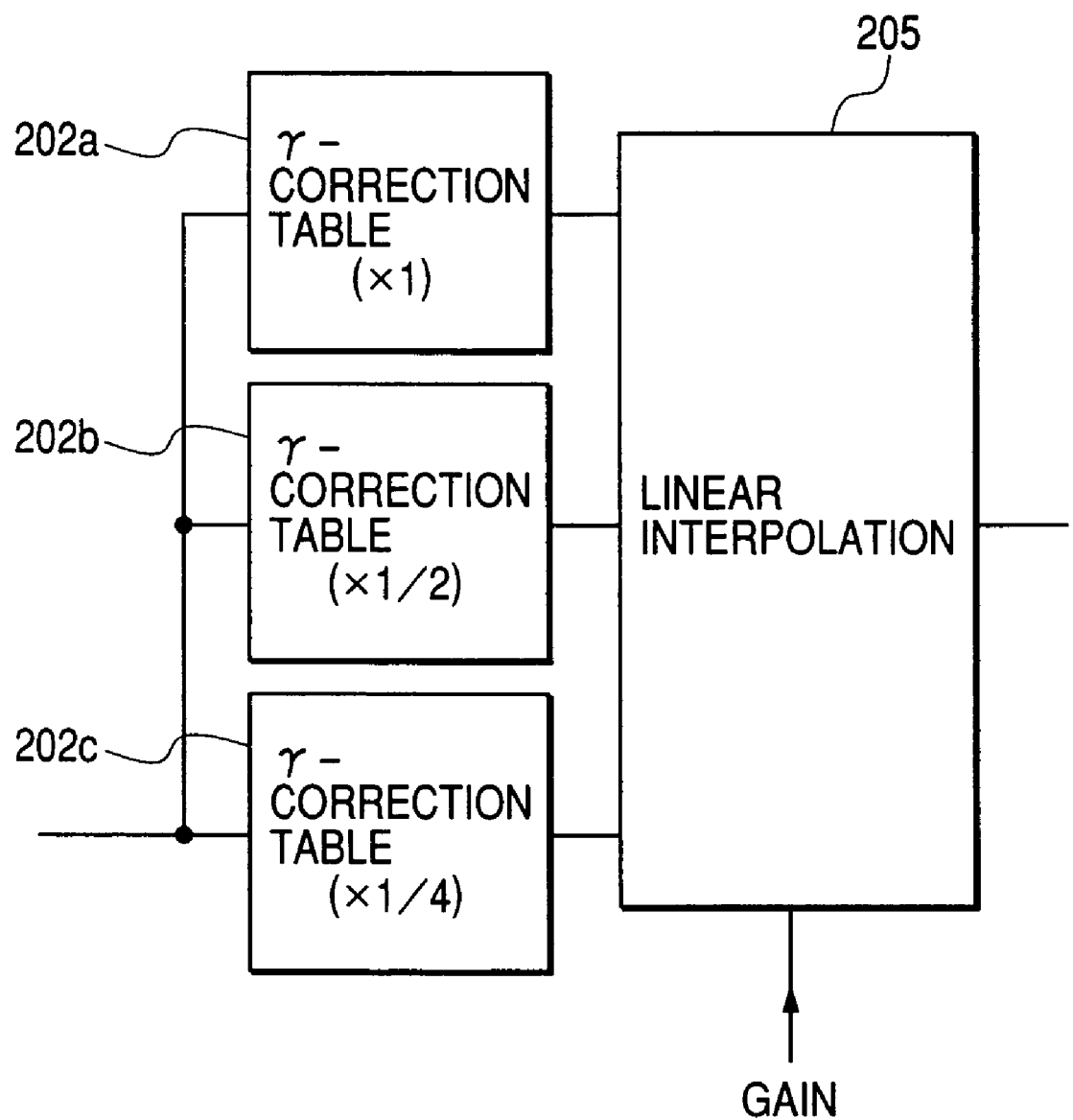
FIG. 27 is a block diagram showing a configuration example 2 of the gradation converter.

FIG. 27 shows another embodiment of the gradation converter. FIG. 27 also shows only a configuration for one color, for simplification. Of course, the gradation converter 200 is constructed of three sets of the same structure for red, green, and blue. In this case, the contents of the respective γ correction tables are prepared according to the saturation characteristics of the phosphors of the respective colors.

In FIG. 27, 202a, 202b, and 202c designate γ correction tables, each of which stores a conversion table to cancel the saturation characteristic of the phosphor corresponding to the emitted charge amounts of charge actually emitted when the gain is 1, ½, or ¼, respectively. In practice, the conversion tables are equivalent to the aforementioned characteristics shown in FIG. 23, FIG. 24, and FIG. 25. Numeral 205 denotes a linear interpolation unit, which is a unit of accepting input of the gain G1, and implementing linear interpolation from outputs of two tables on the both sides of the gain G1 out of the γ correction tables 202a, 202b, and 202c to obtain interpolation values for the gain G1.

Since the characteristic to cancel the saturation characteristic of the phosphor, which is determined by the gain, varies monotonically, the above configuration permits the conversion characteristic for any gain G1 to be determined by the linear interpolation from the characteristics of the respective γ correction tables 202a, 202b, and 202c.

As the number of γ correction tables increases, the accuracy becomes more enhanced, while the cost of hardware rises, naturally. With use of three or more γ correction tables, it was feasible to prevent distinct degradation of display quality.

The above configuration also succeeded in realizing the aforementioned function whereby the aforementioned problem of reddish display was successfully overcome by hardware.

Furthermore, it was described in the above description of the present embodiment that the gradation characteristics of the green and blue phosphors were high in linearity and had no saturation characteristic, but a luminance characteristics of the green and blue phosphors has saturation characteristic in relation to an electric charge quantity even though it is much smaller than that of the red phosphor. In this case, it is also possible to obtain a normalized gradation characteristic as described above for low saturation in each color phosphor, prepare a table to cancel the characteristic, for each color, and thereby make correction for the saturation characteristic of the phosphor of each color.

Further, the saturation characteristics of the phosphor varies according to an acceleration voltage (high power source voltage) between the rear plate and the face plate and to a maximum charge quantity applied to the phosphor. In case of driving a panel, since driving times of respective electron emitting devices are defined, the maximum charge quantity to be applied to the phosphor is dependent on an emission current IE of the electron emitting device. i.e., a voltage (Vs) of a scanning unit and a voltage (Vpwm) of a modulating unit. The saturation characteristics of the phosphor varies according to the voltage of the high power source, the voltage (Vs) of the scanning unit, and the voltage (Vpwm) of the modulating unit. For an initial adjustment to eliminate performance characteristic variation of the display apparatus, and for adjusting by user, by adjusting the voltage of the high power source, the voltage (Vs) of the scanning unit and the voltage (Vpwm) of the modulating unit, it would be desirable to connect to the γ correction table to cancel the saturation characteristics of the phosphor for the corresponding voltage.

(Shift Register and Latch)

The corrected image data Dlim being the output of the limiter is converted from the serial data format into the parallel image data ID1 to IDN for the respective modulation wires by the serial/parallel conversion at the shift register 5, and the parallel image data is outputted to the latch. The latch latches the data from the shift register in accordance with a timing signal Dataload immediately before a start of one horizontal period. The output from the latch 6 is supplied as parallel image data D1 to DN into the modulator.

In the present embodiment the image data ID1-IDN, D1-DN is 8-bit image data. These operations are activated based on the timing control signals TSFT and Dataload from the timing generator 4 (FIG. 12).

(Details of Modulator)

The parallel image data D1-DN being the output of the latch 6 is supplied into the modulator 8.

Figure 28A:
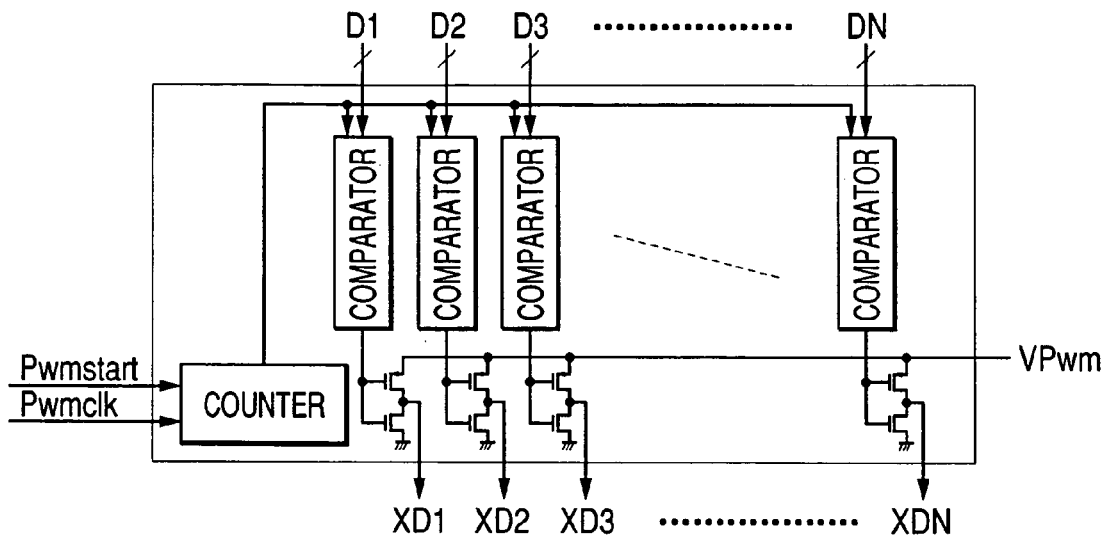
FIGS. 28A, 28B, and 28C are diagrams to illustrate the structure and operation of a modulator in the image display apparatus.

The modulator is, as shown in FIG. 28A, a pulse width modulation circuit (PWM circuit) comprised of a PWM counter, and comparators and switches (FETs in the same figure) for the respective modulation wires.

Figure 28B:
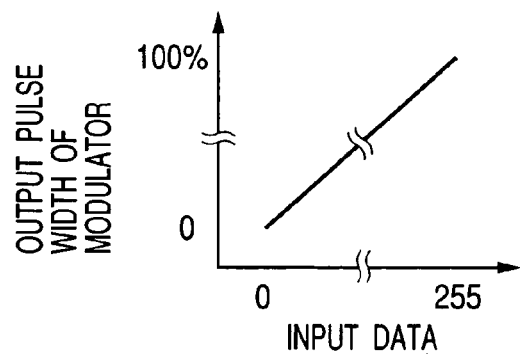

The relation between the image data D1-DN and the output pulse widths of the modulator is the linear relation as shown in FIG. 28B.

Figure 28C:
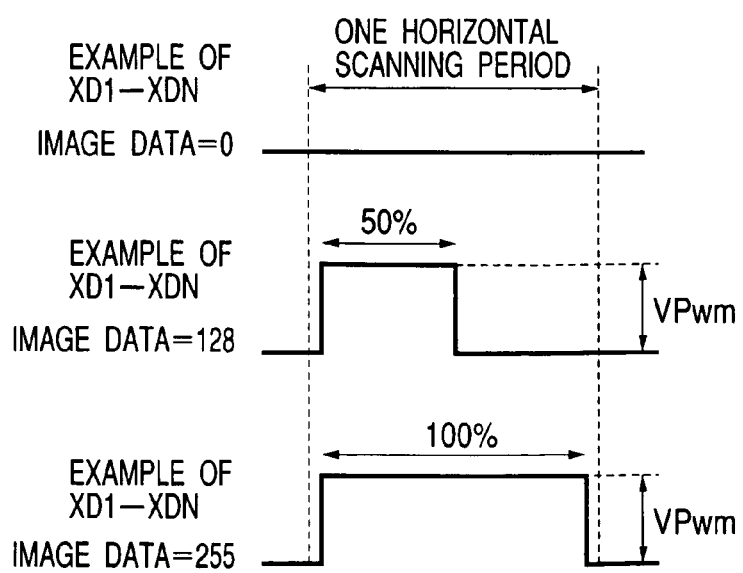

FIG. 28C shows three examples of output waveforms from the modulator.

In FIG. 28C the top waveform is one for the input data of 0 into the modulator, the middle waveform one for the input data of 128 into the modulator, and the bottom waveform-one for the input data of 255 into the modulator.

In the present example the bit count of the input data D1-DN into the modulator is 8 bits.

In the above description there were portions describing that the modulation signal of the pulse width equivalent to one horizontal scanning period was outputted for the input data of 255 into the modulator, but, precisely speaking, there are idle periods provided as timewise margins before the rise of the pulse and after the fall of the pulse though they are very short durations, as shown in FIG. 28C.

Figure 29:
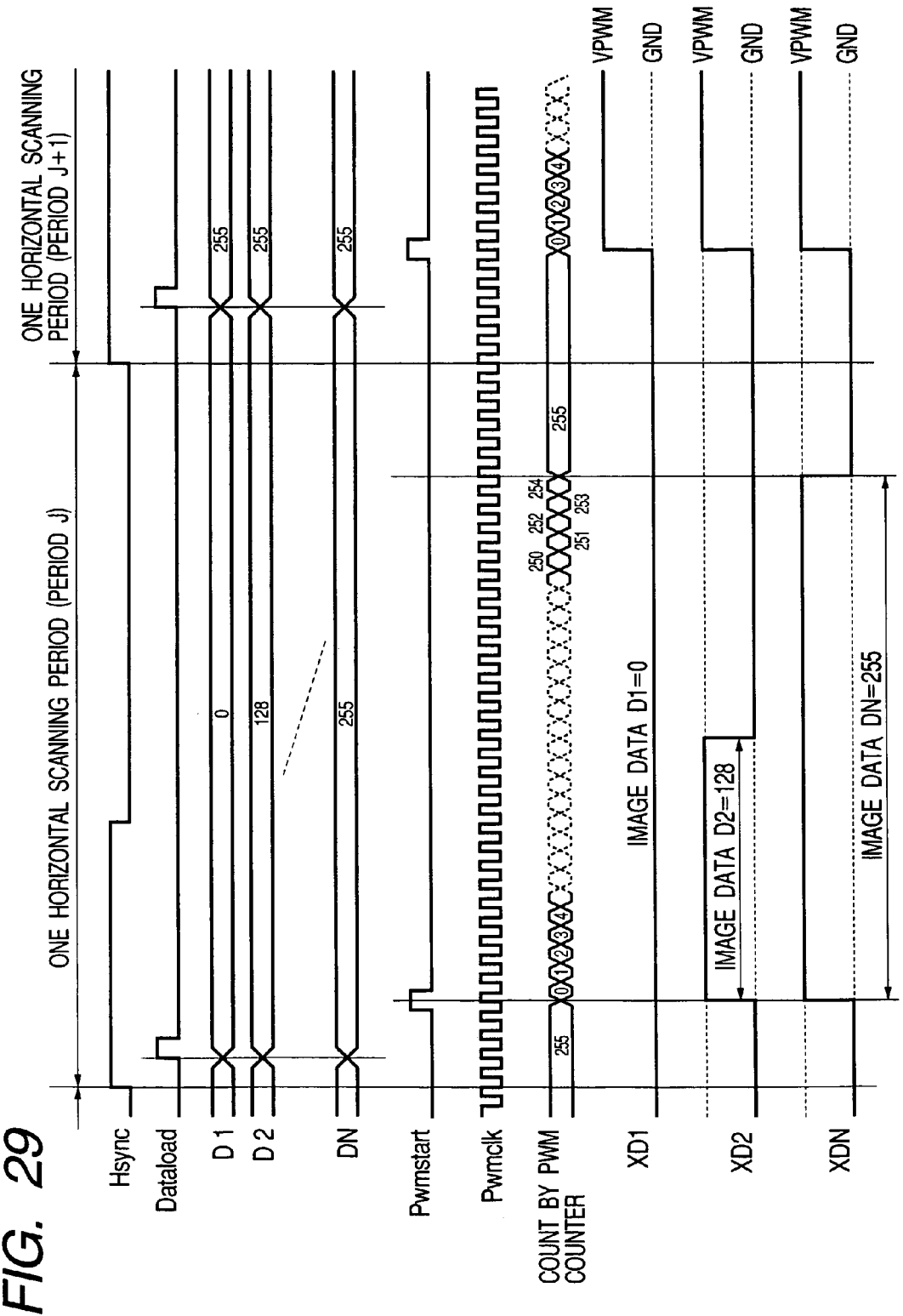
FIG. 29 is a timing chart of the modulator in the image display apparatus.

FIG. 29 is a timing chart showing the operation of the modulator in the embodiment of the present invention.

In the same figure, Hsync designates a horizontal synchronizing signal, Dataload a load signal to the latch 6, D1-DN the-aforementioned input signals into the columns 1-N of the aforementioned modulator, Pwmstart a synchronizing clear signal of the PWM counter, and Pwmclk a clock of the PWM counter. XD1-XDN denote outputs of the first to Nth columns of the modulator.

As shown in FIG. 29, with a start of one horizontal scanning period, the latch 6 starts latching the image data and transferring the data to the modulator.

The PWM counter starts counting on the basis of Pwmstart and Pwmclk, as shown in the same figure, stops counting at the count value of 255, and retains the count of 255.

The comparator for each column compares the count of the PWM counter with the image data of each column, outputs High during periods in which the value of the PWM counter is not less than the image data, and outputs Low during the other periods.

The output of each comparator is coupled to gates of switches for each column, and in each Low period of output of the comparator the upper switch (Vpwm side) in the same figure is ON and the lower switch (GND side) OFF, whereby the modulation wire is connected to the voltage Vpwm.

During each High period of output of the comparator contrary, the upper switch in the same figure is OFF and the lower switch ON, whereby the modulation wire is connected to the GND potential.

When each of the units operates as described above, the pulse width modulation signals from the modulator become signals of waveforms with a synchronized rise of pulses, as indicated by XD1, XD2, and XDN in FIG. 29.

(Correction Data Calculator)

Figure 30:
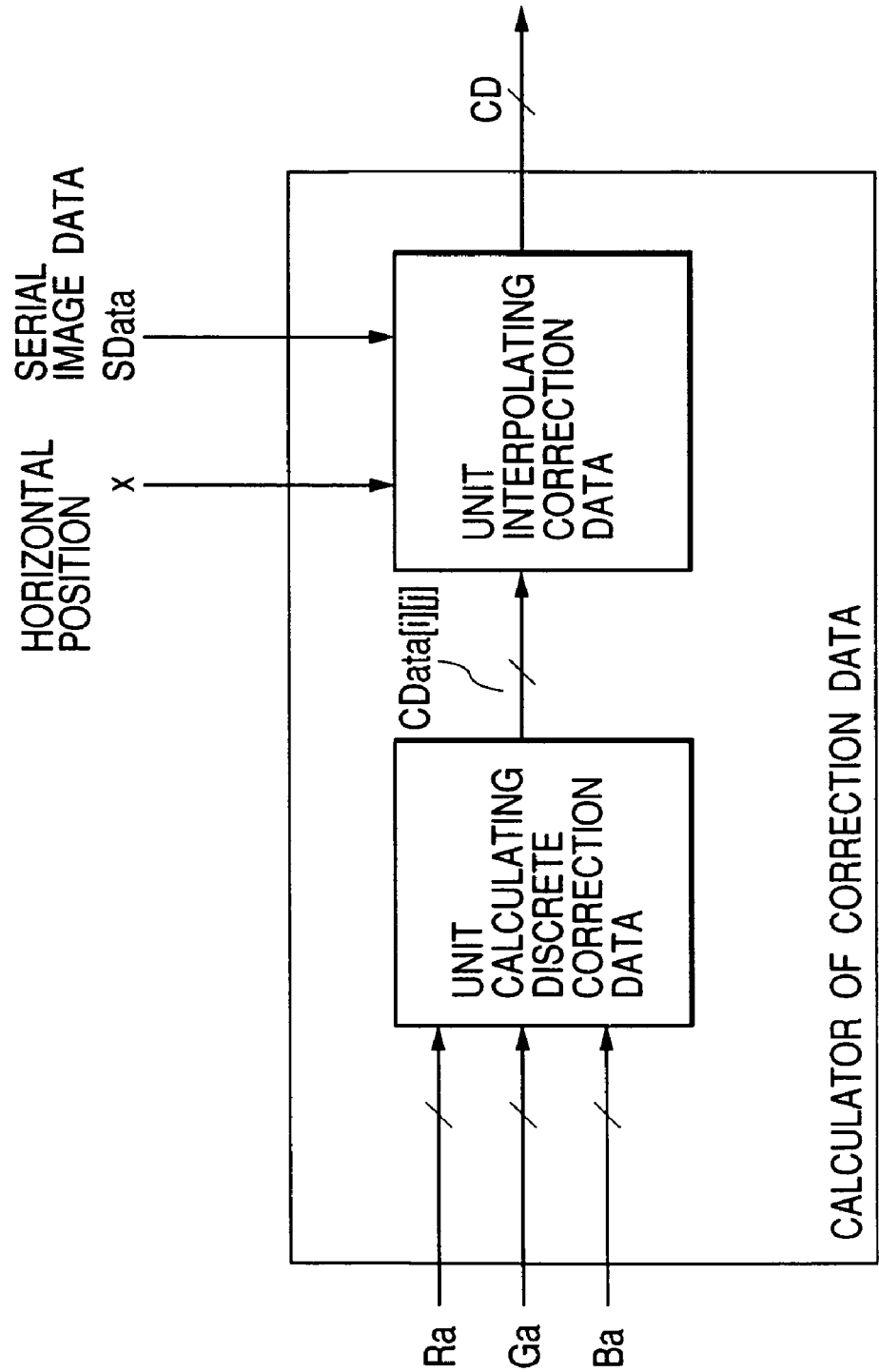
FIG. 30 is a block diagram showing a configuration of a correction data calculator in the image display apparatus.

The correction data calculator is a circuit of calculating the correction data for the voltage drop by the aforementioned correction data calculation method. The correction data calculator is comprised of two blocks of a discrete correction data calculating unit and a correction data interpolating unit as shown in FIG. 30.

The discrete correction data calculating unit calculates the voltage drop amounts from the input video signal and discretely calculates the correction data from the voltage drop amounts. This calculating unit discretely calculates the correction data by adopting the aforementioned concept of the degenerate model, in order to decrease the calculation amount and hardware scale.

The correction data interpolating unit performs the interpolation operation from the discretely calculated correction data to calculate the correction data CD matching the sizes of image data and the-horizontal display positions x.

(Discrete Correction Data Calculating Unit)

Figure 31:
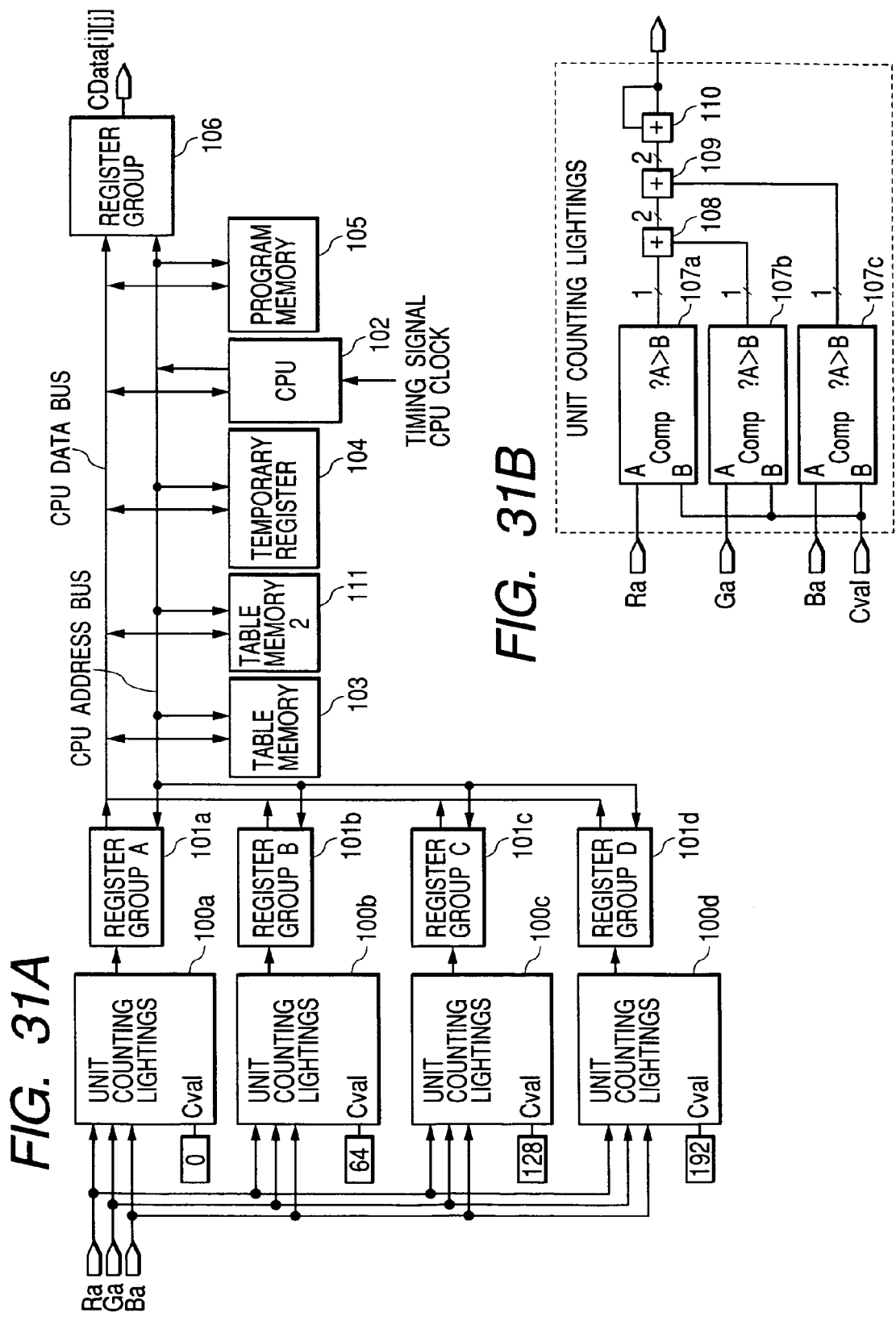
FIGS. 31A and 31B are block diagrams showing a configuration of a discrete correction data calculating unit in the image display apparatus.

FIGS. 31A and 31B show the discrete correction data calculating unit for calculating the discrete correction data in the embodiment of the present invention.

The discrete correction data calculating unit is, as described below, a unit having a function of grouping the image data into blocks, calculating statistics (numbers of lighting devices) of the respective blocks, and calculating time changes of voltage drop amounts at the positions of the respective nodes from the statistics, a function of converting the voltage drop amounts at the respective times into emission luminance amounts, and a function of integrating the emission luminance amounts over the time to obtain the total emission luminance amounts; and calculating the correction data for the reference values of image data at the discrete reference points from the total emission luminance amounts.

In FIGS. 31A and 31B, 100*a*-100*d* designate lighting device counting units; 101*a*-101*d* register groups for storing the numbers of lighting devices at respective times, for the respective blocks; 102 a CPU; 103 a table memory for storing the parameters aij in Eqs 2 and 3; 104 a temporary register for temporarily storing the-calculation result; 105 a program memory which stores programs of CPU; 111 a table memory which stores the conversion data for conversion of voltage drop amounts into emission current amounts; 106 a register group for storing the result of calculation of the aforementioned discrete correction data.

Each of the lighting device counting units 100*a*-100*d* is comprised of comparators and adders as shown in FIG. 31B. The video signals Ra, Ga, and Ba are fed into the respective comparators 107*a*-107*c*, to be compared with the value of Cval one by one.

Cval is equivalent to the image data reference value set for the image data as described previously.

Each comparator 107*a-c* compares the image data with Cval and outputs High if the image data is larger, or outputs Low if it is smaller.

The adders 108 and 109 add up the outputs from the comparators, and the adder 110 further adds up the data in every block. The result of the addition in each block is stored as the number of lighting devices in each block in the register group 101*a-c*.

The lighting device counting units 10*a-d* accept their respective inputs of 0, 64, 128, and 192, respectively, as the comparison value Cval of the comparators.

As a result, the lighting device counting unit 100*a* counts the number of image data greater than 0 out of the image data and stores the sums of the respective blocks in the register 101*a*.

Likewise, the lighting device counting unit 100*b* counts the number of image data greater than 64 out of the image data and stores the sums of the respective blocks in the register 10*b*.

Similarly, the lighting device counting unit 100*c* counts the number of image data greater than 128 out of the image data and stores the sums of the respective blocks in the register 10*c*.

Similarly, the lighting device counting unit 100*d* counts the number of image data greater than 192 out of the image data and stores the sums of the respective blocks in the register 101*d*.

After completion of counting the lighting devices in the respective blocks and at the respective times, the CPU reads the parameter table aij stored in the table memory 103, as needed, calculates the voltage drop amounts according to Eqs 2 to 5, and stores the calculation results in the temporary register 104.

In the present example the CPU is provided with the sum-of-products operation function for smoothly performing the calculation of Eq 2.

The means for implementing the operation according to Eq 2 does not always have to be the means performing the sum-of-products operation in the CPU, but it may be substantiated, for example, by storing the calculation results in a memory.

Namely, it can be contemplated that a memory is configured to accept input of the numbers of lighting devices in the respective blocks and store voltage drop amounts at the respective node positions for all possible input patterns.

After completion of the calculation of voltage drop amounts, the CPU reads the voltage drop amounts at the respective times and in the respective blocks out of the temporary register 104, makes reference to the table memory 2 (111) to convert the voltage drop amounts into emission current amounts, and calculates the discrete correction data according to Eqs 6 to 9.

The discrete correction data thus calculated is stored in the register group 106.

(Correction Data Interpolating Unit)

The correction data interpolating unit is a unit for calculating the correction data matching the display positions (horizontal positions) of the image data and the sizes of image data. This unit performs the interpolation from the discretely calculated correction data to obtain the correction data according to the display positions (horizontal positions) of the image data and the sizes of the image data.

Figure 32:
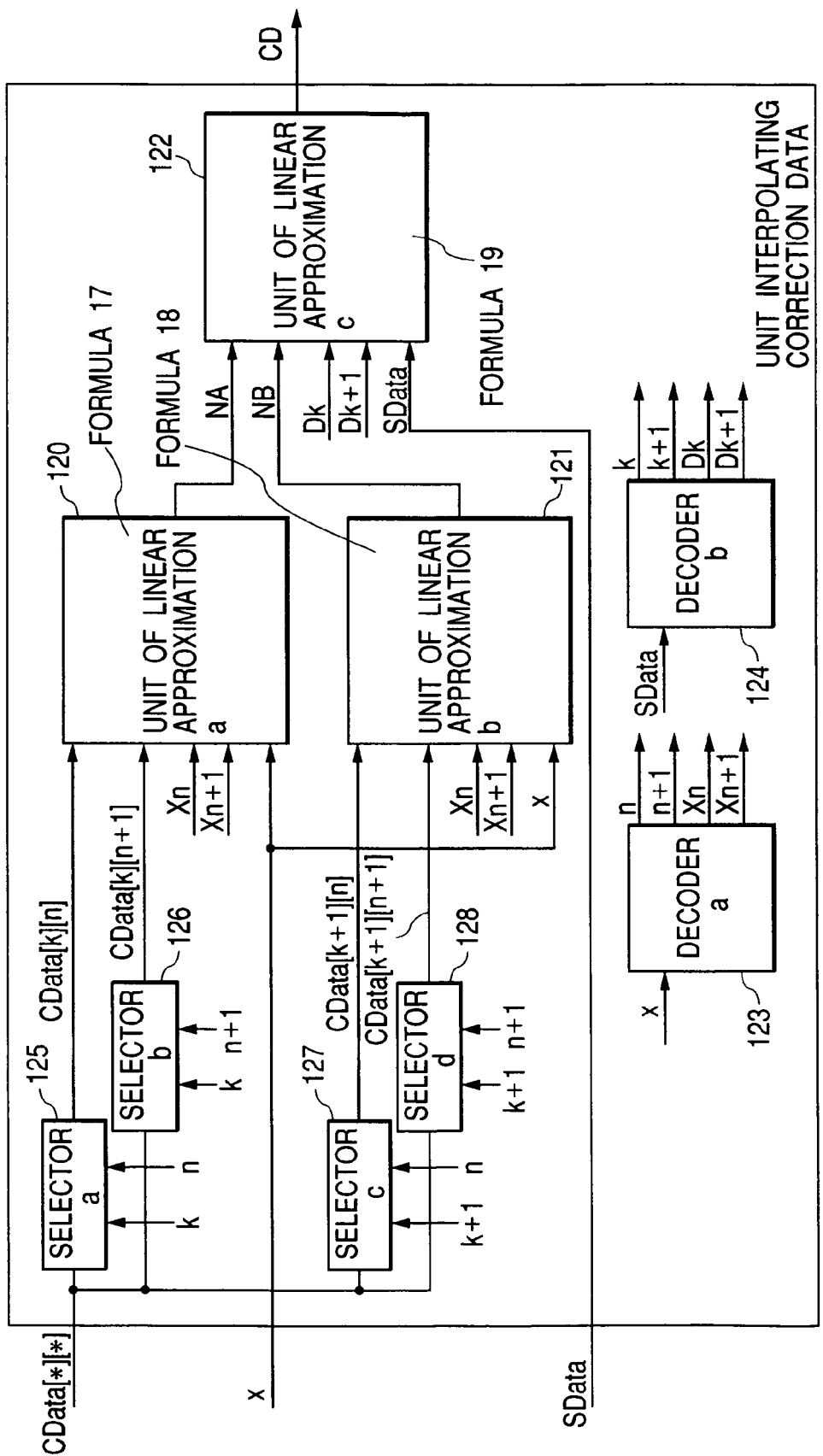
FIG. 32 is a block diagram showing a configuration of a correction data interpolating unit.

FIG. 32 is a diagram for explaining the correction data interpolating unit.

In FIG. 32 numeral 123 designates a decoder for determining node numbers n and n+1 of discrete correction data used for the interpolation, from the display position (horizontal position) x of image data, and numeral 124 a decoder for determining k and k+1 in Eq 17 to Eq 19 from the size of the image data.

Selectors 125 to 128 are selectors for selecting discrete correction data and supplying it to linear approximation units.

Numerals 121 to 123 denote linear approximation units for effecting the linear approximations of Eq 17 to Eq 19, respectively.

Figure 33:
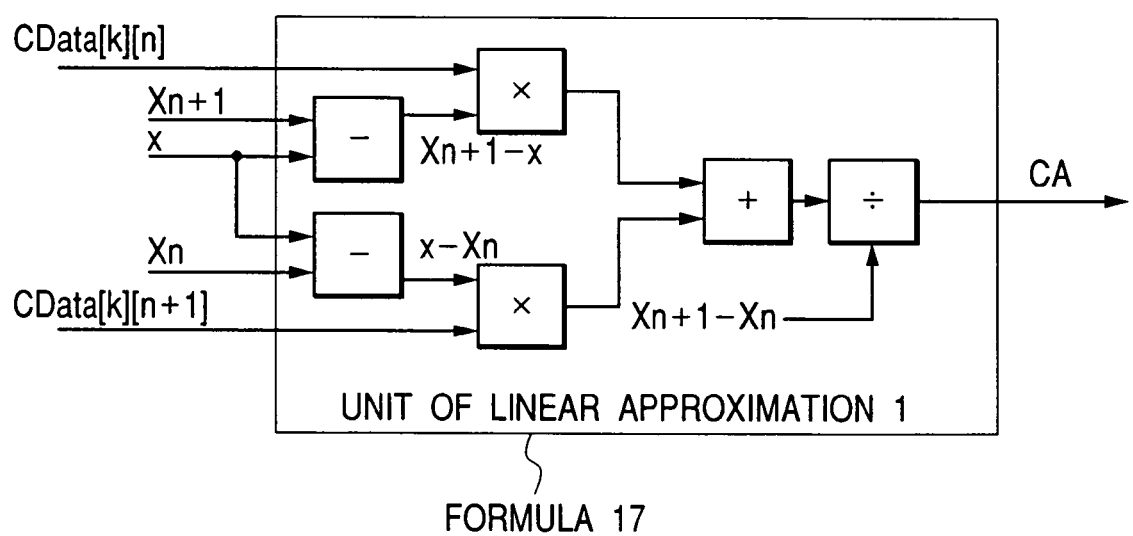
FIG. 33 is a block diagram showing a configuration of a linear approximation unit.

FIG. 33 shows a configuration example of the linear approximation unit 121. As seen from the operators in Eq 17 to Eq 19, the linear approximation unit can be generally comprised of subtracters, accumulators, an adder, and a divider, for example.

However, the linear approximation unit is preferably configured so that the number of column wires between nodes for calculation of the discrete correction data and intervals of image data reference values for calculation of the discrete correction data (i.e., time intervals for calculation of voltage drop) are powers of 2, because it can provide the advantage that the hardware can be constructed in very simple structure. When those are set in powers of 2, (Xn+1−Xn) in the divider shown in FIG. 33 becomes a value of a power of 2, which can be implemented simply by a bit shift.

If the value of (Xn+1−Xn) is always a constant value and value expressed by the power of 2, the output of the divider can be obtained by shifting the addition result of the adder by the degree equivalent to the power, and, therefore, the divider does not have to be provided.

In the other portions, when the intervals of the nodes for calculation of discrete correction data and the intervals of the image data are powers of 2, it becomes feasible to readily fabricate the decoders 123, 124, for example, and to replace the operations in the subtracters in FIG. 33 with easy bit operations, thus providing many merits.

(Operation Timing of Each Unit)

FIGS. 34A to 34C present a timing chart of operation timing of each unit.

In FIGS. 34A to 34C, Hsync denotes a horizontal synchronizing signal; DotCLK a clock created from the horizontal synchronizing signal Hsync by the PLL circuit in the timing generator; R, G, and B digital image data from the input switching circuit; Data image data after the data sequence conversion; Dlim the output of the limiter, which is the corrected image data after the correction for the voltage drop; TSFT a shift clock for transferring the corrected image data Dlim to the shift register 5; Dataload a load pulse signal for latching the data in the latch 6; Pwmstart a start signal of the aforementioned pulse width modulation; the modulation signal XD1 an example of the pulse width modulation signal supplied to the modulation wiring 1.

With a start of one horizontal period, the digital image data RGB is transferred from the selector 23. Let R_I, G_I, and B_I be the input image data during the horizontal scanning period I in FIGS. 34A to 34C. Then those image data items are stored during one horizontal period in the data sequence converter 9, and are outputted as digital image data Data_I in alignment with the pixel array of the display panel during the horizontal scanning period I+1.

The image data items R_I, G_I, and B_I are fed into the correction data calculator during the horizontal scanning period I. This calculator counts the aforementioned lighting devices and obtains the voltage drop amounts at the end of the counting.

Subsequent to the calculation of voltage drop amounts, the discrete correction data is calculated and the calculation result is stored in the register.

When the time moves into the scanning period I+1, the data sequence converter outputs the image data Data_I in the preceding horizontal scanning period, and in synchronism therewith, the correction data interpolation unit performs the interpolation from the discrete correction data to calculate the correction data. The correction data after the interpolation is supplied to the adder 12.

The adder 12 sequentially adds the correction data CD to the image data Data and transfers the corrected image data Dlim after the correction to the shift register. The shift register stores the corrected image data Dlim of one horizontal period according to Tsft and effects serial-parallel conversion thereon to output parallel image data ID1-IDN to the latch 6. The latch 6 latches the parallel image data ID1-IDN from the shift register according to a rise of Dataload, and transfers the latched image data D1-DN to the pulse width modulator 8.

The pulse width modulator 8 outputs the pulse width modulation signals of the pulse widths according to the latched image data. In the image display apparatus of the present embodiment, as a result, the pulse width modulation signals outputted from the modulator are displayed with a delay of two horizontal scanning periods behind the input image data.

Display of images was actually carried out using the image display apparatus as-described above, and it was verified that it was feasible to make the correction for the voltage drop amounts on the scanning wiring, which was the problem heretofore, to make improvement in the degradation-of-display images caused thereby, and to provide display of remarkably excellent images.

The adoption of the several approximations presented the exceptional effects of facilitating the proper calculation of correction amounts of image data for the correction for the voltage drop, implementing it by very simple hardware, and so on.

Second Embodiment

The corrected image data Dout is the result of the addition of image data Data and correction data CD.

Unless the result of this addition falls within the input range of the modulator, the correction can induce overflow, which raised the concern that another sense of strangeness appeared in the display image.

In order to solve this problem, the first embodiment was configured to prevent the overflow by the method of detecting the maximum of corrected image data, calculating the gain so that the maximum became corresponding to the maximum of the input range of the modulator, and multiplying the corrected image data by the gain.

As compared therewith, the present embodiment is similar in the detection of the maximum of the corrected image data, but is different in that the size of the image data before execution of the correction is limited so that the aforementioned maximum becomes corresponding to the maximum of the input range of the modulator.

Namely, in order to prevent the overflow, the input image data is preliminarily multiplied by a gain to narrow the amplitude range thereof, thereby preventing the overflow.

The overflow process of the present embodiment will be described hereinafter with reference to FIG. 35.

In FIG. 35, 22R, 22G, and 22B denote multipliers; 9 a data sequence converter; 5 a shift register for one line of-image data; 6 a latch for one line of image data; 8 a pulse width modulator for outputting modulation signals into the modulation wires of the display panel; 12 an adder; 14 a correction data calculator; 20 a maximum value detector (unit) for detecting the maximum of corrected image data Dout in a frame; 21 a gain calculator; 200 a gradation converter. The gradation converter 200 will be described later, and the following description will be given on the assumption that the modulation converter 200 is absent.

R, G, and B denote parallel RGB input video data; Ra, Ga, and Ba parallel RGB video data after the inverse γ conversion process; Rx, Gx, and Bx image data resulting from the multiplication by GAIN G2 at the multipliers; GAIN G2 a gain calculated by the gain calculator; Data image data after the parallel-serial conversion at the data sequence converter; CD correction data calculated by the correction data calculator; Dout image data corrected by the addition of correction data and image data at the adder (corrected image data); Dlim corrected image data obtained by limiting Dout below the upper limit of the input range of the modulator, by the limiter.

(Multipliers 22R, 22G, 22B)

The multipliers 22R, 22G, and 22B are units for multiplying the image data Ra, Ga, Ba after the inverse γ conversion by GAIN G2.

More specifically, each of the multipliers multiplies the image data by GAIN G2 according to the gain determined by the gain calculator and outputs the image data Rx, Gx, Bx after the multiplication.

GAIN G2 is a value that is calculate by the gain calculator and that is determined so that the corrected image data Dout, which is the result of the addition of the image data Data and the correction data at the adder described hereinafter, falls within the input range of the modulator.

(Maximum Detector 20)

The maximum detector 20 will be described below.

Figure 35:
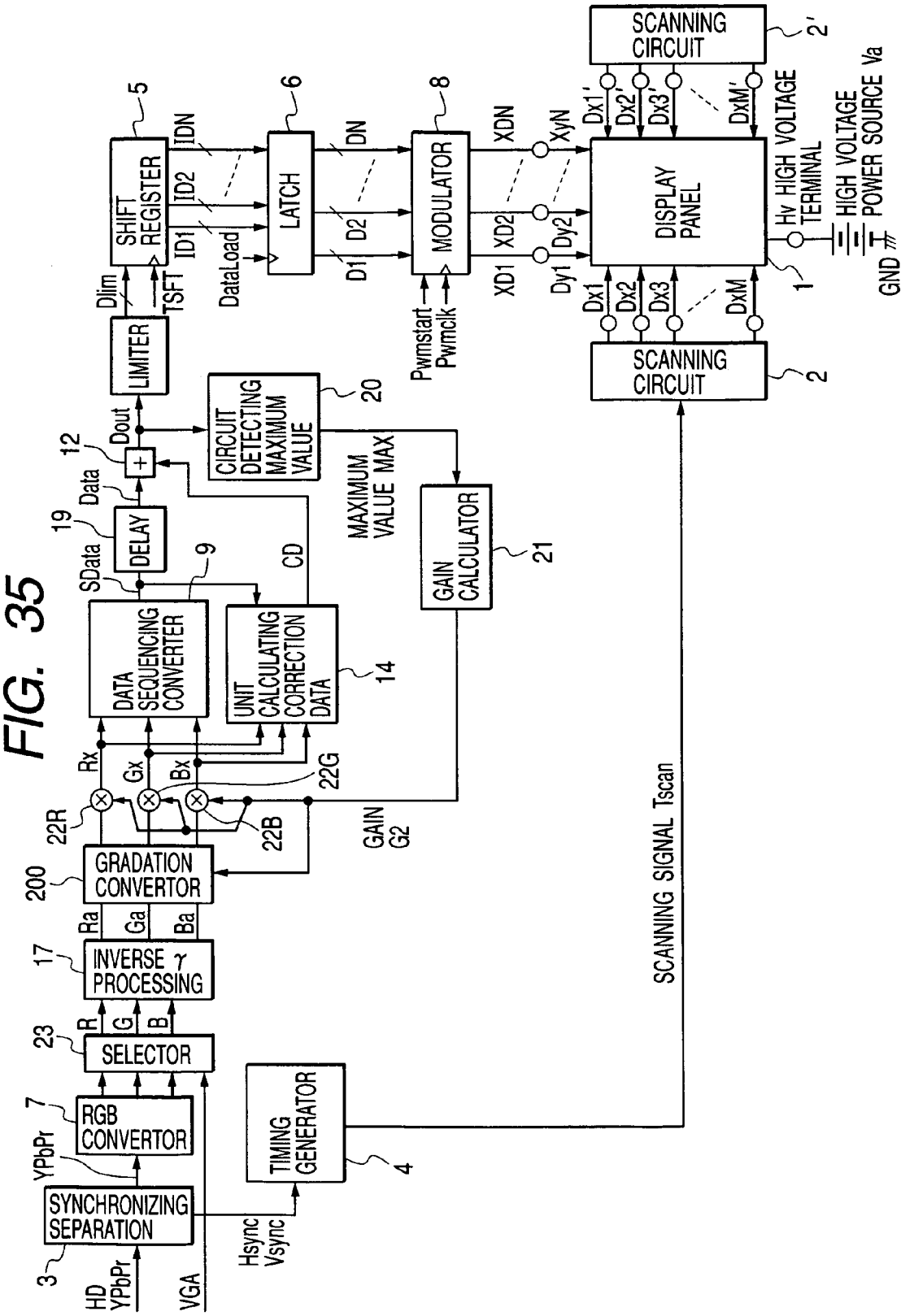
FIG. 35 is a block diagram showing a schematic configuration of the image display apparatus of a second embodiment.
Figure 36:
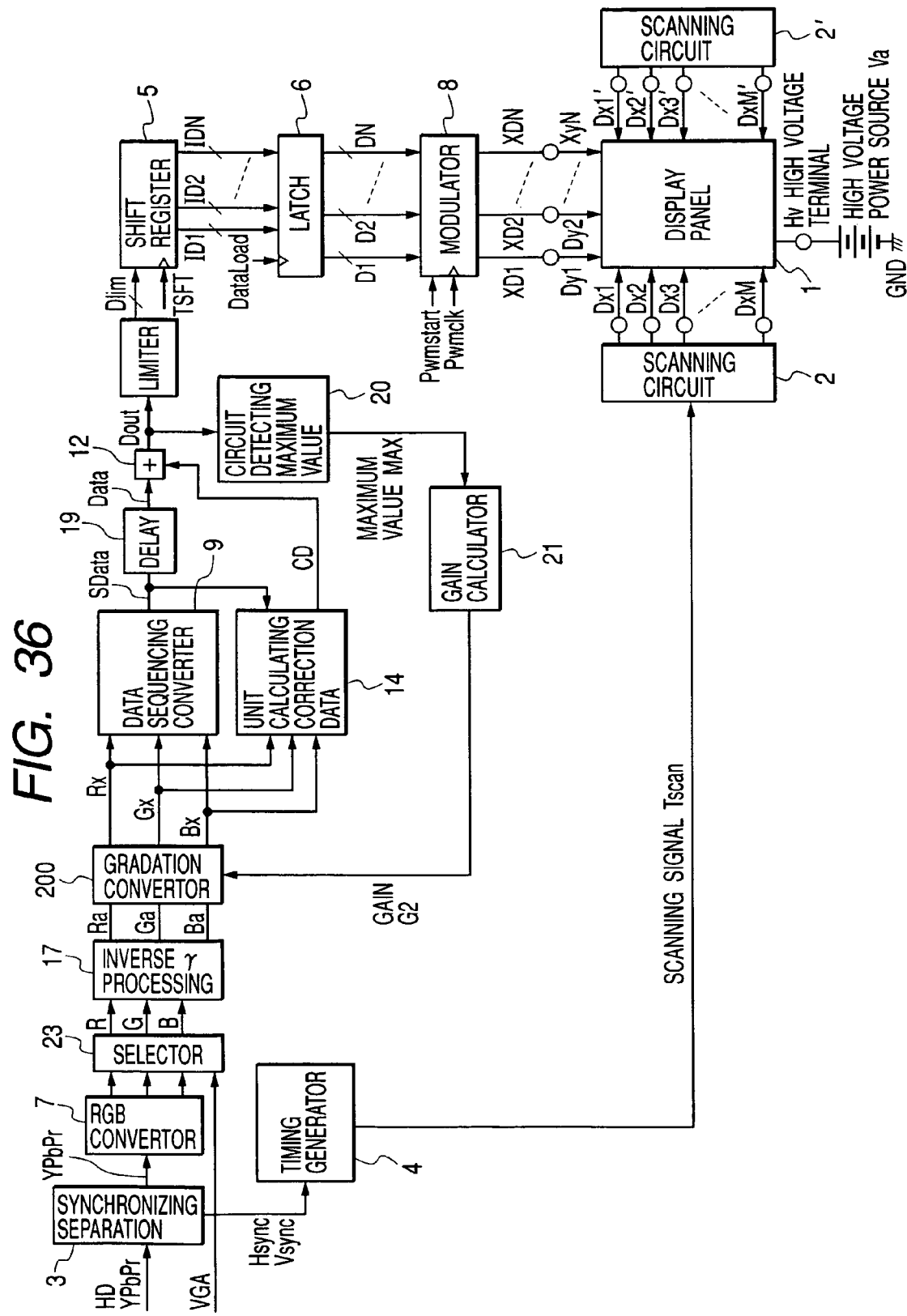
FIG. 36 is a block diagram showing the configuration of the image display apparatus of the second embodiment with smaller-scale hardware.

The maximum detector in the embodiment of the present invention is coupled to each of the units, as shown in FIG. 35.

The maximum detector is a unit of detecting a maximum value out of the corrected image data Dout of one frame.

This detector is a circuit that can be readily constructed of a comparator and a register, for example. This detector is a circuit of comparing the size of corrected image data Dout sequentially transferred thereto, with the value stored in the register and updating the value of the register with the data value if the corrected image data Dout is greater than the register value.

The value of the register is cleared to 0 at the head of a frame, and then a maximum MAX of the corrected image data in that frame is stored in the register at the time of the end of the frame.

The maximum MAX of the corrected image data detected in this way is transferred to the gain calculator.

(Gain Calculator)

The gain calculator is a unit of calculating the gain so that the-corrected image data Dout falls within the input range of the modulator, with reference to the detected value MAX of the maximum detector. In the present embodiment, the gain calculator also calculates the gain for adjustment of the amplitude of the corrected image data on the basis of the adaptive gain method.

Alternatively, the gain may be calculated by the fixed gain method, from the viewpoint of preventing the overflow of the corrected image data in the configuration of the present embodiment (FIG. 35).

The gain determining method can be a method of determining the gain so as to satisfy the following condition:

$$\text{GAIN G2} \leq (INMAX/MAX) \times GB \quad \text{(Eq 22)},$$

where MAX is the maximum of corrected image data Dout in one frame, INMAX the maximum of the input range of the modulator, and GB GAIN G2 calculated for an immediately preceding frame by the gain calculator.

This gain calculator updates the gain in a vertical trace period and changes the value of the gain every frame.

In the configuration of the image display apparatus according to the embodiment of the present invention, the gain by which the corrected image data of the current frame is multiplied is calculated using the maximum of the corrected image data of the preceding frame.

Namely, the apparatus is configured to prevent the overflow by making use of the correlation of corrected image data (image data) between frames.

Strictly speaking, overflow can occur because of the difference of corrected image data between frames accordingly.

In order to solve this problem, the circuit was designed with a limiter located at the output of the multiplier for multiplying the corrected image data by the gain so that the output of the multiplier always fell into the input range of the modulator, and it presented better result.

Inventors confirmed that the gain could be calculated by another method as described below, in addition to the above gain determining method.

Namely, the gain for the corrected image data of the current frame can be determined so as to satisfy the following condition:

$$\text{GAIN G2} \leq (INMAX/AMAX) \times GB \quad \text{(Eq 23)},$$

where AMAX is an average obtained by averaging maximums of corrected image data detected in frames preceding to the current frame.

In the above condition GB denotes GAIN G2 calculated for the immediately preceding frame by the gain calculator.

Another method can be a method of calculating GAIN G2 for each frame according to Eq 22 and averaging gains of respective frames to obtain the current gain.

Inventors confirmed that any of these three methods was suitably applicable in terms of the prevention of overflow and concluded that the gain was preferably calculated by the method of Eq 23 in consideration of occurrence of flicker as described in the first embodiment.

Inventors conducted research on the number of frames to be used for the averaging of maximums of corrected image data in the gain calculation method of Eq 23 and found a preferred configuration of averaging the maximums of corrected image data in the range of 16 to 64 frames preceding to the current frame, with better result.

It is needless to mention that the present method is configured, more preferably as shown-in FIG. 35, so as to prevent the overflow completely by the limiter for limiting the output of the adder.

The gain calculation method may also be modified based on detection of the scene change, as in the first embodiment.

(Gradation Converter)

In the second embodiment, much the same phenomena as in the first embodiment were recognized in the absence of the gradation converter 200.

The second embodiment is different only in the place for the multiplication by the gain in the overflow process, and is thus provided with the gradation converter 200 in the configuration similar to that in the first embodiment. The characteristics and configuration of the gradation converter are the characteristics of FIG. 22, FIG. 23, FIG. 24, and FIG. 25 and the configuration of FIG. 26 or FIG. 27, as in the first embodiment. This configuration successfully canceled the influence of saturation of phosphors and overcame the aforementioned problem of reddish display.

When the configuration of the gradation connecter 200 is one shown in FIG. 26, as shown in the first embodiment, a table of a characteristics of gr (Lr) being a function of a difference between characteristics correlative to a luminance and a charge quantity, and a subtracter for subtracting between outputs from tables of the characteristics Lr and gr (Lr) may be used.

And, when the configuration of the gradation converter 200 in the second embodiment is the configuration shown in FIG. 26, the multipliers 22R, 22G, 22B in FIG. 35 and the multiplier 203 and the inverse number generator 204 in FIG. 26 are omissible. The reason is that the input data into the multiplier 203 is multiplied by 1/gain in the multiplier 203 and the output therefrom is further multiplied by the gain at each multiplier 22R, 22G, 22B, so that the input data into the multiplier 203 is equal to the output data from the multipliers 22R, 22G, 22B.

Figure 37:
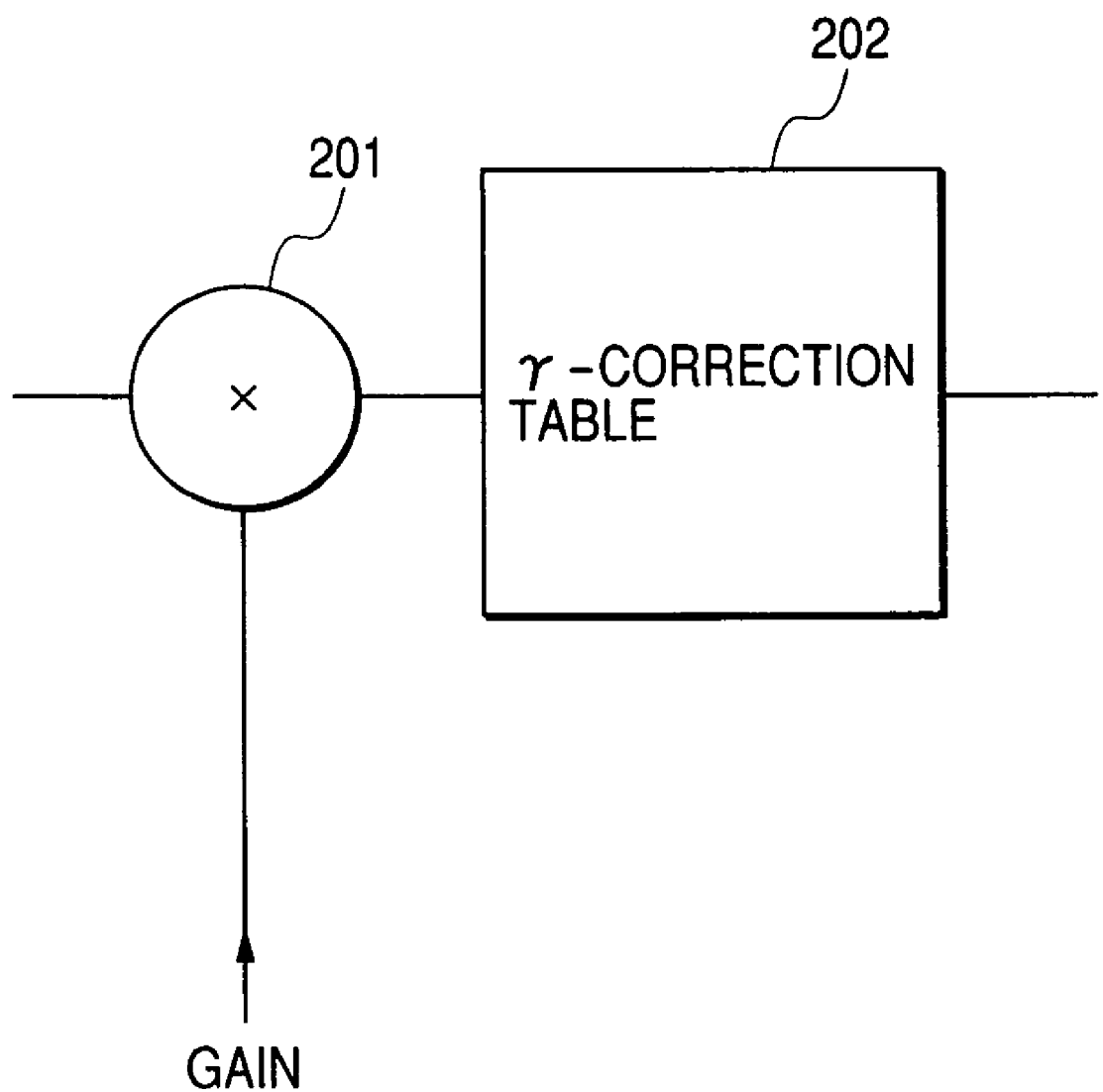
FIG. 37 is a block diagram showing a configuration example of the gradation converter with smaller-scale hardware in the second embodiment.
Figure 38:
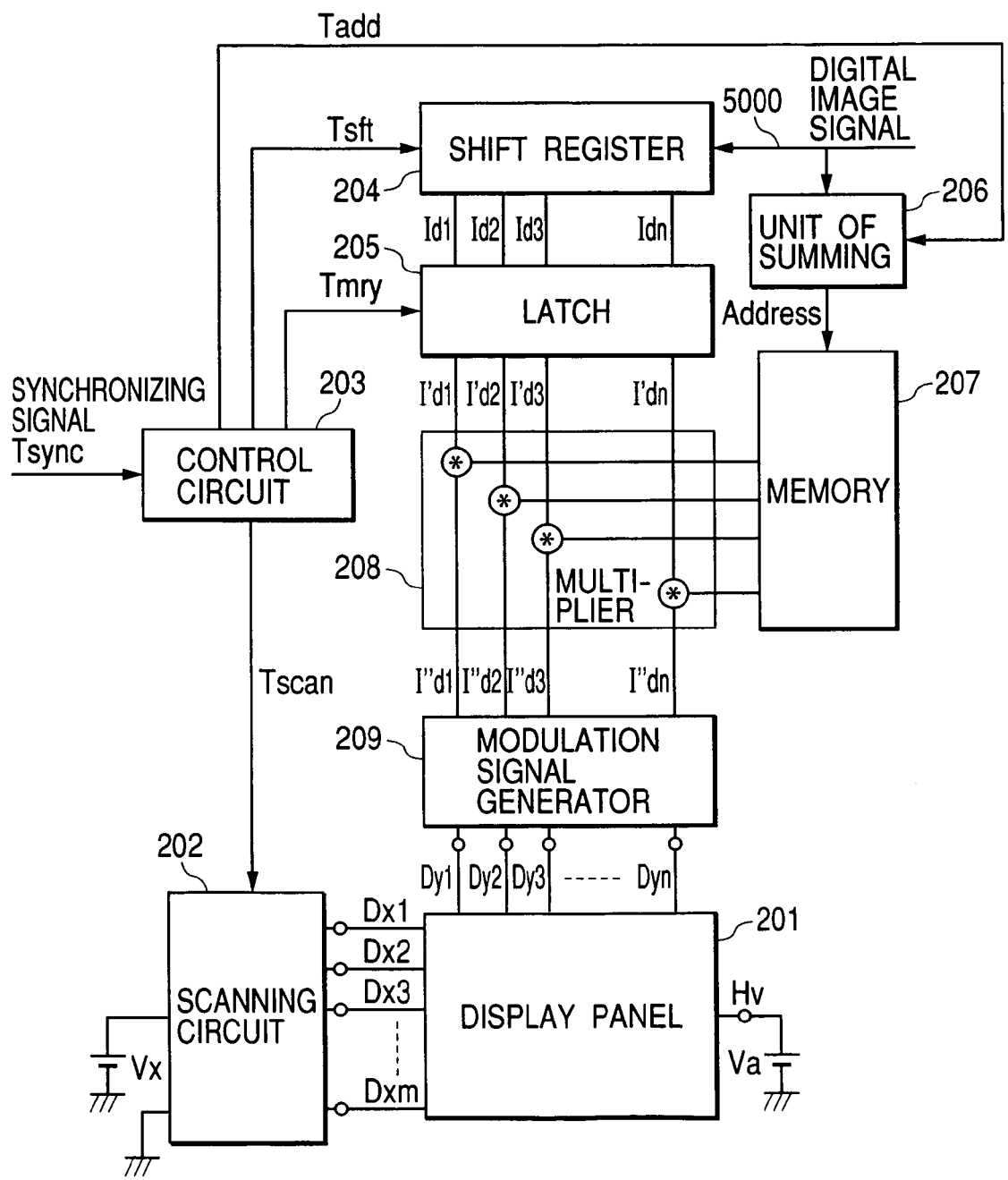
FIG. 38 is a block diagram showing the configuration of the conventional image display apparatus.

The configuration in this arrangement is presented in FIG. 37 and FIG. 38. Since the structure and operation are the same, the description thereof is omitted herein.

Furthermore, just as in the case of the first embodiment, it was also described in the second embodiment that the gradation characteristics of the green and blue phosphors were high in linearity and had no saturation characteristic, but in practice a luminance characteristics of the green and blue phosphors has a saturation characteristic in relation to an electric charge quantity, even though it is much smaller than that of the red phosphor. In this case, it is also possible to employ a method of determining the aforementioned normalized gradation characteristic for low saturation in each color, preparing a table to cancel the characteristic, for each color, and thereby making correction for the saturation characteristic of the phosphor of each color.

It is also possible to downsize the hardware scale in such a way that the characteristics of the γ tables 202a, 202b, 202c in FIG. 27 are determined in consideration of the characteristics of the inverse the γ processor 17 and the inverse γ processor 17 is excluded.

As described in the first embodiment, the saturation characteristics of the phosphor varies according to on acceleration voltage (a voltage of the high power source) between the face plate and the near plate and to a maximum charge quantity applied to the phosphor. In driving the panel, since the driving times of respective electron emitting devices are determined, a maximum charge quantity to be applied to the phosphor is dependent on an emission current IE of the electron emitting device, i.e., a voltage. (Vs) of the scanning unit and a voltage (Vpwm) of the modulation unit. The saturation characteristics of the phosphor varies according to the voltage of the high power source, the voltage (Vs) of the scanning unit and the voltage (Vpwm) of the modulating unit. For an initial adjustment for eliminating performance characteristic variations of the display apparatus, and for user's adjustment, in case of varying the voltage of the high power source, the voltage (Vs) of the scanning unit and the voltage (Vpwm) of the modulating unit, it is desirable to convert into γ correction table eliminating the saturation characteristic variations of the phosphor corresponding voltage.

Furthermore, in the case of the image display apparatus according to the embodiment of the present invention, with entry of nonzero, uniform image data common to all the colors, the apparatus is driven with the process of canceling the influence of the voltage drop so that a pulse width of a pulse from the modulator close to the output terminals of the scanning circuit becomes shorter than a pulse width of a pulse from the modulator far from the output terminals of the scanning circuit.

Furthermore, as a result of canceling the saturation characteristics of phosphors dependent upon the emitted charge amounts of the electron-emitting devices, the driving is implemented without deviation of luminance balance among displayed colors, i.e., at almost even color temperature of white color, for any image data uniform and common to all the colors.

The embodiment of the present invention presented the example of making the correction to cancel the saturation characteristics of the phosphors, and it is noted that the same configuration as in the embodiment of the present invention can also make correction for change of gradation characteristics due to the electron emission amounts because of the influence of degradation of the driving voltage waveforms for the electron-emitting devices (waveform rounding) or the like.

As described above, the image display apparatus of the present invention succeeded in making proper improvement in the degradation of display image due to the voltage drop on the scanning wiring, which was the problem heretofore.

The adoption of the several approximations provided the remarkably excellent effects of facilitating the proper calculation of corrected image data with correction for the influence of the voltage drop, implementing it by very simple hardware, and so on.

Furthermore, the image display apparatus of the present invention was provided with the overflow processing circuit for preventing the overflow of the image data after the correction from the input range of the modulator, whereby the overflow was prevented by the gain.

Since the gradation converter for changing the gradation conversion characteristics according to the gain was provided in the stage preceding to the configuration of making the correction for the influence of the voltage drop, it was feasible to successfully cancel the saturation characteristics of the phosphors and thereby display the images with high quality.

What is claimed is:

1. An image display apparatus comprising:
a plurality of electron-emitting devices connected to a plurality of row wires and column wires respectively and arranged in a matrix pattern;
a phosphor emitting light in response to an irradiation with an electron emitted from the electron-emitting devices;
scanning means connected to said row wires and applying a selection voltage to selected ones of said row wires;
modulating means connected to said column wires;
gradation converting means for performing gradation conversion of input image data according to a characteristic of the phosphor; and
corrected image data calculating means for calculating corrected image data, which is image data after correction for influence on a voltage applied to an electron-emitting device due to a voltage drop through said row wires, corresponding to the converted image data outputted from the gradation converting means, wherein
the modulating means inputs the corrected image data, and outputs modulation signals to said column wires, and a characteristic of the gradation converting means is set so as to correct the light emission characteristics in a case of no voltage drop.

2. An image display apparatus comprising:
a plurality of electron-emitting devices connected to a plurality of row wires and column wires respectively and arranged in a matrix pattern;
a phosphor emitting light in response to an irradiation with an electron emitted from the electron-emitting devices;
scanning means connected to said row wires and applying a selection voltage to selected ones of said row wires;
modulating means connected to said column wires;
gradation converting means for performing gradation conversion of input image data according to a characteristic of the phosphor;
corrected image data calculating means for calculating corrected image data, which is image data after correction for influence on a voltage applied to an electron-emitting device due to a voltage drop through said row wires, corresponding to the converted image data outputted from the gradation converting means; and
amplitude adjusting means having a multiplier for multiplying by a factor the corrected image data of a value beyond an input range of the modulating means so as to be changed into a value falling within an input range of said modulating means, wherein said gradation converting means has a gradation conversion characteristic corresponding to the factor, and said modulating means inputs the corrected image data amplitude-adjusted by said amplitude adjusting means, and outputs modulation signals to said column wires.

3. An image display apparatus according to claim 2, wherein
the gradation converting means comprises a multiplier or a plurality of correction tables for performing a conversion to cancel saturation characteristics of phosphors at a plurality of operation points determined by the factor.

4. The image display apparatus according to claim 3, wherein said gradation converting means is comprised of a multiplier for multiplying image data by said factor, and a γ correction table of canceling saturation characteristic of the phosphor in an absent state of the voltage drop, and is configured to feed an output of said multiplier into a γ correction table of canceling a gradation characteristic of luminance in the absent state of said voltage drop.

5. An image display apparatus according to claim 3, wherein
the gradation converting means comprises a plurality of gamma correction tables corresponding to a plurality of the factors of different values.

6. The image display apparatus according to claim 3, wherein the characteristic of said gradation converting means is a characteristic of canceling greater saturation of a phosphor when the factor is larger than when the factor is smaller.

7. The image display apparatus according to claim 2, wherein said amplitude adjusting means adjusts the amplitude of the corrected image data outputted from the corrected image data calculating means, by multiplying input image data before the correction, being an input into the corrected image data calculating means, by a factor for adjusting the amplitude thereof.

8. The image display apparatus according to claim 2, wherein said amplitude adjusting means detects a maximum of outputs of said corrected image data calculating means in each frame and adaptively calculates the factor so that the maximum matches an upper limit of the input range of said modulating means.

9. The image display apparatus according to claim 2, wherein the factor is a factor preliminarily determined so that with entry of maximum input image data an output of said corrected image data calculating means does not overflow the input range of said modulating means.

10. The image display apparatus according to claim 2, wherein said corrected image data calculating means comprises:
means for estimating a spatial distribution and a temporal change of voltage drop amounts to be caused on the row wires during one horizontal scanning period, corresponding to input image data; and
means for calculating corrected image data with correction for the input image data, from the voltage drop amounts calculated.

11. The image display apparatus according to claim 2, wherein said corrected image data calculating means comprises:
means for discretely estimating spatial distributions and temporal changes of voltage drop amounts to be caused on the row wires during one horizontal scanning period, corresponding to input image data; and
means for calculating corrected image data with correction for said input image data, from the voltage drop amounts calculated.

12. The image display apparatus according to claim 2, wherein said corrected image data calculating means comprises:
means for discretely estimating voltage drop amounts to be caused on the row wires during one horizontal scanning period, in a spatial direction and in a temporal direction, corresponding to input image data;
discrete corrected image data calculating means for discretely calculating corrected image data for image data corresponding to times of the calculation of said voltage drop amounts at spatial positions of the calculation of said voltage drop amounts, from said voltage drop amounts; and
corrected image data interpolating means for performing interpolation between outputs of the discrete corrected image data calculating means to calculate corrected image data matching sizes and horizontal display positions of the input image data.

13. The image display apparatus according to claim 2, wherein said modulating means is a pulse width modulation means for implementing modulation by varying a pulse width of a voltage pulse waveform applied to each column wire, according to an input into the modulating means.

14. The image display apparatus according to claim 2, wherein said gradation converting means has a function of converting input image data into an emitted charge amount requirement to cancel a saturation characteristic of a phosphor, and outputting the emitted charge amount requirement, and wherein said corrected image data calculating means has a function of making correction for variation of an emitted charge amount due to influence of said voltage drop, for the emitted charge amount requirement being an output of said gradation converting means.

15. The image display apparatus according to claim 2, wherein the corrected image data calculated by said corrected image data calculating means is adjusted so that said emitted charge amount requirement becomes an emitted charge amount in an absent state of the voltage drop to be caused a row wire.

16. An image display apparatus comprising:
a plurality of electron-emitting devices connected to a plurality of row wires and column wires respectively and arranged in a matrix pattern;
a phosphor emitting light in response to an irradiation with an electron emitted from the electron-emitting devices;
scanning means connected to said row wires and applying a selection voltage to selected ones of said row wires;
modulating means connected to said column wires;
gradation converting means for performing gradation conversion of input image data according to a characteristic of the phosphor;
corrected image data calculating means for calculating corrected image data, which is image data after correction for influence on a voltage applied to the electron-emitting devices due to a voltage drop through said row wires, corresponding to converted image data outputted from the gradation converting means; and
amplitude adjusting means having a multiplier for multiplying by a factor corrected image data of a value beyond an input range of the modulating means so as to be changed into a value falling within an input range of the modulating means, wherein said gradation converting means has a gradation conversion characteristic corresponding to the factor, and said modulating means inputs the corrected image data amplitude-adjusted by the amplitude adjusting means, and outputs modulation signals to said column wires, and wherein, responsive to an input of non-zero uniform image data common to all colors, a pulse width of a pulse outputted from the modulation means in a vicinity of an output terminal of the scanning means is made smaller than a pulse width of a pulse outputted from the modulation means distant from the output terminal of the scanning means, and a saturation characteristic of phosphors being dependent on a quantity of a charge discharged from the electron-emitting devices is cancelled, so as to implement such driving that any image data uniform and common to all the colors is displayed at almost equal color temperature of white color, independent of emission luminance.

17. An image display apparatus comprising:
a plurality of first wirings to which a selected potential is applied;
a plurality of second wirings to which a modulation signal is supplied;
electron-emitting devices connected to the first and second wirings;
a phosphor emitting light in response to an irradiation with an electron emitted from the electron-emitting devices;
a modulating circuit for supplying a modulation signal to the second wirings;
a conversion circuit for conversion corresponding to a characteristic of the phosphor; and
a multiplier circuit for multiplying a gain of data of a value beyond an input range of the modulating circuit outputted from the conversion circuit to the modulating circuit, so as to be changed into a value falling within the input range of the modulating circuit,
wherein the conversion circuit performs conversion corresponding to the gain.

18. An image display apparatus according to claim 17, wherein
the conversion circuit comprises a multiplier circuit for multiplying input data by the gain.

19. An image display apparatus according to claim 17, wherein
the conversion circuit has correction tables capable of outputting respectively different conversion values correspondingly to gains of plural values for one input data.

20. An image display apparatus according to claim 19, wherein
the conversion circuit outputs a conversion value in an interpolation manner.

21. An image display apparatus according to claim 17, wherein
the conversion circuit comprises a correction circuit for correcting at least a voltage drop through a first wiring, and the correction circuit inputs data from the conversion circuit, and outputs corrected data to the multiplier circuit.

22. An image display apparatus according to claim 17, further comprising
a determination circuit for determining the gain based on a value of the data inputted from the converting circuit.

* * * * *

UNITED STATES PATENT AND TRADEMARK OFFICE
CERTIFICATE OF CORRECTION

PATENT NO.       : 7,417,610 B2
APPLICATION NO.  : 11/212675
DATED            : August 26, 2008
INVENTOR(S)      : Naoto Abe et al.

It is certified that error appears in the above-identified patent and that said Letters Patent is hereby corrected as shown below:

COLUMN 9

Line 26, "toward" should be deleted.

COLUMN 13

Line 38, "a better look of" should be deleted.

COLUMN 15

Line 40, "time as it," should read --time,--; and
    Line 44, "Inventors" should read --inventors--.

COLUMN 16

Line 36, "no-voltage" should read --no voltage--.

COLUMN 20

Line 66, "value-of" should read --value of--.

COLUMN 21

Line 65, "frames-vary" should read --frames vary--.

COLUMN 22

Line 7, "of-reducing" should read --of reducing--;
    Line 13, "Inventors" should read --inventors--;
    Line 35, "$1 \geq A \geq B \geq 0$)," should read --$1 \geq A \geq B > 0$),--; and
    Line 43, "B= $^1/_{16}$to" should read --B=$^1/_{16}$ to--.

COLUMN 23

Line 22, "phenomena-and" should read --phenomena and--.

UNITED STATES PATENT AND TRADEMARK OFFICE
CERTIFICATE OF CORRECTION

| | |
|---|---|
| PATENT NO. | : 7,417,610 B2 |
| APPLICATION NO. | : 11/212675 |
| DATED | : August 26, 2008 |
| INVENTOR(S) | : Naoto Abe et al. |

It is certified that error appears in the above-identified patent and that said Letters Patent is hereby corrected as shown below:

COLUMN 24

Line 46, "of-emitted" should read --of emitted--.

COLUMN 27

Line 52, "configuration-corresponding" should read --configuration corresponding--; and
    Line 66, "the-saturation" should read --the saturation--.

COLUMN 33

Line 37, "figured-so" should read --figured so--.

COLUMN 34

Line 47, "as-described" should read --as described--; and
    Line 50, "degradation-of" should read --degradation of--.

COLUMN 35

Line 19, "of-image" should read --of image--.

COLUMN 36

Line 9, "the-corrected" should read --the corrected--; and
    Line 56, "to" should be deleted.

COLUMN 37

Line 5, "to" (second occurrence) should be deleted;
    Line 64, "the" (second occurrence) should be deleted; and
    Line 67, "varies" should read --vary--.

UNITED STATES PATENT AND TRADEMARK OFFICE
CERTIFICATE OF CORRECTION

PATENT NO.        : 7,417,610 B2
APPLICATION NO.   : 11/212675
DATED             : August 26, 2008
INVENTOR(S)       : Naoto Abe et al.

It is certified that error appears in the above-identified patent and that said Letters Patent is hereby corrected as shown below:

COLUMN 38

Line 9, "varies" should read --vary--.

COLUMN 41

Line 19 Claim 15, "caused" should read --caused through--.

COLUMN 42

Line 36 Claim 19, "spondingly" should read --sponding--; and
Line 49 Claim 22, "comprising" should read --comprising:--.

Signed and Sealed this

Seventeenth Day of February, 2009

JOHN DOLL
*Acting Director of the United States Patent and Trademark Office*